US008805121B2

(12) United States Patent
Kameyama et al.

(10) Patent No.: US 8,805,121 B2
(45) Date of Patent: Aug. 12, 2014

(54) METHOD AND DEVICE FOR VIDEO IMAGE PROCESSING, CALCULATING THE SIMILARITY BETWEEN VIDEO FRAMES, AND ACQUIRING A SYNTHESIZED FRAME BY SYNTHESIZING A PLURALITY OF CONTIGUOUS SAMPLED FRAMES

(75) Inventors: Hirokazu Kameyama, Kanagawa-ken (JP); Wataru Ito, Kanagawa-ken (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 13/593,636

(22) Filed: Aug. 24, 2012

(65) Prior Publication Data
US 2012/0321220 A1    Dec. 20, 2012

Related U.S. Application Data

(62) Division of application No. 13/172,437, filed on Jun. 29, 2011, now Pat. No. 8,275,219, which is a division of application No. 12/754,718, filed on Apr. 6, 2010, now Pat. No. 8,078,010, which is a division of application No. 10/646,753, filed on Aug. 25, 2003, now Pat. No. 7,729,563.

(30) Foreign Application Priority Data

Aug. 28, 2002   (JP) ................. 2002/249212
Aug. 28, 2002   (JP) ................. 2002/249213
Sep. 27, 2002   (JP) ................. 2002/284126
Sep. 27, 2002   (JP) ................. 2002/284127
Sep. 27, 2002   (JP) ................. 2002/284128

(51) Int. Cl.
   *G06K 9/32*    (2006.01)
(52) U.S. Cl.
   USPC ....................................................... 382/299

(58) Field of Classification Search
   None
   See application file for complete search history.

(56) References Cited

U.S. PATENT DOCUMENTS

| 5,619,273 A | 4/1997 | Sugiyama |
| 5,696,848 A | 12/1997 | Patti et al. |

(Continued)

FOREIGN PATENT DOCUMENTS

| JP | 6-6777 A | 1/1994 |
| JP | 8-130716 A | 5/1996 |

(Continued)

OTHER PUBLICATIONS

Chen et al" Extraction of high-resolution video stills from MPEG images sequences" International Conference on Image Processing 1998.*

(Continued)

*Primary Examiner* — Sean Motsinger
(74) *Attorney, Agent, or Firm* — Sughrue Mion, PLLC

(57) ABSTRACT

To acquire a high-resolution frame from a plurality of frames sampled from a video image, it is necessary to obtain a high-resolution frame with reduced picture quality degradation regardless of motion of a subject included in the frame. Because of this, between a plurality of contiguous frames $Fr_N$ and $Fr_{N+1}$, there is estimated a correspondent relationship. Based on the correspondent relationship, the frames $Fr_{N+1}$ and $Fr_N$ are interposed to obtain first and second interpolated frames $Fr_{H1}$ and $Fr_{H2}$. Based on the correspondent relationship, the coordinates of the frame $Fr_{N+1}$ are transformed, and from a correlation value with the frame $Fr_N$, there is obtained a weighting coefficient $\alpha(x°, y°)$ that makes the weight of the first interpolated frame $Fr_{H1}$ greater as a correlation becomes greater. With the weighting coefficient, the first and second interpolated frames are weighted and added to acquire a synthesized frame $Fr_G$.

3 Claims, 30 Drawing Sheets

(56) References Cited

U.S. PATENT DOCUMENTS

| | | | |
|---|---|---|---|
| 6,023,535 A | 2/2000 | Aoki | |
| 6,081,278 A * | 6/2000 | Chen | 345/473 |
| 6,126,598 A * | 10/2000 | Entrekin et al. | 600/437 |
| 6,128,396 A | 10/2000 | Hasegawa et al. | |
| 6,285,804 B1 | 9/2001 | Crinon et al. | |
| 6,304,682 B1 | 10/2001 | Patti | |
| 6,307,550 B1 * | 10/2001 | Chen et al. | 345/418 |
| 6,330,344 B1 * | 12/2001 | Kondo et al. | 382/107 |
| 6,349,154 B1 | 2/2002 | Kleihorst | |
| 6,381,279 B1 | 4/2002 | Taubman | |
| 6,434,280 B1 | 8/2002 | Peleg et al. | |
| 6,466,618 B1 | 10/2002 | Messing et al. | |
| 6,535,650 B1 * | 3/2003 | Poulo et al. | 382/284 |
| 6,665,450 B1 | 12/2003 | Cornog et al. | |
| 6,804,419 B1 | 10/2004 | Miyake | |
| 6,983,080 B2 | 1/2006 | Wenstrand et al. | |
| 7,075,569 B2 | 7/2006 | Niikawa | |
| 7,085,323 B2 | 8/2006 | Hong | |
| 7,103,231 B2 | 9/2006 | Cornog et al. | |
| 7,127,090 B2 | 10/2006 | Kreang-Arekul et al. | |
| 7,215,831 B2 | 5/2007 | Altunbasak et al. | |
| 7,277,118 B2 * | 10/2007 | Foote | 348/36 |
| 7,373,019 B2 | 5/2008 | Zomet et al. | |
| 2002/0028026 A1 * | 3/2002 | Chen et al. | 382/284 |
| 2002/0122113 A1 | 9/2002 | Foote | |
| 2003/0020966 A1 * | 1/2003 | Yashiro | 358/496 |
| 2003/0035592 A1 | 2/2003 | Cornog et al. | |
| 2003/0189983 A1 * | 10/2003 | Hong | 375/240.27 |
| 2004/0008269 A1 * | 1/2004 | Zomet et al. | 348/252 |
| 2004/0086193 A1 | 5/2004 | Kameyama et al. | |
| 2004/0207735 A1 | 10/2004 | Kameyama et al. | |
| 2006/0257047 A1 | 11/2006 | Kameyama et al. | |
| 2006/0268150 A1 | 11/2006 | Kameyama et al. | |
| 2007/0133903 A1 | 6/2007 | Zomet et al. | |
| 2010/0182511 A1 | 7/2010 | Xu | |

FOREIGN PATENT DOCUMENTS

| | | |
|---|---|---|
| JP | 9-233422 A | 9/1997 |
| JP | 10-285581 | 10/1998 |
| JP | 11-308577 A | 11/1999 |
| JP | 2000-354244 A | 12/2000 |
| JP | 2001-86508 A | 3/2001 |
| JP | 2001-177714 A | 6/2001 |
| JP | 2002-526227 A | 8/2002 |
| WO | 00/08860 A1 | 2/2000 |

OTHER PUBLICATIONS

Tekalp et al., "High-Resolution Image Reconstruction From Lower-Resolution Image Sequences and Space-Varying Image Restoration," IEEE pp. III 169-172, Sep. 1992.

Chen et al , "Extraction of High-Resolution Video Stills from MPEG Image Sequences," International Conference on Image Processing, Chicago Illinois, Oct. 4-7 1998, pp. 465-469.

Schultz et al., "Extraction of High-Resolution Frames From Video Sequences," IEEE Transactions on Image Processing, vol. 5, No. 6, Jun. 1996, pp. 996-1011.

Patti et al' , "Supperresolution Video Reconstruction with Arbitrary Sampling Lattices and Nonzero Aperture Time, " IEEE Transactions on Image Processing, vol. 6, No. 8, Aug. 1997, pp. 1064-1076.

Y. Nakazawa, "Acquisition of High Resolution Digital Images by Interframe Integration", Television Society Journal, vol. 49, No. 3, pp. 299-308, 1995.

"Acquisition of High resolution Digital Images" Television society Journal vol. 49 No. 3 pp. 299-308 1995 (Translation obtained from corresponding U.S. Appl. No. 10/750,461).

* cited by examiner

| MAGNIFICATION RATIO | FRAME RATE | COMPRESSION QUALITY | FRAME NUMBER S |
|---|---|---|---|
| 2 | 10 | HIGH | 3 |
| 2 | 10 | MEDIUM | 4 |
| 2 | 10 | LOW | 5 |
| ⋮ | ⋮ | ⋮ | ⋮ |
| 2 | 10 | HIGH | 3 |
| 2 | 10 | MEDIUM | 4 |
| 2 | 10 | LOW | 5 |
| ⋮ | ⋮ | ⋮ | ⋮ |

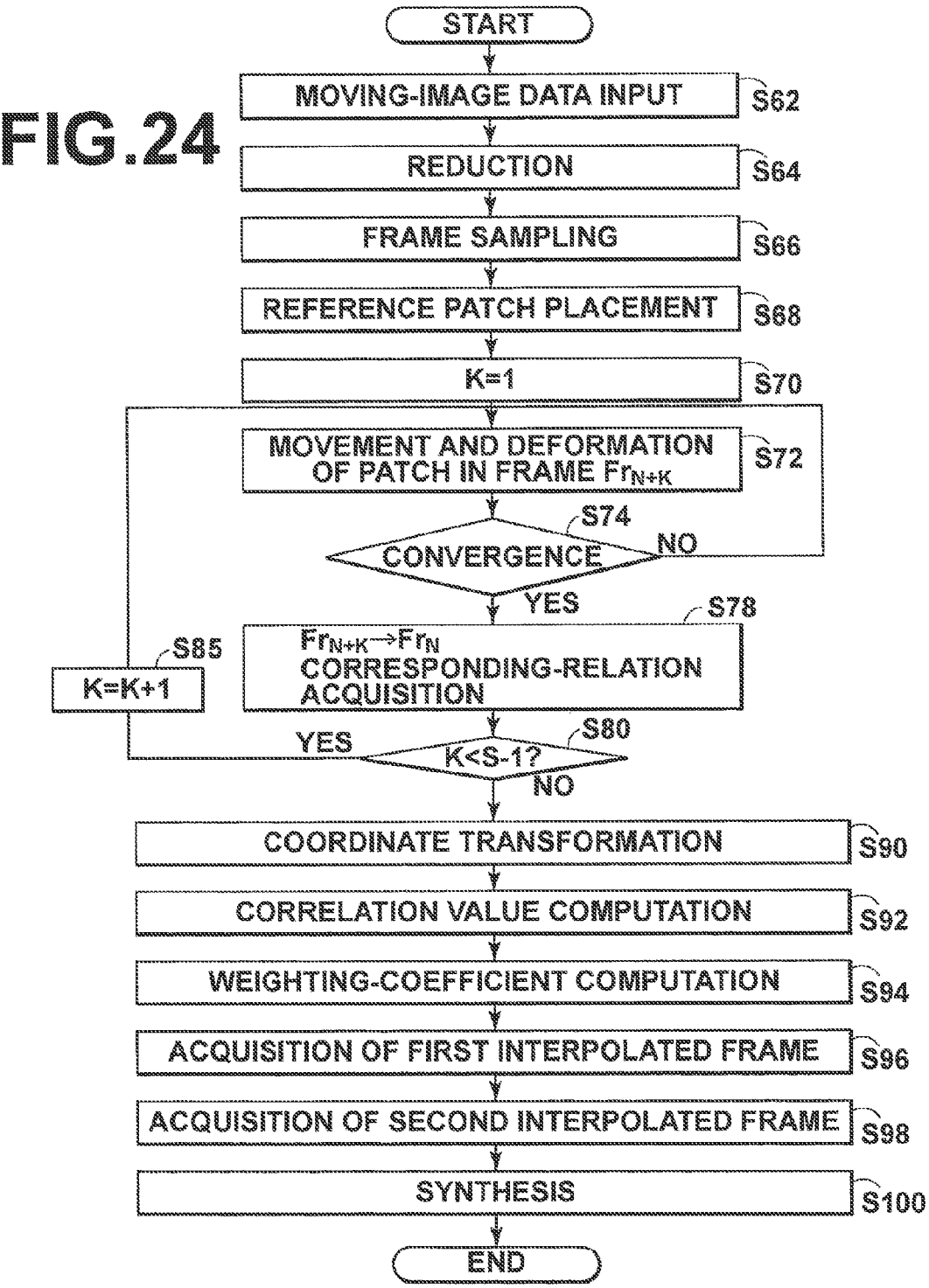

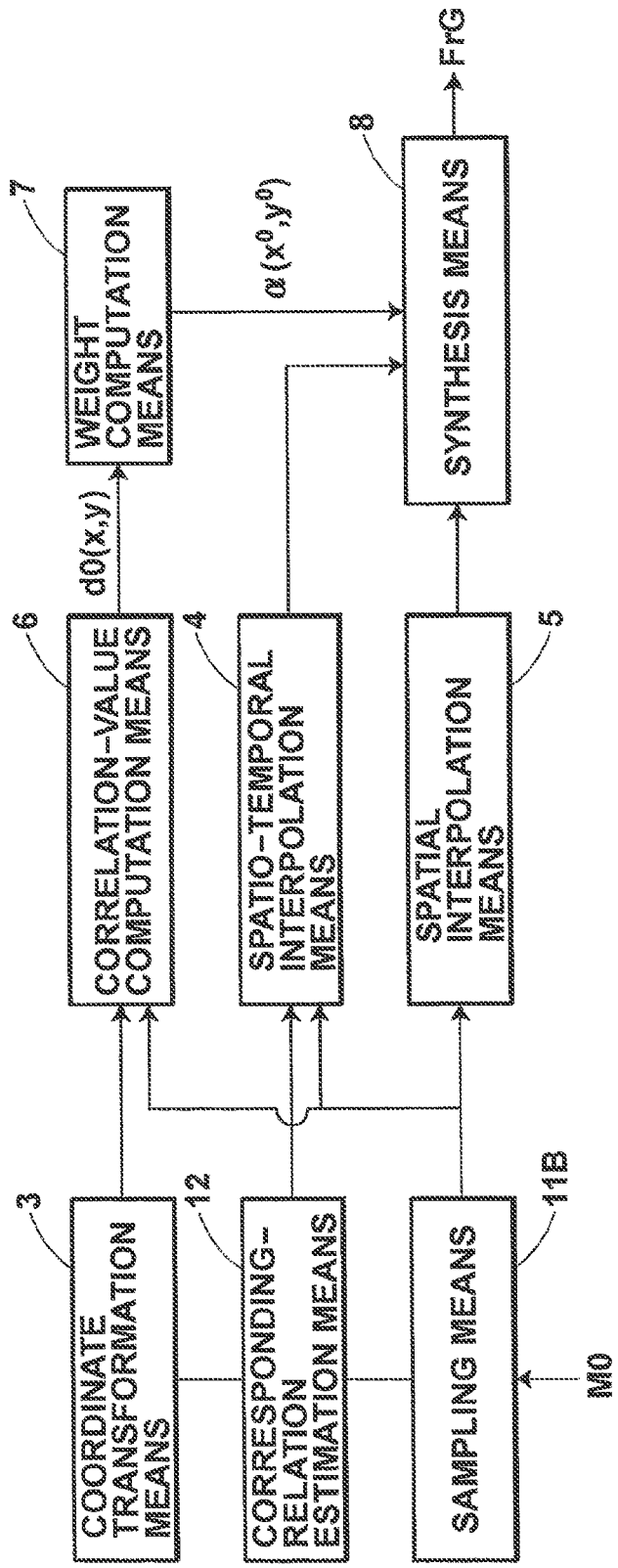

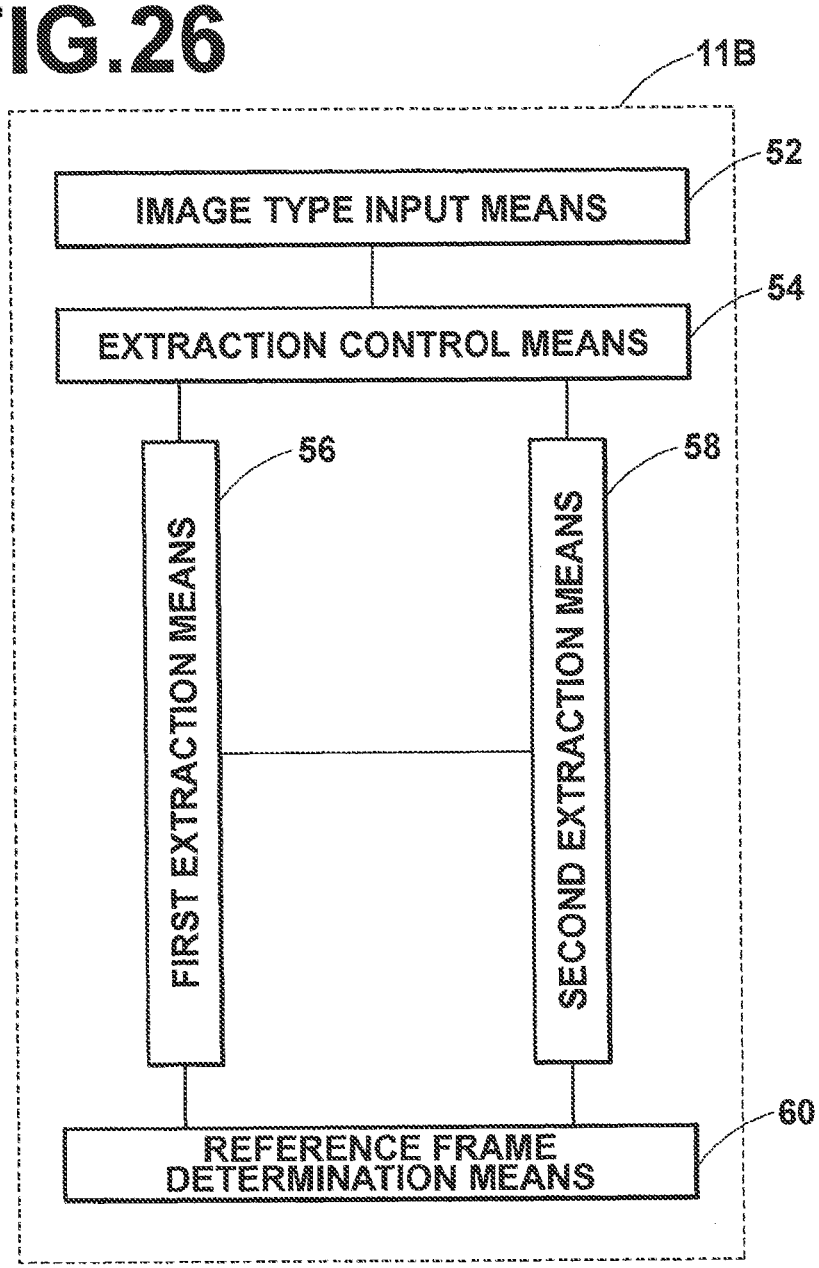

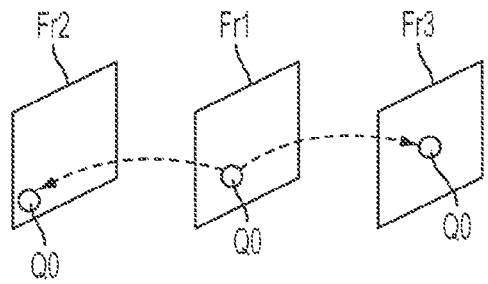
FIG. 33
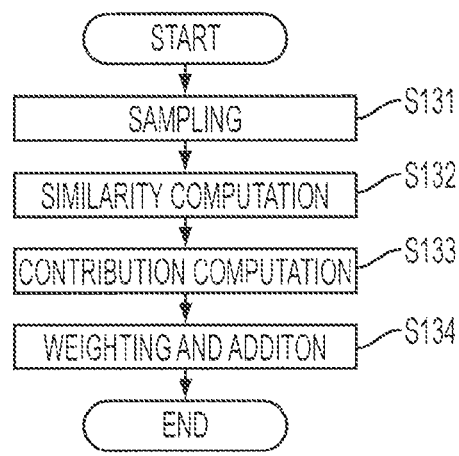
FIG. 34A    FIG. 34B
FIG. 35

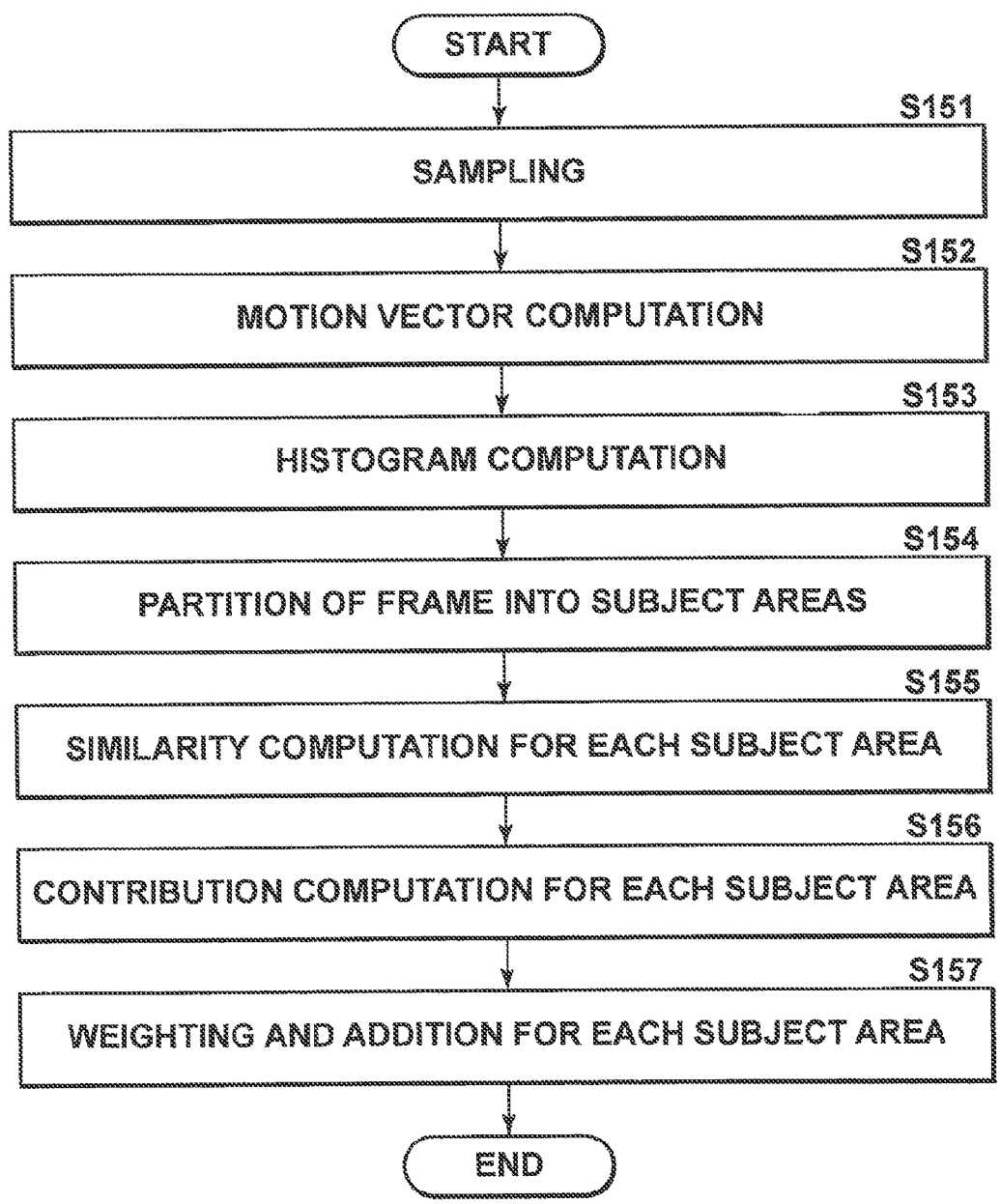

METHOD AND DEVICE FOR VIDEO IMAGE PROCESSING, CALCULATING THE SIMILARITY BETWEEN VIDEO FRAMES, AND ACQUIRING A SYNTHESIZED FRAME BY SYNTHESIZING A PLURALITY OF CONTIGUOUS SAMPLED FRAMES

CROSS-REFERENCE TO RELATED APPLICATIONS

This is a divisional of U.S. application Ser. No. 13/172,437, filed Jun. 29, 2011, which is a divisional of U.S. application Ser. No. 12/754,718, now U.S. Pat. No. 8,078,010, filed Apr. 6, 2010, which is a divisional of U.S. application Ser. No. 10/646,753, now U.S. Pat. No. 7,729,563, filed Aug. 25, 2003, which claims priority from Japanese Patent Applications Nos. 2002-249212 filed on Aug. 28, 2002, 2002-249213 filed on Aug. 28, 2002, 2002-284126 filed on Sep. 27, 2002, 2002-284127 filed Sep. 27, 2002 and 2002-284128 filed Sep. 27, 2002. The entire disclosures of the prior applications are incorporated by reference herein.

BACKGROUND OF THE INVENTION

1. Field of the Invention

The present invention relates to a video image synthesis method and a video image synthesizer for synthesizing a plurality of contiguous frames sampled from a video image to acquire a synthesized frame whose resolution is higher than the sampled frame, and a program for causing a computer to execute the synthesis method.

The present invention also relates to an image processing method and image processor for performing image processing on one frame sampled from a video image to acquire a processed frame, and a program for causing a computer to execute the processing method.

2. Description of the Related Art

With the recent spread of digital video cameras, it is becoming possible to handle a video image in units of single frames. When printing such a video image frame, the resolution of the frame needs to be made high to enhance the picture quality. Because of this, there has been disclosed a method of sampling a plurality of frames from a video image and acquiring one synthesized frame whose resolution is higher than the sampled frames (e.g., Japanese Unexamined Patent Publication No. 2000-354244). This method obtains a motion vector among a plurality of frames, and computes a signal value that is interpolated between pixels, when acquiring a synthesized frame from a plurality of frames, based on the motion vector. Particularly, the method disclosed in the aforementioned publication No. 2000-354244 partitions each frame into a plurality of blocks, computes an orthogonal coordinate coefficient for blocks corresponding between frames, and synthesizes information about a high-frequency wave in this orthogonal coordinate coefficient and information about a low-frequency wave in another block to compute a pixel value that is interpolated. Therefore, a synthesized frame with high picture quality can be obtained without reducing the required information. Also, in this method, the motion vector is computed with resolution finer than a distance between pixels, so a synthesized frame of high picture quality can be obtained by accurately compensating for the motion between frames.

When synthesizing a plurality of video image frames, it is also necessary to acquire correspondent relationships between pixels of the frames in a motion area. The correspondent relationship is generally obtained by employing block matching methods or differential (spatio-temporal gradient) methods. However, since the block matching methods are based on the assumption that a moved quantity within a block is in the same direction, the methods are lacking in flexibility with respect to various motions such as rotation, enlargement, reduction, and deformation. Besides, these methods have the disadvantage that they are time-consuming and impractical. On the other hand, the gradient methods have the disadvantage that they cannot obtain stable solutions, compared with block matching methods. There is a method for overcoming these disadvantages (see, for example, Yuji Nakazawa, Takashi Komatsu, and Takahiro Saito, "Acquisition of High-Definition Digital Images by Interframe Synthesis," Television Society Journal, 1995, Vol. 49, No. 3, pp. 299-308). This method employs one sampled frame as a reference frame, places a reference patch consisting of one or a plurality of rectangular areas on the reference frame, and respectively places patches which are the same as the reference patch, on the others of the sampled frames. The patches are moved and/or deformed in the other frames so that an image within each patch coincides with an image within the reference patch. Based on the patches after the movement and/or deformation and on the reference patch, this method computes a correspondent relationship between a pixel within the patch of each of the other frames and a pixel within the reference patch, thereby synthesizing a plurality of frames accurately.

The above-described method is capable of obtaining a synthesized frame of high definition by estimating a correspondent relationship between the reference frame and the succeeding frame and then assigning the reference frame and the succeeding frame to a synthesized image that has the finally required resolution.

However, in the method disclosed by Nakazawa, et al., when the motion of a subject in the succeeding frame is extremely great, or when a subject locally included in the succeeding frame moves complicatedly or at an extremely high speed, there are cases where the motion of a subject cannot be followed by the movement and/or deformation of a patch. If the motion of a subject cannot be followed by the movement and/or deformation of a patch, then a synthesized frame will become blurred as a whole or a subject with a great motion included in a frame will become blurred. As a result, the above-described method cannot obtain a synthesized frame of high picture quality.

Also, in the method disclosed by Nakazawa, et al., an operator manually sets the range of frames that include a reference frame when sampling a plurality of frames from a video image, that is, the number of frames that are used for acquiring a synthesized frame. Because of this, the operator needs to have an expert knowledge of image processing, and the setting of the number of frames will be time-consuming. Also, the manual setting of the number of frames may vary according to each person's subjective point of view, so a suitable range of frames cannot always be obtained objectively. This has an adverse influence on the quality of synthesized frames.

Further, the method disclosed by Nakazawa, et al. selects one or a plurality of reference frames when sampling a plurality of frames from a video image, and samples a predetermined range of frames for each reference frame, including the reference frame. The selection of reference frames is performed manually by an operator, so the operator must have an expert knowledge of image processing and the selection is time-consuming. Also, the manual selection of reference frames may vary according to each person's subjective point of view, so proper reference frames cannot always be determined objectively. This has an adverse influence on the quality of synthesized frames. In addition, reference frames are set by the operator's judgement, so the intention of a photographer cannot always be reflected and a synthesized frame with scenes desired by the photographer cannot be obtained.

Also, with the spread of digital video cameras, the video images taken by digital video cameras can be stored in a personal computer (PC), and the video images can be freely edited or processed. Video image data representing a video image can be downloaded into a PC by archiving the video image data in a database and accessing the database through a network from the PC. However, the amount of data for video image data is large and the contents of the data cannot be recognized until it is played back, so it is difficult to handle, compared with still images.

To easily understand the contents of video images archived in a PC or database, there has been proposed a method of detecting a frame that represents a scene contained in a video image, and attaching this frame to the video image data (e.g., Japanese Unexamined Patent Publication No. 9 (1997)-233422). According to this method, the contents of a video image can be grasped by referring to a frame attached to video image data, so it becomes possible to handle the video image data easily.

However, in the video image, unlike still images, each frame on a temporal axis in the video image includes a blur unique to the video image. For instance, a subject in motion, which is included in a video image, has a blur proportional to the moved quantity in the moving direction. Also, video images are low in resolution, compared to still images taken by digital still cameras, etc. Therefore, the picture quality of frames, sampled from a video image by the method disclosed in the above-described Japanese Unexamined Patent Publication No. 9(1997)-233422, are not so high.

SUMMARY OF THE INVENTION

The present invention has been made in view of the circumstances described above. Accordingly, it is a first object of the present invention to obtain a synthesized frame in which picture quality degradation has been reduced regardless of the motion of a subject included in a frame. A second object of the present invention is to determine a suitable range of frames easily and objectively and obtain a synthesized frame of good quality, when synthesizing a plurality of frames sampled from a video image. A third object of the present invention is to easily and objectively determine a proper reference frame reflecting the intention of a photographer and obtain a synthesized frame of good quality, when synthesizing a plurality of frames sampled from a video image. A fourth object of the present invention is to obtain frames of high picture quality from a video image.

To achieve the objects of the present invention described above, there is provided a first video image synthesis method. The first synthesis method of the present invention comprises the steps of:

sampling two contiguous frames from a video image;

placing a reference patch comprising one or a plurality of rectangular areas on one of the two frames which is used as a reference frame, then placing on the other of the two frames a second patch which is the same as the reference patch, then moving and/or deforming the second patch in the other frame so that an image within the second patch coincides with an image within the reference patch, and estimating a correspondent relationship between a pixel within the second patch on the other frame and a pixel within the reference patch on the reference frame, based on the second patch after the movement and/or deformation and on the reference patch;

acquiring a first interpolated frame whose resolution is higher than each of the frames, by performing interpolation either on the image within the second patch of the other frame or on the image within the second patch of the other frame and image within the reference patch of the reference frame, based on the correspondent relationship;

acquiring a second interpolated frame whose resolution is higher than each of the frames, by performing interpolation on the image within the reference patch of the reference frame;

acquiring a coordinate-transformed frame by transforming coordinates of the image within the second patch of the other frame to a coordinate space of the reference frame, based on the correspondent relationship;

computing a correlation value that represents a correlation between the image within the patch of the coordinate-transformed frame and the image within the reference patch of the reference frame;

acquiring a weighting coefficient that makes a weight of the first interpolated frame greater as the correlation becomes greater, when synthesizing the first interpolated frame and second interpolated frame, based on the correlation value; and acquiring a synthesized frame by weighting and synthesizing the first and second interpolated frames, based on the weighting coefficient.

The aforementioned correlation value may be computed between corresponding pixels of the images within the reference patch of the reference frame and within the patch of the coordinate-transformed frame, but it may also be computed between corresponding local areas, rectangular areas of patches, or frames. In this case, the aforementioned weighting coefficient is likewise acquired for each pixel, each local area, each rectangular area, or each frame.

In accordance with the present invention, there is provided a second video image synthesis method. The second synthesis method of the present invention comprises the steps of:

sampling three or more contiguous frames from a video image;

placing a reference patch comprising one or a plurality of rectangular areas on one of the three or more frames which is used as a reference frame, then respectively placing on the others of the three or more frames patches which are the same as the reference patch, then moving and/or deforming the patches in the other frames so that an image within the patch of each of the other frames coincides with an image within the reference patch, and respectively estimating correspondent relationships between pixels within the patches of the other frames and a pixel within the reference patch of the reference frame, based on the patches of the other frames after the movement and/or deformation and on the reference patch;

acquiring a plurality of first interpolated frames whose resolution is higher than each of the frames, by performing interpolation either on the image within the patch of each of the other frames or on the image within the patch of each of the other frames and image within the reference patch of the reference frame, based on the correspondent relationships;

acquiring one or a plurality of second interpolated frames whose resolution is higher than each of the frames and which are correlated with the plurality of first interpolated frames, by performing interpolation on the image within the reference patch of the reference frame;

acquiring a plurality of coordinate-transformed frames by transforming coordinates of the images within the patches of the other frames to a coordinate space of the reference frame, based on the correspondent relationships;

computing correlation values that represent a correlation between the image within the patch of each of the coordinate-transformed frames and the image within the reference patch of the reference frame;

acquiring weighting coefficients that make a weight of the first interpolated frame greater as the correlation becomes greater, when synthesizing the first interpolated frame and second interpolated frame, based on the correlation values; and acquiring intermediate synthesized frames by weighting and synthesizing the first and second interpolated frames that correspond to each other on the basis of the weighting coefficients, and acquiring a synthesized frame by synthesizing the intermediate synthesized frames.

In the second synthesis method of the present invention, while a plurality of correlation values are computed between the reference frame and other frames, the average or median value of the correlation values may be employed for acquiring the aforementioned weighting coefficient.

The expression "acquiring a plurality of second interpolated frames which are correlated with the plurality of first interpolated frames" is intended to mean acquiring a number of second interpolated frames corresponding to the number of first interpolated frames. That is, a pixel value within a reference patch is interpolated so that it is assigned at the same pixel position as a pixel position in a first interpolated frame that has a pixel value, whereby a second interpolated frame corresponding to that first interpolated frame is acquired. This processing is performed on all of the first interpolated frames.

On the other hand, the expression "acquiring one second interpolated frame which is correlated with the plurality of first interpolated frames" is intended to mean acquiring one second interpolated frame. That is, a pixel value within a reference patch is interpolated so that it is assigned at a predetermined pixel position in a second interpolated frame such as an integer pixel position, regardless of a pixel position in a first interpolated frame that has a pixel value. In this manner, one second interpolated frame is acquired. In this case, a pixel value at each of the pixel positions in a plurality of first interpolated frames, and a pixel value at a predetermined pixel position in a second interpolated frame closest to that pixel value, are caused to correspond to each other.

According to the present invention, a plurality of contiguous frames are first sampled from a video image. Then, a reference patch comprising one or a plurality of rectangular areas is placed on one of the frames, which is used as a reference frame. Next, a second patch that is the same as the reference patch is placed on the other of the frames. The second patch in the other frame is moved and/or deformed so that an image within the second patch coincides with an image within the reference patch. Based on the second patch after the movement and/or deformation and on the reference patch, there is estimated a correspondent relationship between a pixel within the second patch on the other frame and a pixel within the reference patch on the reference frame.

By performing interpolation either on the image within the second patch of the other frame or on the image within the second patch of the other frame and the image within the reference patch of the reference frame, based on the correspondent relationship, there is acquired a first interpolated frame whose resolution is higher than each of the frames. Note that in the case where three or more frames are sampled, there are acquired a plurality of first interpolated frames. When the motion of a subject in each frame is small, the first interpolated frame represents a high-definition image whose resolution is higher than each frame. On the other hand, when the motion of a subject in each frame is great or complicated, a moving subject in the first interpolated frame becomes blurred.

In addition, by interpolating an image within the reference patch of the reference frame, there is obtained a second interpolated frame whose resolution is higher than each frame. In the case where three or more frames are sampled, one or a plurality of second interpolated frames are acquired with respect to a plurality of first interpolated frames. The second interpolated frame is obtained by interpolating only one frame, so it is inferior in definition to the first interpolated frame, but even when the motion of a subject is great or complicated, it does not become as blurred.

Moreover, the coordinate-transformed frame is acquired by transforming the coordinates of the image within the second patch of the other frame to a coordinate space of the reference frame, based on the correspondent relationship. The correlation value is computed and represents a correlation between the image within the patch of the coordinate-transformed frame and the image within the reference patch of the reference frame. The weighting coefficient, which is employed when synthesizing the first interpolated frame and the second interpolated frame, is computed based on the correlation value. As the correlation between the coordinate-transformed frame and the reference frame becomes greater, the weighting coefficient makes the weight of the first interpolated frame greater. In the case where three or more frames are sampled, the coordinate-transformed frame, correlation value, and weighting coefficient are acquired for each of the frames other than the reference frame.

If the motion of a subject in each frame is small, the correlation between the coordinate-transformed frame and the reference frame becomes great, but if the motion is great or complicated, the correlation becomes small. Therefore, by weighting and synthesizing the first interpolated frame and second interpolated frame on the basis of the weighting coefficient computed by the weight computation means, when the motion of a subject is small there is obtained a synthesized frame in which the ratio of the first interpolated frame with high definition is high, and when the motion is great there is obtained a synthesized frame including at a high ratio the second interpolated frame in which the blurring of a moving subject has been reduced. In the case where three or more frames are sampled, first and second interpolated frames corresponding to each other are synthesized to acquire intermediate synthesized frames. The intermediate synthesized frames are further combined into a synthesized frame.

Therefore, in the case where the motion of a subject in each frame is great, the blurring of a subject in the synthesized frame is reduced, and when the motion is small, high definition is obtained. In this manner, a synthesized frame with high picture quality can be obtained regardless of the motion of a subject included in each frame.

In the above-described synthesis methods of the present invention, when the aforementioned correlation value has been computed for each of the pixels and/or each of the local regions that constitute each of the frames, the aforementioned correlation value may be filtered to compute a filtered correlation value, and the weighting coefficient may be acquired based on the filtered correlation value.

In this case, when the aforementioned correlation value has been computed for each of the pixels and/or each of the local regions that constitute each of the frames, the correlation value is filtered to compute a filtered correlation value, and the weighting coefficient is acquired based on the filtered correlation value. Because of this, a change in the weighting coefficient in the coordinate space of a frame becomes smooth, and consequently, image changes in areas where correlation values change can be smoothed. This is able to give the synthesized frame a natural look.

The expression "the correlation value is filtered" is intended to mean that a change in the correlation value is smoothed. More specifically, low-pass filters, median filters, maximum value filters, minimum value filters, etc., can be employed In the first and second synthesis methods of the present invention, when the aforementioned correlation value has been computed for each of the pixels and/or each of the local regions that constitute each of the frames, the aforementioned weighting coefficient may be interpolated to acquire weighting coefficients for all pixels that constitute the first and second interpolated frames.

That is, the number of pixels in the first and second interpolated frames becomes greater than that of each frame by interpolation, but the weighting coefficient is computed for only the pixels of sampled frames. Because of this, by interpolating the weighting coefficients acquired for the neighboring pixels, weighing coefficients for the increased pixels may be computed. Also, the pixels increased by interpolation may be weighted and synthesized, employing the weighting coefficients acquired for the pixels that are originally present around the increased pixels.

In this case, when the aforementioned correlation value has been computed for each of the pixels and/or each of the local regions that constitute each of the frames, the aforementioned weighting coefficient are interpolated to acquire weighting coefficients for all pixels that constitute the first and second interpolated frames. Therefore, since the pixels increased by interpolation are also weighted and synthesized by the weighting coefficients acquired for those pixels, an image can change naturally in local areas where correlation values change.

In the first and second synthesis methods of the present invention, the aforementioned weighting coefficient may be acquired by referring to a nonlinear graph in which the aforementioned correlation value is represented in the horizontal axis and the aforementioned weighting coefficient in the vertical axis.

In this case, the aforementioned weighting coefficient is acquired by referring to the nonlinear graph in which the aforementioned correlation value is represented in the horizontal axis and the aforementioned weighting coefficient in the vertical axis. This can give a synthesized frame a natural look in local areas where correlation values change.

It is preferable that the nonlinear graph employ a graph in which values change smoothly and slowly at boundary portions, in the case that a correlation value is represented in the horizontal axis and a weighting coefficient in the vertical axis.

In the first and second synthesis methods of the present invention, the aforementioned estimation of the correspondent relationship, acquisition of the first interpolated frame, acquisition of the second interpolated frame, acquisition of the coordinate-transformed frame, computation of the correlation value, acquisition of the weighting coefficient, and acquisition of the synthesized frame may be performed by employing at least one component that constitutes the aforementioned frame.

In this case, the aforementioned estimation of the correspondent relationship, acquisition of the first interpolated frame, acquisition of the second interpolated frame, acquisition of the coordinate-transformed frame, computation of the correlation value, acquisition of the weighting coefficient, and acquisition of the synthesized frame are performed, employing at least one component that constitutes the aforementioned frame. Therefore, the first and second synthesis methods of the present invention are capable of obtaining a synthesized frame in which picture quality degradation has been reduced for each component, and obtaining a synthesized frame of high picture quality consisting of frames synthesized for each component.

The expression "at least one component that constitutes the frame" is intended to mean, for example, at least one of RGB (red, green, and blue) components, at least one of YCC (luminance and color difference) components, etc. In the case where a frame consists of YCC components, the luminance component is preferred.

In accordance with the present invention, there is provided a first video image synthesizer. The first synthesizer of the present invention comprises:

sampling means for sampling two contiguous frames from a video image;

correspondent relationship estimation means for placing a reference patch comprising one or a plurality of rectangular areas on one of the two frames which is used as a reference frame, then placing on the other of the two frames a second patch which is the same as the reference patch, then moving and/or deforming the second patch in the other frame so that an image within the second patch coincides with an image within the reference patch, and estimating a correspondent relationship between a pixel within the second patch on the other frame and a pixel within the reference patch on the reference frame, based on the second patch after the movement and/or deformation and on the reference patch;

first interpolation means for acquiring a first interpolated frame whose resolution is higher than each of the frames, by performing interpolation either on the image within the second patch of the other frame or on the image within the second patch of the other frame and image within the reference patch of the reference frame, based on the correspondent relationship;

second interpolation means for acquiring a second interpolated frame whose resolution is higher than each of the frames, by performing interpolation on the image within the reference patch of the reference frame;

coordinate transformation means for acquiring a coordinate-transformed frame by transforming coordinates of the image within the second patch of the other frame to a coordinate space of the reference frame, based on the correspondent relationship;

correlation-value computation means for computing a correlation value that represents a correlation between the image within the patch of the coordinate-transformed frame and the image within the reference patch of the reference frame;

weighting-coefficient acquisition means for acquiring a weighting coefficient that makes a weight of the first interpolated frame greater as the correlation becomes greater, when synthesizing the first interpolated frame and second interpolated frame, based on the correlation value; and synthesis means for acquiring a synthesized frame by weighting and synthesizing the first and second interpolated frames, based on the weighting coefficient.

In accordance with the present invention, there is provided a second video image synthesizer. The second video image synthesizer of the present invention comprises:

sampling means for sampling three or more contiguous frames from a video image;

correspondent relationship estimation means for placing a reference patch comprising one or a plurality of rectangular areas on one of the three or more frames which is used as a reference frame, then respectively placing on the others of the three or more frames patches which are the same as the reference patch, then moving and/or deforming the patches in the other frames so that an image within the patch of each of the other frames coincides with an image within the reference patch, and respectively estimating correspondent relationships between pixels within the patches of the other frames and a pixel within the reference patch of the reference frame, based on the patches of the other frames after the movement and/or deformation and on the reference patch;

first interpolation means for acquiring a plurality of first interpolated frames whose resolution is higher than each of the frames, by performing interpolation either on the image within the patch of each of the other frames or on the image within the patch of each of the other frames and image within the reference patch of the reference frame, based on the correspondent relationships;

second interpolation means for acquiring one or a plurality of second interpolated frames whose resolution is higher than each of the frames and which are correlated with the plurality of first interpolated frames, by performing interpolation on the image within the reference patch of the reference frame;

coordinate transformation means for acquiring a plurality of coordinate-transformed frames by transforming coordinates of the images within the patches of the other frames to a coordinate space of the reference frame, based on the correspondent relationships;

correlation-value computation means for computing correlation values that represent a correlation between the image within the patch of each of the coordinate-transformed frames and the image within the reference patch of the reference frame;

weighting-coefficient acquisition means for acquiring weighting coefficients that make a weight of the first interpolated frame greater as the correlation becomes greater, when synthesizing the first interpolated frame and second interpolated frame, based on the correlation values; and synthesis means for acquiring intermediate synthesized frames by weighting and synthesizing the first and second interpolated frames that correspond to each other on the basis of the weighting coefficients, and acquiring a synthesized frame by synthesizing the intermediate synthesized frames.

In the first and second video image synthesizers of the present invention, when the aforementioned correlation value has been computed for each the of pixels and/or each of the local regions that constitute each of the frames, the synthesizer may further comprise means for filtering the correlation value to compute a filtered correlation value, and the aforementioned weighting-coefficient acquisition means may acquire the weighting coefficient, based on the filtered correlation value.

In the first and second video image synthesizers of the present invention, when the aforementioned correlation value has been computed for each of the pixels and/or each of the local regions that constitute each of the frames, the aforementioned weighting-coefficient acquisition means may perform interpolation on the weighting coefficient, thereby acquiring weighting coefficients for all pixels that constitute the first and second interpolated frames.

In the first and second video image synthesizers of the present invention, the aforementioned weighting-coefficient acquisition means may acquire the weighting coefficient by referring to a nonlinear graph in which the correlation value is represented in the horizontal axis and the weighting coefficient in the vertical axis.

In the first and second video image synthesizers of the present invention, the correspondent relationship estimation means, the first interpolation means, the second interpolation means, the coordinate transformation means, the correlation-value computation means, the weighting-coefficient acquisition means, and the synthesis means may perform the estimation of the correspondent relationship, acquisition of the first interpolated frame, acquisition of the second interpolated frame, acquisition of the coordinate-transformed frame, computation of the correlation value, acquisition of the weighting coefficient, and acquisition of the synthesized frame, by employing at least one component that constitutes the aforementioned frame.

Note that the first and second synthesis methods of the present invention may be provided as programs to be executed by a computer.

In accordance with the present invention, there is provided a third video image synthesis method. The third synthesis method of the present invention comprises the steps of:

sampling two contiguous frames from a video image;

placing a reference patch comprising one or a plurality of rectangular areas on one of the two frames which is used as a reference frame, then placing on the other of the two frames a second patch which is the same as the reference patch, then moving and/or deforming the second patch in the other frame so that an image within the second patch coincides with an image within the reference patch, and estimating a correspondent relationship between a pixel within the second patch on the other frame and a pixel within the reference patch on the reference frame, based on the second patch after the movement and/or deformation and on the reference patch;

acquiring a first interpolated frame whose resolution is higher than each of the frames, by performing interpolation either on the image within the second patch of the other frame or on the image within the second patch of the other frame and image within the reference patch of the reference frame, based on the correspondent relationship;

acquiring a second interpolated frame whose resolution is higher than each of the frames, by performing interpolation on the image within the reference patch of the reference frame;

acquiring edge information that represents an edge intensity of the image within the reference patch of the reference frame and/or image within the patch of the other frame;

acquiring a weighting coefficient that makes a weight of the first interpolated frame greater as the edge information becomes greater, when synthesizing the first interpolated frame and second interpolated frame, based on the edge information; and acquiring a synthesized frame by weighting and synthesizing the first and second interpolated frames, based on the weighting coefficient.

In accordance with the present invention, there is provided a fourth video image synthesis method. The fourth synthesis method of the present invention comprises the steps of:

sampling three or more contiguous frames from a video image;

placing a reference patch comprising one or a plurality of rectangular areas on one of the three or more frames which is used as a reference frame, then respectively placing on the others of the three or more frames patches which are the same as the reference patch, then moving and/or deforming the patches in the other frames so that an image within the patch of each of the other frames coincides with an image within the reference patch, and respectively estimating correspondent relationships between pixels within the patches of the other frames and a pixel within the reference patch of the reference frame, based on the patches of the other frames after the movement and/or deformation and on the reference patch;

acquiring a plurality of first interpolated frames whose resolution is higher than each of the frames, by performing interpolation either on the image within the patch of each of the other frames or on the image within the patch of each of the other frames and image within the reference patch of the reference frame, based on the correspondent relationships;

acquiring one or a plurality of second interpolated frames whose resolution is higher than each of the frames and which are correlated with the plurality of first interpolated frames, by performing interpolation on the image within the reference patch of the reference frame;

acquiring edge information that represents an edge intensity of the image within the reference patch of the reference frame and/or image within the patch of each of the other frames;

acquiring weighting coefficients that make a weight of the first interpolated frame greater as the edge information becomes greater, when synthesizing the first interpolated frame and second interpolated frame, based on the edge information; and acquiring intermediate synthesized frames by weighting and synthesizing the first and second interpolated frames that correspond to each other on the basis of the weighting coefficients, and acquiring a synthesized frame by synthesizing the intermediate synthesized frames.

In the fourth synthesis method of the present invention, while many pieces of edge information representing the edge intensity of an image within the patch of each of the other frames are obtained between the reference frame and the other frames, the average or median value of the edge intensities may be obtained as edge information that is employed for acquiring the aforementioned weighting coefficient.

The expression "acquiring a plurality of second interpolated frames which are correlated with the plurality of first interpolated frames" is intended to mean acquiring a number of second interpolated frames corresponding to the number of first interpolated frames. That is, a pixel value within a reference patch is interpolated so that it is assigned at the same pixel position as a pixel position in a first interpolated frame that has a pixel value, whereby a second interpolated frame corresponding to that first interpolated frame is acquired. This processing is performed on all of the first interpolated frames.

On the other hand, the expression "acquiring one second interpolated frame which is correlated with the plurality of first interpolated frames" is intended to mean acquiring one second interpolated frame. That is, a pixel value within a reference patch is interpolated so that it is assigned at a predetermined pixel position in a second interpolated frame such as an integer pixel position, regardless of a pixel position in a first interpolated frame that has a pixel value. In this manner, one second interpolated frame is acquired. In this case, a pixel value at each of the pixel positions in a plurality of first interpolated frames, and a pixel value at a predetermined pixel position in a second interpolated frame closest to that pixel value, are caused to correspond to each other.

According to the present invention, a plurality of contiguous frames are first sampled from a video image. Then, a reference patch comprising one or a plurality of rectangular areas is placed on one of the frames, which is used as a reference frame. Next, a second patch that is the same as the reference patch is placed on the other of the frames. The second patch in the other frame is moved and/or deformed so that an image within the second patch coincides with an image within the reference patch. Based on the second patch after the movement and/or deformation and on the reference patch, there is estimated a correspondent relationship between a pixel within the second patch on the other frame and a pixel within the reference patch on the reference frame.

By performing interpolation either on the image within the second patch of the other frame or on the image within the second patch of the other frame and the image within the reference patch of the reference frame, based on the correspondent relationship, there is acquired a first interpolated frame whose resolution is higher than each of the frames. Note that in the case where three or more frames are sampled, there are acquired a plurality of first interpolated frames. When the motion of a subject in each frame is small, the first interpolated frame represents a high-definition image whose resolution is higher than each frame. On the other hand, when the motion of a subject in each frame is great or complicated, a moving subject in the first interpolated frame becomes blurred.

In addition, by interpolating an image within the reference patch of the reference frame, there is obtained a second interpolated frame whose resolution is higher than each frame. In the case where three or more frames are sampled, one or a plurality of second interpolated frames are acquired with respect to a plurality of first interpolated frames. The second interpolated frame is obtained by interpolating only one frame, so it is inferior in definition to the first interpolated frame, but even when the motion of a subject is great or complicated, it does not become as blurred.

Moreover, there is obtained edge information that represents an edge intensity of the image within the reference patch of the reference frame and/or image within the patch of the other frame. Based on the edge information, there is computed a weighting coefficient that is employed in synthesizing the first interpolated frame and the second interpolated frame. As the edge intensity represented by the edge information becomes greater, the weighting coefficient makes the weight of the first interpolated frame greater.

If the motion of a subject in each frame is small, the edge intensity of the reference frame and/or the other frame becomes great, but if the motion is great or complicated, it moves the contour of the subject and makes the edge intensity small. Therefore, by weighting and synthesizing the first interpolated frame and second interpolated frame on the basis of the weighting coefficient computed by the weight computation means, when the motion of a subject is small there is obtained a synthesized frame in which the ratio of the first interpolated frame with high definition is high, and when the motion is great there is obtained a synthesized frame including at a high ratio the second interpolated frame in which the blurring of a moving subject has been reduced. In the case where three or more frames are sampled, first and second interpolated frames corresponding to each other are synthesized to acquire intermediate synthesized frames. The intermediate synthesized frames are further combined into a synthesized frame.

Therefore, in the case where the motion of a subject in each frame is great, the blurring of a subject in the synthesized frame is reduced, and when the motion is small, high definition is obtained. In this manner, a synthesized frame with high picture quality can be obtained regardless of the motion of a subject included in each frame.

In the third and fourth synthesis methods of the present invention, when the edge information has been computed for each of the pixels that constitute each of the frames, the aforementioned weighting coefficient may be interpolated to acquire weighting coefficients for all pixels that constitute the first and second interpolated frames.

That is, the number of pixels in the first and second interpolated frames becomes greater than that of each frame by interpolation, but the weighting coefficient is computed for only the pixels of sampled frames. Because of this, by interpolating the weighting coefficients acquired for the neighboring pixels, weighing coefficients for the increased pixels may be computed. Also, the pixels increased by interpolation may be weighted and synthesized, employing the weighting coefficients acquired for the pixels that are originally present around the increased pixels.

In this case, when the aforementioned edge information has been computed for each of the pixels that constitute each of the frames, the aforementioned weighting coefficient are interpolated to acquire weighting coefficients for all pixels that constitute the first and second interpolated frames. Therefore, since the pixels increased by interpolation are also weighted and synthesized by the weighting coefficients acquired for those pixels, an image can change naturally in local areas where edge information changes.

In the third and fourth synthesis methods of the present invention, the estimation of the correspondent relationship, acquisition of the first interpolated frame, acquisition of the second interpolated frame, acquisition of the edge information, acquisition of the weighting coefficient, and acquisition of the synthesized frame may be performed by employing at least one component that constitutes the frame.

In this case, the aforementioned estimation of the correspondent relationship, acquisition of the first interpolated frame, acquisition of the second interpolated frame, acquisition of the coordinate-transformed frame, computation of the correlation value, acquisition of the weighting coefficient, and acquisition of the synthesized frame are performed, employing at least one component that constitutes the aforementioned frame. Therefore, the third and fourth synthesis methods of the present invention are capable of obtaining a synthesized frame in which picture quality degradation has been reduced for each component, and obtaining a synthesized frame of high picture quality consisting of frames synthesized for each component.

The expression "at least one component that constitutes the frame" is intended to mean, for example, at least one of RGB (red, green, and blue) components, at least one of YCC (luminance and color difference) components, etc. In the case where a frame consists of YCC components, the luminance component is preferred.

In accordance with the present invention, there is provided a third video image synthesizer. The third video image synthesizer of the present invention comprises:

sampling means for sampling two contiguous frames from a video image;

correspondent relationship estimation means for placing a reference patch comprising one or a plurality of rectangular areas on one of the two frames which is used as a reference frame, then placing on the other of the two frames a second patch which is the same as the reference patch, then moving and/or deforming the second patch in the other frame so that an image within the second patch coincides with an image within the reference patch, and estimating a correspondent relationship between a pixel within the second patch on the other frame and a pixel within the reference patch on the reference frame, based on the second patch after the movement and/or deformation and on the reference patch;

first interpolation means for acquiring a first interpolated frame whose resolution is higher than each of the frames, by performing interpolation either on the image within the second patch of the other frame or on the image within the second patch of the other frame and image within the reference patch of the reference frame, based on the correspondent relationship;

second interpolation means for acquiring a second interpolated frame whose resolution is higher than each of the frames, by performing interpolation on the image within the reference patch of the reference frame;

edge information acquisition means for acquiring edge information that represents an edge intensity of the image within the reference patch of the reference frame and/or image within the patch of the other frame;

weighting-coefficient acquisition means for acquiring a weighting coefficient that makes a weight of the first interpolated frame greater as the edge information becomes greater, when synthesizing the first interpolated frame and second interpolated frame, based on the edge information; and synthesis means for acquiring a synthesized frame by weighting and synthesizing the first and second interpolated frames, based on the weighting coefficient.

In accordance with the present invention, there is provided a fourth video image synthesizer. The fourth video image synthesizer of the present invention comprises:

sampling means for sampling three or more contiguous frames from a video image;

correspondent relationship estimation means for placing a reference patch comprising one or a plurality of rectangular areas on one of the three or more frames which is used as a reference frame, then respectively placing on the others of the three or more frames patches which are the same as the reference patch, then moving and/or deforming the patches in the other frames so that an image within the patch of each of the other frames coincides with an image within the reference patch, and respectively estimating correspondent relationships between pixels within the patches of the other frames and a pixel within the reference patch of the reference frame, based on the patches of the other frames after the movement and/or deformation and on the reference patch;

first interpolation means for acquiring a plurality of first interpolated frames whose resolution is higher than each of the frames, by performing interpolation either on the image within the patch of each of the other frames or on the image within the patch of each of the other frames and image within the reference patch of the reference frame, based on the correspondent relationships;

second interpolation means for acquiring one or a plurality of second interpolated frames whose resolution is higher than each of the frames and which are correlated with the plurality of first interpolated frames, by performing interpolation on the image within the reference patch of the reference frame;

edge information acquisition means for acquiring edge information that represents an edge intensity of the image within the reference patch of the reference frame and/or image within the patch of each of the other frames;

weighting-coefficient acquisition means for acquiring weighting coefficients that make a weight of the first interpolated frame greater as the edge information becomes greater, when synthesizing the first interpolated frame and second interpolated frame, based on the edge information; and synthesis means for acquiring intermediate synthesized frames by weighting and synthesizing the first and second interpolated frames that correspond to each other on the basis of the weighting coefficients, and acquiring a synthesized frame by synthesizing the intermediate synthesized frames.

In the third and fourth video image synthesizers of the present invention, when the aforementioned edge information has been computed for each of the pixels that constitute each of the frames, the aforementioned weighting-coefficient acquisition means may perform interpolation on the weighting coefficient, thereby acquiring weighting coefficients for all pixels that constitute the first and second interpolated frames.

In the third and fourth video image synthesizers of the present invention, the correspondent relationship estimation means, the first interpolation means, the second interpolation means, the edge information acquisition means, the weighting-coefficient acquisition means, and the synthesis means may perform the estimation of the correspondent relationship, acquisition of the first interpolated frame, acquisition of the second interpolated frame, acquisition of the edge information, acquisition of the weighting coefficient, and acquisition of the synthesized frame, by employing at least one component that constitutes the frame.

Note that the third and fourth synthesis methods of the present invention may be provided as programs to be executed by a computer.

In accordance with the present invention, there is provided a fifth video image synthesis method. The fifth synthesis method of the present invention comprises the steps of:

sampling a predetermined number of contiguous frames, which include a reference frame and are two or more frames, from a video image;

placing a reference patch comprising one or a plurality of rectangular areas on the reference frame;

respectively placing patches which are the same as the reference patch, on the others of the predetermined number of frames;

moving and/or deforming the patches in the other frames so that an image within the patch of each of the other frames approximately coincides with an image within the reference patch;

respectively acquiring correspondent relationships between pixels within the patches of the other frames and a pixel within the reference patch of the reference frame, based on the patches of the other frames after the movement and/or deformation and on the reference patch; and acquiring a synthesized frame from the predetermined number of frames, based on the correspondent relationships;

wherein the predetermined number of frames are determined based on image characteristics of the video image or synthesized frame, and the predetermined number of frames are sampled.

The image characteristics of a video image refer to characteristics that can have influence on the quality of a synthesized frame when acquiring the frame from a video image. Examples are pixel sizes and resolution of each frame, frame rates, compression ratios, etc. The image characteristics of a synthesized frame mean characteristics that can have influence on the number of frames to be sampled or the determination of the required number of frames. Examples are pixel sizes and resolution of a synthesized frame, etc. Also, the magnification ratio of the pixel size of a synthesized frame to the pixel size of the frame of a video image is the image characteristics of a video image and a synthesized frame that can have an indirect influence on the quality of synthesized frames.

In the fifth synthesis method of the present invention, the method of acquiring the aforementioned image characteristics may be any type of method if it can acquire the required image characteristics. For instance, for the image characteristics of a video image, attached information, such as a tag attached to a video image, may be read, or values input by an operator may be employed. For the image characteristics of a synthesized frame, values input by an operator may be employed, or a fixed target value may be employed.

In a preferred form of the fifth synthesis method of the present invention, the aforementioned correspondent relationships are acquired in order of the other frames closer to the reference frame, and a correlation is acquired between each of the other frames, in which the correspondent relationship is acquired, and the reference frame. When the correlation is lower than a predetermined threshold value, acquisition of the correspondent relationships is stopped, and the synthesized frame is obtained based on the correspondent relationship by employing the other frames, in which the correspondent relationship has been acquired, and the reference frame.

When the reference frame is the first one or last one of the sampled frames, the expression "in order of the other frames closer to the reference frame" is intended to mean "in order of the other frames earlier in time series than the reference frame" or "in order of the other frames later in time series than the reference frame". On the other hand, when the reference frame is not the first one or the last one, the expression "in order of the other frames closer to the reference frame" is intended to mean both "in order of the other frames earlier in time series than the reference frame" and "in order of the other frames later in time series than the reference frame."

In accordance with the present invention, there is provided a fifth video image synthesizer. The fifth video image synthesizer of the present invention comprises:

sampling means for sampling a predetermined number of contiguous frames, which include a reference frame and are two or more frames, from a video image;

correspondent relationship acquisition means for placing a reference patch comprising one or a plurality of rectangular areas on the reference frame, then respectively placing on the others of the predetermined number of frames patches which are the same as the reference patch, then moving and/or deforming the patches in the other frames so that an image within the patch of each of the other frames approximately coincides with an image within the reference patch, and respectively acquiring correspondent relationships between pixels within the patches of the other frames and a pixel within the reference patch of the reference frame, based on the patches of the other frames after the movement and/or deformation and on the reference patch; and frame synthesis means for acquiring a synthesized frame from the predetermined number of frames, based on the correspondent relationships acquired by the correspondent relationship acquisition means;

wherein the sampling means is equipped with frame-number determination means for determining the predetermined number of frames on the basis of image characteristics of the video image or synthesized frame, and samples the predetermined number of frames determined by the frame-number determination means.

In a preferred form of the fifth video image synthesizer of the present invention, the correspondent relationship acquisition means acquires the correspondent relationships in order of other frames closer to the reference frame. Also, the fifth video image synthesizer further comprises stoppage means for acquiring a correlation between each of the other frames, in which the correspondent relationship is acquired by the correspondent relationship acquisition means, and the reference frame, and stopping a process which is being performed in the correspondent relationship acquisition means when the correlation is lower than a predetermined threshold value. The frame synthesis means acquires the synthesized frame by employing the other frames, in which the correspondent relationship has been acquired, and the reference frame, based on the correspondent relationship acquired by the correspondent relationship acquisition means.

Note that the fifth synthesis method of the present invention may be provided as a program to be executed by a computer.

According to the fifth video image synthesis method and synthesizer of the present invention, when sampling a plurality of contiguous frames from a video image and acquiring a synthesized frame, the number of frames to be sampled is determined based on the image characteristics of the video image and/or synthesized frame. Therefore, the operator does not need to sample frames manually, and the video image synthesis method and synthesizer can be conveniently used. Also, by determining the number of frames on the basis of the image characteristics, a suitable number of frames can be objectively determined, so a synthesized frame with high quality can be obtained.

In the fifth video image synthesis method and synthesizer of the present invention, the frames of a determined number are sampled. The correspondent relationship between a pixel within a reference patch on the reference frame and a pixel within a patch on the succeeding frame is computed in order of other frames closer to the reference frame, and the correlation between the reference frame and the succeeding frame is obtained. If the correlation is a predetermined threshold value or greater, then a correspondent relationship with the next frame is acquired. On the other hand, if a frame whose correlation is less than the predetermined threshold value is detected, the acquisition of correspondent relationships with other frames after the detected frame is stopped, even when the number of frames does not reach the determined frame number. This can avoid acquiring a synthesized frame from a reference frame and a frame whose correlation is low (e.g., a reference frame for a scene and a frame for a switched scene), and makes it possible to acquire a synthesized frame of higher quality.

In accordance with the present invention, there is provided a sixth video image synthesis method. The sixth synthesis method of the present invention comprises the steps of:

obtaining a contiguous frame group by detecting a plurality of frames that represent contiguous scenes in a video image;

placing a reference patch comprising one or a plurality of rectangular areas on one of the plurality of frames included in the contiguous frame group which is used as a reference frame;

respectively placing patches which are the same as the reference patch, on the others of the plurality of frames;

moving and/or deforming the patches in the other frames so that an image within the patch of each of the other frames approximately coincides with an image within the reference patch;

respectively acquiring correspondent relationships between pixels within the patches of the other frames and a pixel within the reference patch of the reference frame, based on the patches of the other frames after the movement and/or deformation and on the reference patch; and acquiring a synthesized frame from the plurality of frames, based on the correspondent relationships.

The expression "contiguous scenes" is intended to mean scenes that have approximately the same contents in a video image. The expression "contiguous frame group" is intended to mean a plurality of frames that constitute one contiguous scene.

In the sixth synthesis method of the present invention, when detecting contiguous frames, a correlation between adjacent frames, which is started from the reference frame, is acquired. The contiguous frame group that is detected comprises frames ranging from the reference frame to a frame, which is closer to the reference frame, between a pair of the adjacent frames in which the correlation is lower than a predetermined first threshold value.

In the sixth synthesis method of the present invention, a histogram is computed for at least one of the Y, Cb, and Cr components of each of the adjacent frames (where the Y component is a luminance component and the Cb and Cr components are color difference components). Also, a Euclidean distance for each component between the adjacent frames is computed by employing the histogram. The sum of the Euclidean distances for the three components is computed, and when the sum is a predetermined second threshold value or greater, the correlation between the adjacent frames is lower than the predetermined first threshold value.

The expression "at least one of the Y, Cb, and Cr components" is intended to mean one, two, or three of the luminance component and color difference components. Preferred examples are only the luminance component, or a combination of the three components.

In the sixth synthesis method of the present invention, the aforementioned histogram may be computed by dividing each of components, which are used, among the three components by a value greater than 1.

The sixth synthesis method of the present invention, as a method of computing a correlation between adjacent frames, may compute a difference between pixel values of corresponding pixels of the adjacent frames for all corresponding pixels, and compute the sum of absolute values of the differences for all corresponding pixels. When the sum is a third threshold value or greater, the correlation between adjacent frames may be determined to be lower than the predetermined first threshold value.

In the sixth synthesis method of the present invention, the aforementioned correlation may be computed by employing a reduced image or thinned image of each frame.

In a preferred form of the sixth synthesis method of the present invention, the detection of frames that constitute the contiguous frame group is stopped when the number of detected frames reaches a predetermined upper limit value.

In accordance with the present invention, there is provided a sixth video imager synthesizer. The video image synthesizer of the present invention comprises:

contiguous frame group detection means for obtaining a contiguous frame group by detecting a plurality of frames that represent contiguous scenes in a video image;

correspondent relationship acquisition means for placing a reference patch comprising one or a plurality of rectangular areas on one of the plurality of frames included in the contiguous frame group which is used as a reference frame, then respectively placing on the others of the plurality of frames patches which are the same as the reference patch, then moving and/or deforming the patches in the other frames so that an image within the patch of each of the other frames approximately coincides with an image within the reference patch, and respectively acquiring correspondent relationships between pixels within the patches of the other frames and a pixel within the reference patch of the reference frame, based on the patches of the other frames after the movement and/or deformation and on the reference patch; and frame synthesis means for acquiring a synthesized frame from the plurality of frames, based on the correspondent relationships acquired by the correspondent relationship acquisition means.

In another preferred form of the sixth video image synthesizer of the present invention, the aforementioned correlation computation means computes a histogram for at least one of the Y, Cb, and Cr components of each of the adjacent frames (where the Y component is a luminance component and the Cb and Cr components are color difference components), also computes a Euclidean distance for each component between the adjacent frames by employing the histogram, and computes the sum of the Euclidean distances for the three components. When the sum is a predetermined second threshold value or greater, the aforementioned contiguous frame group detection means judges that the correlation between the adjacent frames is lower than the predetermined first threshold value.

In another preferred form of the sixth video image synthesizer of the present invention, the aforementioned correlation computation means computes a histogram for at least one of the Y, Cb, and Cr components of each of the adjacent frames (where the Y component is a luminance component and the Cb and Cr components are color difference components), also computes a Euclidean distance for each component between the adjacent frames by employing the histogram, and computes the sum of the Euclidean distances for the three components. And when the sum is a predetermined second threshold value or greater, the aforementioned contiguous frame group detection means judges that the correlation between the adjacent frames is lower than the predetermined first threshold value.

In the sixth video image synthesizer of the present invention, it is desirable the correlation computation means compute the histogram by dividing each of components, which are used, among the three components by a value greater than 1 in order to achieve expedient processing.

In the sixth video image synthesizer of the present invention, the aforementioned correlation computation means may compute a difference between pixel values of corresponding pixels of the adjacent frames and also compute the sum of absolute values of the differences for all corresponding pixels. When the sum is a third threshold value or greater, the contiguous frame group detection means may judge that the correlation between adjacent frames is lower than the predetermined first threshold value.

It is desirable that to expedite processing, the aforementioned correlation computation means in the sixth video image synthesizer of the present invention compute the aforementioned correlation by employing a reduced image or thinned image of each frame.

It is also desirable that the sixth video image synthesizer of the present invention further comprise stoppage means for stopping the detection of frames, which constitute the contiguous frame group, when the number of frames detected by the contiguous frame group detection means reaches a predetermined upper limit value.

Note that the sixth synthesis method of the present invention may be provided as a program to be executed by a computer.

According to the sixth video image synthesis method and synthesizer of the present invention, the sampling means detects a plurality of frames representing successive scenes as a contiguous frame group when acquiring a synthesized frame from a video image, and acquires the synthesized frame from this frame group. Therefore, an operator does not need to sample frames manually, and the synthesis method and video image synthesizer can be conveniently used. In addition, a plurality of frames within each contiguous frame group represent scenes that have approximately the same contents, so the synthesis method and video image synthesizer are suitable for acquiring a synthesized frame of high quality.

In the sixth video image synthesis method and synthesizer of the present invention, there is provided a predetermined upper limit value. In detecting a contiguous frame group, the detection of frames is stopped when the number of frames in that contiguous frame group reaches the predetermined upper limit value. This can avoid employing a great number of frames wastefully when acquiring one synthesized frame, and renders it possible to perform processing efficiently.

In accordance with the present invention, there is provided a seventh video image synthesis method. The seventh synthesis method of the present invention comprises the steps of:

extracting a frame group that constitutes one or more important scenes from a video image;

determining a frame, which is located at approximately a center, among a plurality of frames of the frame group as a reference frame for the important scene;

placing a reference patch comprising one or a plurality of rectangular areas on the reference frame;

respectively placing patches which are the same as the reference patch, on the others of the plurality of frames;

moving and/or deforming the patches in the other frames so that an image within the patch of each of the other frames approximately coincides with an image within the reference patch;

respectively acquiring correspondent relationships between pixels within the patches of the other frames and a pixel within the reference patch of the reference frame, based on the patches of the other frames after the movement and/or deformation and on the reference patch; and acquiring a synthesized frame from the plurality of frames, based on the correspondent relationships.

The expression "important scene" is intended to mean a scene from which a synthesized frame is obtained in a video image. For instance, when recording an image, there is a tendency to record an interesting scene for a relatively long time (e.g., a few seconds) without moving a camera, so frames having approximately the same contents for a relatively long time can be considered to be an important scene in ordinary video image data. On the other hand, in the case of a video image (security image) taken by a security camera, different scenes for a short time (e.g., scenes picking up an intruder), included in scenes of the same contents which continues for a long time, can be considered important scenes.

In accordance with the present invention, there is provided an eighth video image synthesis method. The eighth synthesis method of the present invention comprises the steps of:

extracting a frame group that constitutes one or more important scenes from the video image;

extracting high-frequency components of each of a plurality of frames constituting the frame group;

computing the sum of the high-frequency components for each of the frames;

determining a frame, in which the sum is highest, as a reference frame for the important scene;

placing a reference patch comprising one or a plurality of rectangular areas on the reference frame;

respectively placing patches which are the same as the reference patch, on the others of the plurality of frames;

moving and/or deforming the patches in the other frames so that an image within the patch of each of the other frames approximately coincides with an image within the reference patch;

respectively acquiring correspondent relationships between pixels within the patches of the other frames and a pixel within the reference patch of the reference frame, based on the patches of the other frames after the movement and/or deformation and on the reference patch; and acquiring a synthesized frame from the plurality of frames, based on the correspondent relationships.

That is, the seventh synthesis method of the present invention determines as a reference frame a frame, which is located at approximately a center, among a plurality of frames of the extracted frame group. On the other hand, the eighth synthesis method of the present invention determines as a reference frame a frame, in which the sum of high-frequency components is highest, among the extracted frames.

In the seventh and eighth synthesis methods of the present invention, when extracting the aforementioned important scenes, a correlation between adjacent frames of the video image is computed. A set of contiguous frames where the correlation is high can be extracted as the frame group that constitutes one or more important scenes.

The expression "the correlation is high" is intended to mean that the correlation is higher than a predetermined threshold value. The predetermined threshold value may be set by an operator.

As a method of computing a correlation between adjacent frames, a histogram is computed for the luminance component Y of each of the frames that constitute the aforementioned frame group. Using the histogram, a Euclidean distance between adjacent frames is computed. When the Euclidean distance is smaller than a predetermined threshold value, the correlation may be considered high. Also, a Euclidean distance for each component between the adjacent frames may be computed by employing the histogram. In this case, the sum of the Euclidean distances for the three components is computed, and when the sum is smaller than a predetermined threshold value, the correlation between the adjacent frames may be considered high. Furthermore, a difference between the pixel values of corresponding pixels of adjacent frames may be computed. In this case, the sum of the absolute values of the differences is computed, and when the sum is smaller than a predetermined threshold value, the correlation between the adjacent frames may be considered high.

When extracting the aforementioned important scenes, the seventh and eighth synthesis methods of the present invention may compute a correlation between adjacent frames of the video image; extract a set of contiguous frames where the correlation is high, as a frame group that constitutes temporary important scenes; respectively compute correlations between the temporary important scenes not adjacent; and extract a frame group, interposed between two temporary important scenes where the correlation is high and which are closest to each other, as the frame group that constitutes one or more important scenes.

The expression "correlation between the temporary important scenes" is intended to mean the correlation between frames that constitute the aforementioned temporary important scenes. Any type of correlation can be employed if it can represent the correlation between the temporary important scenes. For example, the correlations between the frames constituting one of the two temporary important scenes and the frames constituting the other of the two temporary important scenes are respectively computed, and the sum of these correlations may be employed as the correlation between two temporary important scenes. To shorten the processing time, the correlation between the representative frames of frame groups respectively constituting two temporary important scenes may be employed as the correlation between the two temporary important scenes. The representative frame for the temporary important scenes may be a frame that is located at approximately the center between the temporary important scenes.

In accordance with the present invention, there is provided a seventh video image synthesizer. The seventh video image synthesizer of the present invention comprises:

important-scene extraction means for extracting a frame group that constitutes one or more important scenes from a video image;

reference-frame determination means for determining a frame, which is located at approximately a center, among a plurality of frames of the frame group as a reference frame for the important scene;

correspondent relationship acquisition means for placing a reference patch comprising one or a plurality of rectangular areas on the reference frame, then respectively placing on the others of the plurality of frames patches which are the same as the reference patch, then moving and/or deforming the patches in the other frames so that an image within the patch of each of the other frames approximately coincides with an image within the reference patch, and respectively acquiring correspondent relationships between pixels within the patches of the other frames and a pixel within the reference patch of the reference frame, based on the patches of the other frames after the movement and/or deformation and on the reference patch; and frame synthesis means for acquiring a synthesized frame from the plurality of frames, based on the correspondent relationships.

In accordance with the present invention, there is provided an eighth video image synthesizer. The eighth video image synthesizer of the present invention comprises:

important-scene extraction means for extracting a frame group that constitutes one or more important scenes from a video image;

reference-frame determination means for extracting high-frequency components of each of a plurality of frames constituting the frame group, then computing the sum of the high-frequency components for each of the frames, and determining a frame, in which the sum is highest, as a reference frame for the important scene;

correspondent relationship acquisition means for placing a reference patch comprising one or a plurality of rectangular areas on the reference frame, then respectively placing on the others of the plurality of frames patches which are the same as the reference patch, then moving and/or deforming the patches in the other frames so that an image within the patch of each of the other frames approximately coincides with an image within the reference patch, and respectively acquiring correspondent relationships between pixels within the patches of the other frames and a pixel within the reference patch of the reference frame, based on the patches of the other frames after the movement and/or deformation and on the reference patch; and frame synthesis means for acquiring a synthesized frame from the plurality of frames, based on the correspondent relationships.

In the seventh and eighth video image synthesizers of the present invention, the aforementioned important-scene extraction means is equipped with correlation computation means for computing a correlation between adjacent frames of the video image, and extracts a set of contiguous frames, in which the correlation computed by the correlation computation means is high, as the frame group that constitutes one or more important scenes. Note that this important scene extraction means is called first important scene extraction means.

In the seventh and eighth video image synthesizers of the present invention, the important-scene extraction means may comprise:

first correlation computation means for computing a correlation between adjacent frames of the video image;

temporary important scene extraction means for extracting a set of contiguous frames, in which the correlation computed by the first correlation computation means is high, as a frame group that constitutes temporary important scenes; and second correlation computation means for respectively computing correlations between the temporary important scenes not adjacent.

Also, the important-scene extraction means may extract a frame group, interposed between two temporary important scenes where the correlation computed by the second correlation commutation means is high and which are closest to each other, as the frame group that constitutes one or more important scenes.

Note that this important scene extraction means is called second important scene extraction means.

In accordance with the present invention, there is provided a ninth video image synthesizer. The important-scene extraction means in the ninth video image synthesizer of the present invention comprises the first important-scene extraction means of the seventh video image synthesizer and the second important-scene extraction means of the eighth video image synthesizer. The ninth video image synthesizer further includes selection means for selecting either the first important-scene extraction means or the second important-scene extraction means.

Note that the seventh and eighth synthesis methods of the present invention may be provided as programs to be executed by a computer.

According to the seventh and eighth synthesis methods of the present invention, the sampling means extracts frame groups constituting an important scene from a video image, and determines the center frame of a plurality of frames constituting each frame group or a frame that is most in focus, as the reference frame of the frame group. Therefore, the operator does not need to set a reference frame manually, and the seventh and eighth video image synthesizer can be conveniently used. In sampling a plurality of frames, unlike a method of setting a reference frame and then sampling frames in a range including the reference frame, frames constituting an important scene included in video image data are extracted and then a reference frame is determined so that a synthesized frame is obtained for each important scene. Thus, the intention of an photographer can be reflected.

In accordance with the present invention, there is provided a method of acquiring a processed frame by performing image processing on a desired frame sampled from a video image. The image processing method of the present invention comprises the steps of:

computing a similarity between the desired frame and at least one frame which is temporally before and after the desired frame; and acquiring the processed frame by obtaining a weighting coefficient that becomes greater if the similarity becomes greater, then weighting the at least one frame with the weighting coefficient, and synthesizing the weighted frame and the desired frame.

The "synthesizing" can be performed, for example, by weighted addition.

To enhance picture quality when outputting some of the frames constituting a video image as prints, Japanese Unexamined Patent Publication No. 2000-354244 discloses a method of sampling a plurality of frames from a video image and acquiring a synthesized frame whose resolution is higher than the sampled frames.

This method obtains a motion vector that represents the moving direction and moved quantity between one frame and another frame and, based on the motion vector, computes a signal value that is interpolated between pixels when synthesizing a high-resolution frame from a plurality of frames. Particularly, this method partitions each frame into a plurality of blocks, computes an orthogonal coordinate coefficient for blocks corresponding between frames, and synthesizes information about a high-frequency wave in this orthogonal coordinate coefficient and information about a low-frequency wave in another block to compute a pixel value that is interpolated. Therefore, this method is able to obtain a synthesized frame with high picture quality without reducing the required information. Also, in this method, the motion vector is computed with resolution finer than a distance between pixels, so a high-frequency frame with higher picture quality can be obtained by accurately compensating for the motion between frames.

The present invention may obtain processed image data by synthesizing at least one frame and a desired frame by the method disclosed in the aforementioned publication No. 2000-354244.

In the image processing method of the present invention, the desired frame may be partitioned into a plurality of areas. Also, the similarity may be computed for each of corresponding areas in at least one frame which correspond to the plurality of areas. The processed frame may be acquired by obtaining weighting coefficients that become greater if the similarity becomes greater, then weighting the corresponding areas of the at least one frame with the weighting coefficients, and synthesizing the weighted areas and the plurality of areas.

In the image processing method of the present invention, the desired frame may be partitioned into a plurality of subject areas that are included in the desired frame; the similarity may be computed for each of corresponding subject areas in at least one frame which correspond to the plurality of subject areas; and the processed frame may be acquired by obtaining weighting coefficients that become greater if the similarity becomes greater, then weighting the corresponding subject areas of the at least one frame with the weighting coefficients, and synthesizing the weighted subject areas and the plurality of subject areas.

In accordance with the present invention, there is provided an image processor for acquiring a processed frame by performing image processing on a desired frame sampled from a video image. The image processor of the present invention comprises:

similarity computation means for computing a similarity between the desired frame and at least one frame which is temporally before and after the desired frame; and synthesis means for acquiring the processed frame by obtaining a weighting coefficient that becomes greater if the similarity becomes greater, then weighting the at least one frame with the weighting coefficient, and synthesizing the weighted frame and the desired frame.

In the image processor of the present invention, the aforementioned similarity computation means may partition the desired frame into a plurality of areas and compute the similarity for each of corresponding areas in at least one frame which correspond to the plurality of areas, and the aforementioned synthesis means may acquire the processed frame by obtaining weighting coefficients that become greater if the similarity becomes greater, then weighting the corresponding areas of the at least one frame with the weighting coefficients, and synthesizing the weighted areas and the plurality of areas.

Also, in the image processor of the present invention, the aforementioned similarity computation means may partition the desired frame into a plurality of subject areas that are included in the desired frame and compute the similarity for each of corresponding subject areas in at least one frame which correspond to the plurality of subject areas, and the aforementioned synthesis means may acquire the processed frame by obtaining weighting coefficients that become greater if the similarity becomes greater, then weighting the corresponding subject areas of the at least one frame with the weighting coefficients, and synthesizing the weighted subject areas and the plurality of subject areas.

Note that the image processing method of the present invention may be provided as a program to be executed by a computer.

There is a method of reducing image blurring by synthesizing a plurality of images that have the same scene. Therefore, if a plurality of frames are sampled from a video image and synthesized, a synthesized frame can have high picture quality. However, if a plurality of frames are merely synthesized, the picture quality of the synthesized frame will be degraded because a subject in a video image is in motion.

The image processing method and image processor of the present invention compute a similarity between a desired frame and at least one frame which is temporally before and after the desired frame, and acquire a processed frame by obtaining a weighting coefficient that becomes greater if the similarity becomes greater, then weighting the at least one frame with the weighting coefficient, and synthesizing the weighted frame and the desired frame.

Therefore, there is no possibility that a dissimilar frame, as it is, will be added to a desired frame. This can reduce the influence of dissimilar frames. Consequently, a processed frame with high picture quality can be obtained while reducing blurring that is caused by synthesis of frames whose similarity is low.

According to the image processing method and image processor of the present invention, the desired frame is partitioned into a plurality of areas. Also, the similarity is computed for each of corresponding areas in at least one frame which correspond to the plurality of areas. The processed frame is acquired by obtaining weighting coefficients that become greater if the similarity becomes greater, then weighting the corresponding areas of the at least one frame with the weighting coefficients, and synthesizing the weighted areas and the plurality of areas. Therefore, even when a certain area in a video image is moved, blurring can be removed for each area. Thus, a processed frame with higher picture quality can be obtained.

Also, the desired frame is partitioned into a plurality of subject areas that are included in the desired frame. The similarity is computed for each of corresponding subject areas in at least one frame which correspond to the plurality of subject areas. The processed frame is acquired by obtaining weighting coefficients that become greater if the similarity becomes greater, then weighting the corresponding subject areas of the at least one frame with the weighting coefficients, and synthesizing the weighted subject areas and the plurality of subject areas. Therefore, even when a certain subject area in a video image is in motion, blurring can be removed for each subject area. Thus, a processed frame with higher picture quality can be obtained.

BRIEF DESCRIPTION OF THE DRAWINGS

The present invention will be described in further detail with reference to the accompanying drawings wherein:

FIG. 24 is a flowchart showing processes that are performed in the fifth embodiment;

FIG. 25 is a schematic block diagram showing a video image synthesizer constructed in accordance with a sixth embodiment of the present invention;

FIG. 26 is a block diagram showing the construction of the sampling means of the video image synthesizer constructed in accordance with the sixth embodiment;

FIG. 33 is a diagram to explain the computation of similarities in the eighth embodiment;

FIGS. 34A and 34B are diagrams to explain the contributory degree of a frame to a pixel value;

FIG. 35 is a flowchart showing processes that are performed in the eighth embodiment;

FIG. 43 is a flowchart showing processes that are performed in the tenth embodiment.

DESCRIPTION OF THE PREFERRED EMBODIMENTS

Embodiments of the present invention will hereinafter be described in detail with reference to the drawings.

Figure 1:
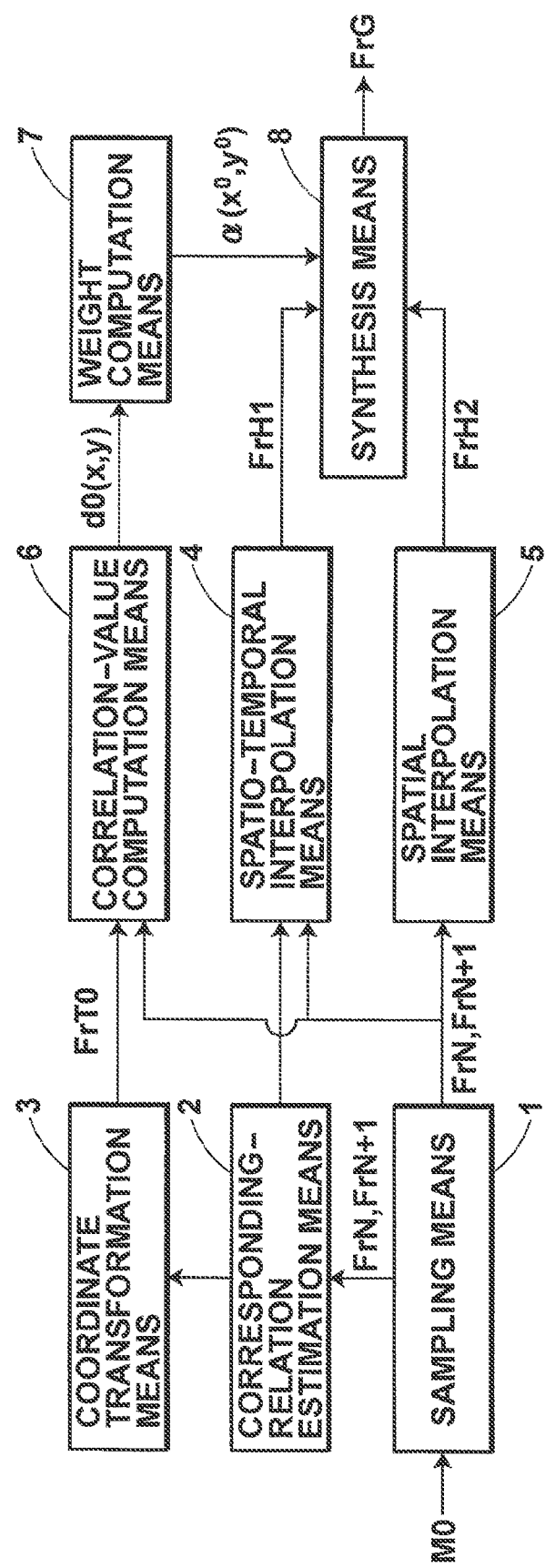
FIG. 1 is a schematic block diagram showing a video image synthesizer constructed in accordance with a first embodiment of the present invention.

FIG. 1 shows a video image synthesizer constructed in accordance with a first embodiment of the present invention. As illustrated in the figure, the video image synthesizer is equipped with sampling means 1 for sampling a plurality of frames from input video image data M0; correspondent relationship estimation means 2 for estimating a correspondent relationship between a pixel in a reference frame and a pixel in each frame other than the reference frame; coordinate transformation means 3 for obtaining a coordinate-transformed frame $Fr_{T0}$ by transforming the coordinates of each frame (other than the reference frame) to the coordinate space of the reference frame on the basis of the correspondent relationship estimated in the correspondent relationship estimation means 2; and spatio-temporal interpolation means 4 for obtaining a first interpolated frame $Fr_{H1}$ whose resolution is higher than each frame by interpolating each frame on the basis of the correspondent relationship estimated in the correspondent relationship estimation means 2. The video image synthesizer is further equipped with spatial interpolation means 5 for obtaining a second interpolated frame $Fr_{H2}$ whose resolution is higher than each frame by interpolating the reference frame; correlation-value computation means 6 for computing a correlation value that represents a correlation between the coordinate-transformed frame $Fr_{T0}$ and the reference frame; weighting-coefficient computation means 7 for computing a weighting coefficient that is used in weighting the first interpolated frame $Fr_{H1}$ and the second interpolated frame $Fr_{H2}$, on the basis of the correlation value computed in the correlation-value computation means 6; and synthesis means 8 for acquiring a synthesized frame $Fr_G$ by weighting the first interpolated frame $Fr_{H1}$ and the second interpolated frame $Fr_{H2}$ on the basis of the weighting coefficient computed by the weighting-coefficient computation means 7. In the first embodiment, it is assumed that the number of pixels in the longitudinal direction of the synthesized frame $Fr_G$ and the number of pixels in the transverse direction are twice those of a sampled frame, respectively. In the following description, while the numbers of pixels in the longitudinal and transverse directions of the synthesized frame $Fr_G$ are respectively double those of a sampled frame, they may be n times (where n is a positive number), respectively.

The sampling means 1 is used to sample a plurality of frames from video image data M0, but in the first embodiment two frames $Fr_N$ and $Fr_{N+1}$ are sampled from the video image data M0. It is assumed that the frame $Fr_N$ is a reference frame. The video image data M0 represents a color video image, and each of the frames $Fr_N$ and $Fr_{N+1}$ consists of a luminance (monochrome brightness) component (Y) and two color difference components (Cb and Cr). In the following description, processes are performed on the three components, but are the same for each component. Therefore, in the first embodiment, a detailed description will be given of processes that are performed on the luminance component Y, and a description of processes that are performed on the color difference components Cb and Cr will not be made.

The correspondent relationship estimation means 2 estimates a correspondent relationship between the reference frame $Fr_N$ and the succeeding frame $Fr_{N+1}$ in the following manner. FIGS. 2A to 2D are diagrams for explaining the estimation of a correspondent relationship between the reference frame $Fr_N$ and the succeeding frame $Fr_{N+1}$. It is assumed that in the figures, a circular subject within the reference frame $Fr_N$ has been slightly moved rightward in the succeeding frame $Fr_{N+1}$.

Figure 2A:
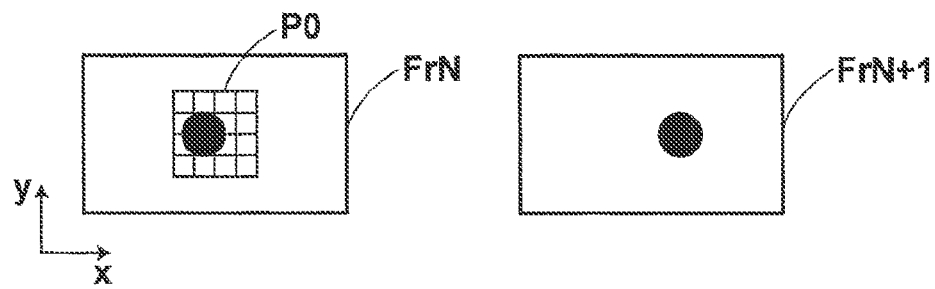
FIGS. 2A to 2D are diagrams for explaining the estimation of a correspondent relationship between frames $Fr_N$ and $Fr_{N+1}$.
Figure 2B:
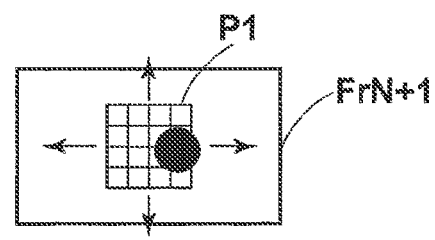

First, the correspondent relationship estimation means 2 places a reference patch P0 consisting of one or a plurality of rectangular areas on the reference frame $Fr_N$. FIG. 2A shows the state in which the reference patch P0 is placed on the reference frame $Fr_N$. As illustrated in the figure, in the first embodiment, the reference patch P0 consists of sixteen rectangular areas, arranged in a 4×4 format. Next, as illustrated in FIG. 2B, the same patch P1 as the reference patch P0 is placed at a suitable position on the succeeding frame $Fr_{N+1}$, and a correlation value, which represents a correlation between an image within the reference patch P0 and an image within the patch P1, is computed. Note that the correlation value can be computed as a mean square error by the following Formula 1. As shown in FIG. 2A, the x axis extends along the horizontal axis and the y axis extends along the vertical direction.

$$E = \frac{1}{N} \sum_i^N (pi - qi)^2 \qquad (1)$$

in which

E=correlation value, pi and qi=pixel values of corresponding pixels within the reference patch P0 and the patch P1, N=number of pixels within the reference patch P0 and the patch P1.

Next, the patch P1 on the succeeding frame $Fr_{N+1}$ is moved in the four directions (up, down, right, and left directions) by constant pixel quantities $\pm \Delta x$ and $\pm \Delta y$, and then a correlation value between an image within the patch P1 and an image within the reference patch P0 within the reference frame $Fr_N$ is computed. Correlation values are respectively computed in the up, down, right, and left directions and obtained as E ($\Delta x$, 0), E ($-\Delta x$, 0), E (0, $\Delta y$), and E (0, $-\Delta y$).

Figure 2C:
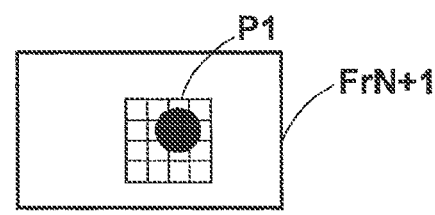

From the four correlation values E ($\Delta x$, 0), E ($-\Delta x$, 0), E (0, $\Delta y$), and E (0, $-\Delta y$) after movement, a gradient direction in which a correlation value becomes smaller (i.e., a gradient direction in which a correlation becomes greater) is obtained as a correlation gradient, and as shown in FIG. 2C, the patch P1 is moved in that direction by a predetermined quantity equal to m times (where m is a real number). More specifically, coefficients C($\Delta x$, 0), C($-\Delta x$, 0), C(0, $\Delta y$), and C(0, $-\Delta y$) are computed by the following Formula 2, and from these coefficients, correlation gradients $g_x$ and $g_y$ are computed by the following Formulas 3 and 4.

$$c(\Delta x, \Delta y) = \sqrt{E(\Delta x, \Delta y)}/255 \quad (2)$$

$$gx = \frac{c(\Delta x, 0) - c(-\Delta x, 0)}{2} \quad (3)$$

$$gy = \frac{c(0, \Delta y) - c(0, \Delta y)}{2} \quad (4)$$

Figure 2D:
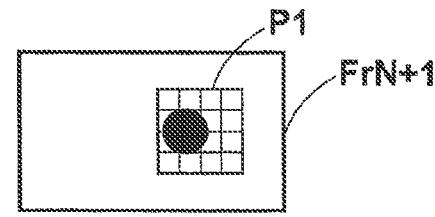

Based on the computed correlation gradients $g_x$ and $g_y$, the patch P1 is moved by ($-\lambda 1 g_x$, $-\lambda 1 g_y$), and by repeating the aforementioned processes, the patch P1 is iteratively moved until it converges at a certain position, as shown in FIG. 2D. The parameter $\lambda 1$ is used to determine the speed of convergence and is represented by a real number. If the value of $\lambda 1$ is too great, then a solution will diverge due to the iteration process and therefore it is necessary to choose a suitable value (e.g., 10).

Figure 3:
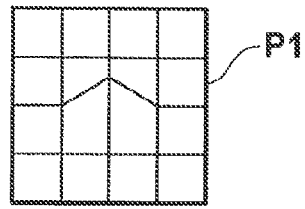
FIG. 3 is a diagram for explaining the deformation of patches.

Further, a lattice point in the patch P1 is moved in the 4 directions along the coordinate axes by constant pixel quantities. When this occurs, a rectangular area containing the moved lattice point is deformed as shown in FIG. 3, for example. Correlation values between the deformed rectangular area and the corresponding rectangular area of the reference patch P0 are computed. These correlation values are assumed to be E1 ($\Delta x$, 0), E1 ($-\Delta x$, 0), E1 (0, $\Delta y$), and E1 (0, $-\Delta y$).

As with the aforementioned case, from the 4 correlation values E1 ($\Delta x$, 0), E1 ($-\Delta x$, 0), E1 (0, $\Delta y$), and E1 (0, $-\Delta y$) after deformation, a gradient direction in which a correlation value becomes smaller (i.e., a gradient direction in which a correlation becomes greater) is obtained as a correlation gradient, and a lattice point in the patch P1 is moved in that direction by a predetermined quantity equal to m times (where m is a real number). This is performed on all the lattice points of the patch P1 and referred to as a single processing. This processing is repeatedly performed until the coordinates of the lattice points converge.

In this manner, the moved quantity and deformed quantity of the patch P1 with respect to the reference patch P0 are computed, and based on these quantities, a correspondent relationship between a pixel within the reference patch P0 of the reference frame $Fr_N$ and a pixel within the patch P1 of the succeeding frame $Fr_{N+1}$ can be estimated.

The coordinate transformation means 3 transforms the coordinates of the succeeding frame $Fr_{N+1}$ to the coordinate space of the reference frame $Fr_N$ and obtains a coordinate-transformed frame $Fr_{T0}$, as described below. In the following description, transformation, interpolation, and synthesis are performed only on the areas within the reference patch P0 of the reference frame $Fr_N$ and areas within the patch P1 of the succeeding frame $Fr_{N+1}$.

In the first embodiment, the coordinate transformation is performed employing bilinear transformation. The coordinate transformation by bilinear transformation is defined by the following Formulas 5 and 6.

$$x=(1-u)(1-v)x1+(1-v)ux2+(1-u)vx3+uvx4 \quad (5)$$

$$y=(1-u)(1-v)y1+(1-v)uy2+(1-u)vy3+uvy4 \quad (6)$$

Using Formulas 5 and 6, the coordinates within the patch P1 represented by 4 points (xn, yn) ($1 \leq n \leq 4$) at two-dimensional coordinates are interpolated by a normalized coordinate system (u, v) ($0 \leq u$, $v \leq 1$). The coordinate transformation within two arbitrary rectangles can be performed by combining Formulas 5 and 6 and inverse transformation of Formulas 5 and 6.

Figure 4:
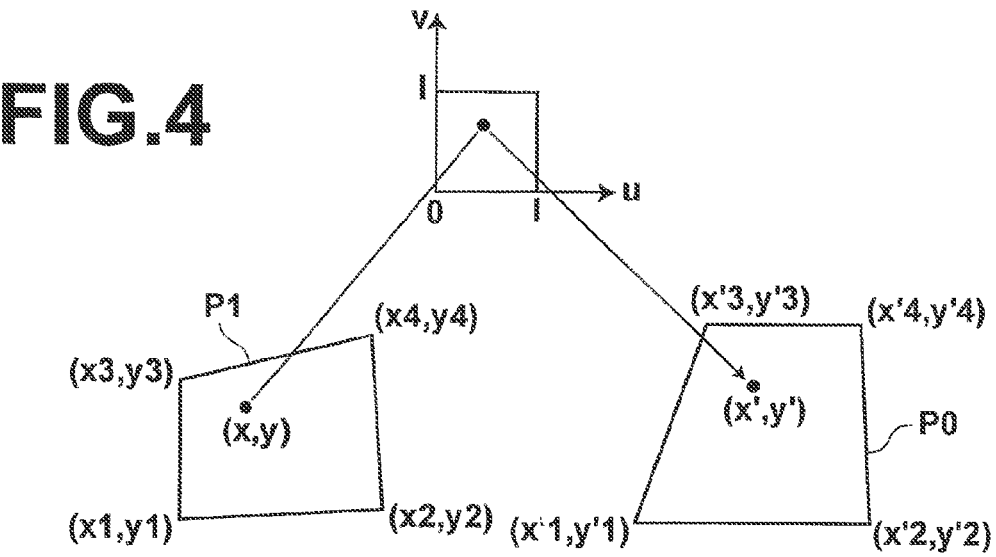
FIG. 4 is a diagram for explaining a correspondent relationship between a patch P1 and a reference patch P0.

Now, consider how a point (x, y) within the patch P1 (xn, yn) corresponds to a point (x', y') within the reference patch P0 (x'n, y'n), as illustrated in FIG. 4. First, a point (x, y) within the patch P1 (xn, yn) is transformed to normalized coordinates (u, v), which are computed by inverse transformation of Formulas 5 and 6. Based on the reference patch P0 (x'n, y'n) corresponding to the normalized coordinates (u, v), coordinates (x', y') corresponding to the point (x, y) are computed by Formulas 5 and 6. The coordinates of a point (x, y) are integer coordinates where pixel values are originally present, but there are cases where the coordinates of a point (x', y') become real coordinates where no pixel value is present. Therefore, pixel values at integer coordinates after transformation are computed as the sum of the weighted pixel values of coordinates (x', y'), transformed within an area that is surrounded by 8 neighboring integer coordinates adjacent to integer coordinates in the reference patch P0.

Figure 5:
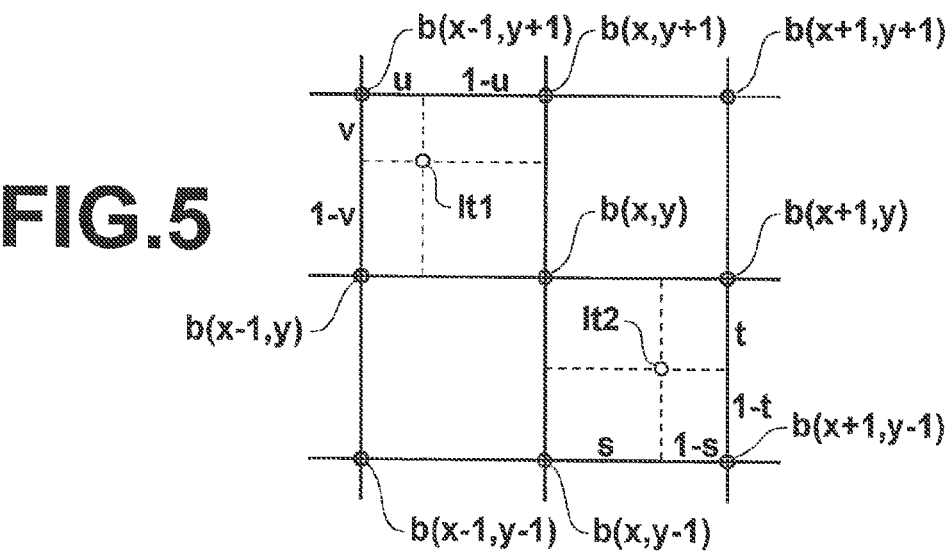
FIG. 5 is a diagram for explaining bilinear interpolation.

More specifically, integer coordinates b (x, y) in the reference patch P0, as shown in FIG. 5, are computed based on pixel values in the succeeding frame $Fr_{N+1}$, transformed within an area that is surrounded by the 8 neighboring integer coordinates b(x−1, y−1), b(x, y−1), b(x+1, y−1), b(x−1, y), b(x+1, y), b(x−1, y+1), b(x, y+1), and b(x+1, y+1). If m pixel values in the succeeding frame $Fr_{N+1}$ are transformed within an area that is surrounded by 8 neighboring pixels, and the pixel value of each pixel transformed is represented by $I_{tj}(x°, y°)$ ($1 \leq j \leq m$), then a pixel value $I_t(x\hat{}, y\hat{})$ at integer coordinates b (x, y) can be computed by the following Formula 7. Note that $\phi$ in Formula 7 is a function representing the sum of weighted values.

$$I_t(x\hat{}, y\hat{}) = \phi(I_{tj}(x°, y°)) \quad (7)$$

$$= \frac{\left\{\begin{array}{c}(W_1 \times I_{t1}(x°, y°) + \\ (W_2 \times I_{t2}(x°, y°) + \ldots + \\ (W_m \times I_{tm}(x°, y°))\end{array}\right\}}{(W_1 + W_2 + \ldots + W_k)}$$

$$= \frac{\sum_{j=1}^{m} W_i \times I_{tj}(x°, y°)}{\sum_{j=1}^{m} W_i}$$

in which

Wi ($1 \leq j \leq m$)=product of coordinate interior division ratios viewed from neighboring integer pixels at a position where a pixel value $I_{tj}(x°, y°)$ is assigned.

For simplicity, consider the case where two pixel values $I_{t1}$ and $I_{t2}$ in the succeeding frame $Fr_{N+1}$ are transformed within an area surrounded by 8 neighboring pixels, employing FIG. 5. A pixel value $I_t(x\hat{}, y\hat{})$ at integer coordinates b (x, y) can be computed by the following Formula 8.

$$I_t(x\hat{}, y\hat{})=1/(W1+W2)=(W1 \times I_{t1}+W2 \times I_{t2}) \quad (8)$$

in which

W1=u×v, and

W2=(1−s)×(1−t).

By performing the aforementioned processing on all pixels within the patch P1, an image within the patch P1 is transformed to a coordinate space in the reference frame $Fr_N$, whereby a coordinate-transformed frame $Fr_{T0}$ is obtained.

Figure 6:
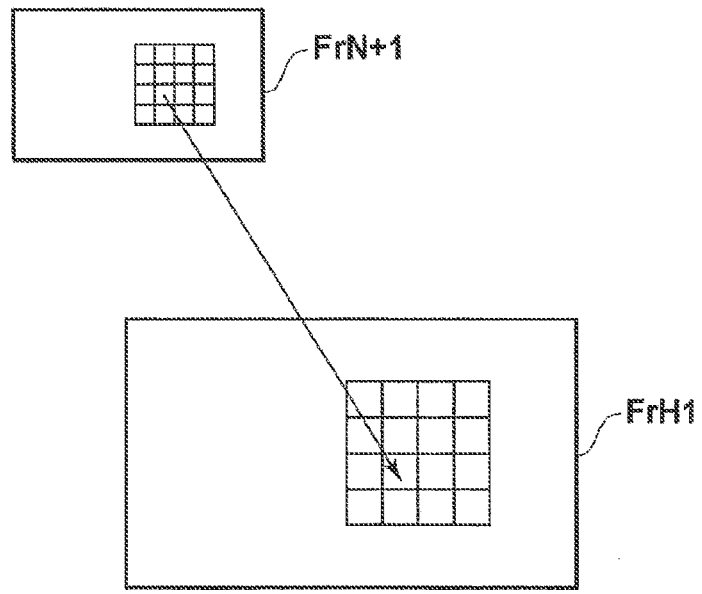
FIG. 6 is a diagram for explaining the assignment of frame $Fr_{N+1}$ to a synthesized image.

The spatio-temporal interpolation means 4 interpolates the succeeding frame $Fr_{N+1}$ and obtains a first interpolated frame $Fr_{H1}$. More specifically, a synthesized image with the finally required number of pixels is first prepared as shown in FIG. 6. (In the first embodiment, the numbers of pixels in the longitudinal and transverse directions of a synthesized image are respectively double those of the sampled frame $Fr_N$ or $Fr_{N+1}$, but they may be n times the number of pixels (wherein n is a positive number), respectively.) Then, based on the correspondent relationship obtained by the correspondent relationship estimation means 2, the pixel values of pixels in the succeeding frame $Fr_{N+1}$ (areas within the patch P1) are assigned to the synthesized image. If a function for performing this assignment is represented by H, the pixel value of each pixel in the succeeding frame $Fr_{N+1}$ is assigned to the synthesized image by the following Formula 9.

$$I_{1N+1}(x°,y°)=\Pi(Fr_{N+1}(x,y)) \quad (9)$$

in which $I_{1N+1}(x°, y°)$=pixel value in the succeeding frame $Fr_{N+1}$, assigned to the synthesized image, $Fr_{N+1}(x, y)$=pixel value in the succeeding frame $Fr_{N+1}$.

Thus, by assigning the pixel values in the succeeding frame $Fr_{N+1}$ to the synthesized image, a pixel value $I_{1N+1}(x°, y°)$ is obtained and the first interpolated frame $Fr_{H1}$ with a pixel value $I_1(x, y)$ ($=I_{1N+1}(x°, y°)$) for each pixel is obtained.

In assigning pixel values to a synthesized image, there are cases where each pixel in the succeeding frame $Fr_{N+1}$ does not correspond to the integer coordinates (i.e., coordinates in which pixel values should be present) of the synthesized image, depending on the relationship between the number of pixels in the synthesized image and the number of pixels in the succeeding frame $Fr_{N+1}$. In the first embodiment, pixel values at the integer coordinates of a synthesized image are computed at the time of synthesis, as described later. But, to make a description at the time of synthesis easier, the computation of pixel values at the integer coordinates of a synthesized image will hereinafter be described.

The pixel values at the integer coordinates of a synthesized image are computed as the sum of the weighted pixel values of pixels in the succeeding frame $Fr_{N+1}$, assigned within an area that is surrounded by 8 neighboring integer coordinates adjacent to the integer coordinates of the synthesized image.

Figure 7:
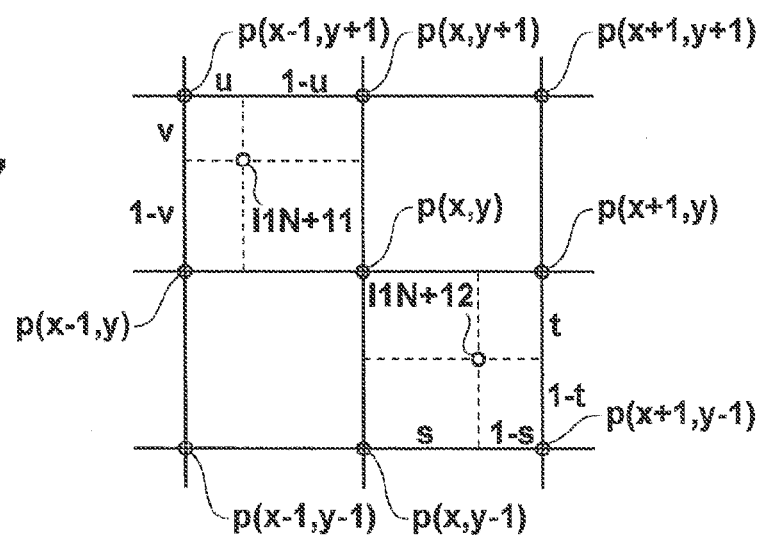
FIG. 7 is a diagram for explaining the computation of pixel values, represented by integer coordinates, in a synthesized image.

More specifically, integer coordinates p(x, y) in a synthesized image, as shown in FIG. 7, are computed based on pixel values in the succeeding frame $Fr_{N+1}$, assigned within an area that is surrounded by the 8 neighboring integer coordinates p(x−1, y−1), p(x, y−1), p(x+1, y−1), p(x−1, y), p(x+1, y), p(x−1, y+1), p(x, y+1), and p(x+1, y+1). If k pixel values in the succeeding frame $Fr_{N+1}$ are assigned within an area that is surrounded by 8 neighboring pixels, and the pixel value of each pixel assigned is represented by $I_{1N+1i}(x°, y°)(1 \le i \le k)$, then a pixel value $I_{1N+1}(x^\wedge, y^\wedge)$ at integer coordinates p (x, y) can be computed by the following Formula 10. Note that φ in Formula 10 is a function representing the sum of weighted values.

$$I_{1N+1}(x^\wedge, y^\wedge) = \phi(I_{1N+1}(x°, y°)) \quad (10)$$

$$= \frac{\begin{Bmatrix} (M_1 \times I_{1N+11}(x°, y°) + \\ (M_2 \times I_{1N+12}(x°, y°) + \ldots + \\ (Mk \times I_{1N+1k}(x°, y°)) \end{Bmatrix}}{(M_1 + M_2 + \ldots + M_k)}$$

$$= \frac{\sum_{i=1}^{k} M_i \times I_{1N+1}iM(x°, y°)}{\sum_{i=1}^{k} M_i}$$

in which $M_i$ ($1 \le i \le k$)=product of coordinate interior division ratios viewed from neighboring integer pixels at a position where a pixel value $I_{1N+1i}(x°, y°)$ is assigned.

For simplicity, consider the case where two pixel values $I_{1N+11}$ and $I_{1N+12}$ in the succeeding frame $Fr_{N+1}$ are assigned within an area surrounded by 8 neighboring pixels, employing FIG. 7. A pixel value $I_{1N+1}(x^\wedge, y^\wedge)$ at integer coordinates p(x, y) can be computed by the following Formula 11.

$$I_{1N+1}(x^\wedge,y^\wedge)=1/(M1+M2)=(M1 \times I_{1N+11}+M2 \times I_{1N+12}) \quad (11)$$

in which

M1=u×v, and

M2=(1−s)×(1−t).

By assigning a pixel value in the succeeding frame FrN+1 to all integer coordinates of a synthesized image, a pixel value I1N+1($x^\wedge$, $y^\wedge$) can be obtained. In this case, each pixel value I1($x^\wedge$, $y^\wedge$) in the first interpolated frame FrH1 becomes I1N+1($x^\wedge$, $y^\wedge$).

While the first interpolated frame $Fr_{H1}$ is obtained by interpolating the succeeding frame $Fr_{N+1}$, the first interpolated frame $Fr_{H1}$ may be obtained employing the reference frame $Fr_N$ as well as the succeeding frame $Fr_{N+1}$. In this case, pixels in the reference frame $Fr_N$ are interpolated and directly assigned to integer coordinates of a synthesized image.

The spatial interpolation means 5 obtains a second interpolated frame $Fr_{H2}$ by performing interpolation, in which pixel values are assigned to coordinates (real coordinates (x°, y°)) to which pixels in the succeeding frame $Fr_{N+1}$ on a synthesized image are assigned, on the reference frame $Fr_N$. Assuming a pixel value at the real coordinates of the second interpolated frame $Fr_{H2}$ is $I_2(x°, y°)$, the pixel value $I_2(x°, y°)$ is computed by the following Formula 12.

$$I_2(x°,y°)=f(Fr_N(x,y)) \quad (12)$$

where f is an interpolation function.

Note that the aforementioned interpolation can employ linear interpolation, spline interpolation, etc.

In the first embodiment, the numbers of pixels in longitudinal and transverse directions of a synthesized frame are two times those of the reference frame $Fr_N$, respectively. Therefore, by interpolating the reference frame $Fr_N$ so that the numbers of pixels in the longitudinal and transverse directions double, a second interpolated frame $Fr_{H2}$ with a number of pixels corresponding to the number of pixels of a synthesized image may be obtained. In this case, a pixel value to be obtained by interpolation is a pixel value at integer coordinates in a synthesized image, so if this pixel value is $I_2(x^\wedge, y^\wedge)$, the pixel value $I_2(x^\wedge, y^\wedge)$ is computed by the following Formula 13.

$$I_2(x^\wedge,y^\wedge)=f(Fr_N(x,y)) \quad (13)$$

The correlation-value computation means 6 computes a correlation value d0(x, y) between corresponding pixels of a coordinate-transformed frame $Fr_{T0}$ and reference frame $Fr_N$. More specifically, as indicated in the following Formula 14, the absolute value of a difference between the pixel values $Fr_{T0}$ (x, y) and $Fr_N$(x, y) of corresponding pixels of the coordinate-transformed frame $Fr_{T0}$ and reference frame $Fr_N$ is computed as the correlation value d0(x, y). Note that the correlation value d0(x, y) becomes a smaller value if the correlation between the coordinate-transformed frame $Fr_{T0}$ and the reference frame $Fr_N$ becomes greater.

$$d0(x,y)=|Fr_{T0}(x,y)-Fr_N(x,y)| \qquad (14)$$

In the first embodiment, the absolute value of a difference between the pixel values $Fr_{T0}$ (x, y) and $Fr_N$ (x, y) of corresponding pixels of the coordinate-transformed frame $Fr_{T0}$ and reference frame $Fr_N$ is computed as the correlation value d0(x, y). Alternatively, the square of the difference may be computed as the correlation value. Also, while the correlation value is computed for each pixel, it may be obtained for each area by partitioning the coordinate-transformed frame $Fr_{T0}$ and reference frame $Fr_N$ into a plurality of areas and then computing the average or sum of all pixel values within each area. In addition, by computing the average or sum of the correlation values d0(x, y) computed for the entire frame, the correlation value may be obtained for each frame. Further, by respectively computing histograms for the coordinate-transformed frame $Fr_{T0}$ and the reference frame $Fr_N$, the average value, median value, or standard-deviation difference value of the histograms for the coordinate-transformed frame $Fr_{T0}$ and reference frame $Fr_N$, or the accumulation of histogram difference values, may be employed as the correlation value. Moreover, by computing for each pixel or each small area a motion vector that represents the motion of the coordinate-transformed frame $Fr_{T0}$ with respect to the reference frame $Fr_N$, the average value, median value, or standard deviation of computed motion vectors may be employed as the correlation value, or the histogram accumulation of motion vectors may be employed as the correlation value.

The weighting-coefficient computation means 7 acquires a weighting coefficient α(x, y) that is used in weighting the first interpolated frame $Fr_{H1}$ and second interpolated frame $Fr_{H2}$, from the correlation value d0(x, y) computed by the correlation-value computation means 6. More specifically, the weighting-coefficient computation means 7 acquires a weighting coefficient α(x, y) by referring to a graph shown in FIG. 8. As illustrated in the figure, if the correlation value d0(x, y) becomes smaller, that is, if the correlation between the coordinate-transformed frame $Fr_{T0}$ and the reference frame $Fr_N$ becomes greater, the value of the weighting coefficient α(x, y) becomes closer to zero. Note that the correlation value d0(x, y) is represented by a 8-bit value.

Further, the weighting-coefficient computation means 7 computes a weighting coefficient α(x°, y°) at coordinates (real coordinates) to which pixels in the succeeding frame $Fr_{N+1}$ are assigned, by assigning the weighting coefficient α(x, y) to a synthesized image, as in the case where pixels in the succeeding frame $Fr_{N+1}$ are assigned to a synthesized image. More specifically, as with the interpolation performed by the spatial interpolation means 5, the weighting coefficient α(x°, y°) is acquired by performing interpolation, in which pixel values are assigned to coordinates (real coordinates (x°, y°)) to which pixels in the succeeding frame $Fr_{N+1}$ on a synthesized image are assigned, on the weighting coefficient α(x, y).

By enlarging or equally multiplying the reference frame $Fr_N$ so that it becomes equal to the size of a synthesized image to acquire an enlarged or equally-multiplied reference frame, without computing the weighting coefficient α(x°, y°) at the real coordinates in a synthesized image by interpolation, a weighting coefficient α(x, y), acquired for a pixel of the enlarged or equally-multiplied reference frame that is closest to real coordinates to which the pixels of the succeeding frame $Fr_{N+1}$ in the synthesized image are assigned, may be employed as the weighting coefficient α(x°, y°) at the real coordinates.

Further, in the case where pixel values $I_1(x\hat{}, y\hat{})$ and $I_2(x\hat{}, y\hat{})$ at integer coordinates in a synthesized image have been acquired, a weighting coefficient α(x^, y^) at the integer coordinates in the synthesized image may be computed by computing the sum of the weighted values of the weighting coefficients α(x°, y°) assigned to the synthesized image in the aforementioned manner.

The synthesis means 8 weights and adds the first interpolated frame $Fr_{H1}$ and the second interpolated frame $Fr_{H2}$ on the basis of the weighting coefficient α(x°, y°) computed by the weighting-coefficient computation means 7, thereby acquiring a synthesized frame $Fr_G$ that has a pixel value $Fr_G(x\hat{}, y\hat{})$ at the integer coordinates of a synthesized image. More specifically, the synthesis means 8 weights the pixel values $I_1(x°, y°)$ and $I_2(x°, y°)$ of corresponding pixels of the first interpolated frame $Fr_{H1}$ and second interpolated frame $Fr_{H2}$ on the basis of the weighting coefficient α(x°, y°) and also adds the weighted values, employing the following Formula 15. In this manner, the pixel value $Fr_G(x\hat{}, y\hat{})$ of a synthesized frame $Fr_G$ is acquired.

$$Fr_G(x\char`\^, y\char`\^) = \frac{\sum_{i=1}^{k} M_i \times \left[\begin{array}{c} I2i(x\circ, y\circ) + \alpha i(x\circ, y\circ) \times \\ \{I1i(x\circ, y\circ) - I2i(x\circ, y\circ)\} \end{array}\right]}{\sum_{i=1}^{k} M_i} \qquad (15)$$

In Formula 15, k is the number of pixels in the succeeding frame $Fr_{N+1}$ assigned to an area that is surrounded by 8 neighboring integer coordinates of integer coordinates (x^, y^) of a synthesized frame $Fr_G$ (i.e., a synthesized image), and these assigned pixels have pixel values $I_1$ (x^, y^) and $I_2$(x^, y^) and weighting coefficient α(x°, y°).

In the first embodiment, if the correlation between the reference frame $Fr_N$ and the coordinate-transformed frame $Fr_{T0}$ becomes greater, the weight of the first interpolated frame $Fr_{H1}$ is made greater. In this manner, the first interpolated frame $Fr_{H1}$ and second interpolated frame $Fr_{H2}$ are weighted and added.

Note that there are cases where pixel values cannot be assigned to all integer coordinates of a synthesized image. In such a case, pixel values at integer coordinates not assigned can be computed by performing interpolation on assigned pixels in the same manner as the spatial interpolation means 5.

While the process of acquiring the synthesized frame FrG for the luminance component Y has been described, synthesized frames FrG for color difference components Cb and Cr are acquired in the same manner. By combining a synthesized frame FrG(Y) obtained from the luminance component Y and synthesized frames FrG(Cb) and FrG(Cr) obtained from the color difference components Cb and Cr, a final synthesized frame is obtained. To expedite processing, it is preferable to estimate a correspondent relationship between the reference frame FrN and the succeeding frame FrN+1 only for the luminance component Y, and process the color difference components Cb and Cr on the basis of the correspondent relationship estimated for the luminance component Y.

In the case where the first interpolated frame $Fr_{H1}$ and second interpolated frame $Fr_{H2}$ having pixel values for the integer coordinates of a synthesized image, and the weighting coefficient $\alpha(x\hat{}, y\hat{})$ at the integer coordinates, have been acquired, a pixel value $Fr_G(x, y)$ in the synthesized frame $Fr_G$ can be acquired by weighting and adding the pixel values $I_1(x\hat{}, y\hat{})$ and $I_2(x\hat{}, y\hat{})$ of corresponding pixels of the first interpolated frame $Fr_{H1}$ and second interpolated frame $Fr_{H2}$ on the basis of the weighting coefficient $\alpha(x\hat{}, y\hat{})$, employing the following Formula 16.

$$Fr_G(x\hat{},y\hat{})=\alpha(x\hat{},y\hat{})\times I_1(x\hat{},y\hat{})+\{1-\alpha(x\hat{},y\hat{})\}\times I_2(x\hat{},y\hat{}) \quad (16)$$

Figure 9:
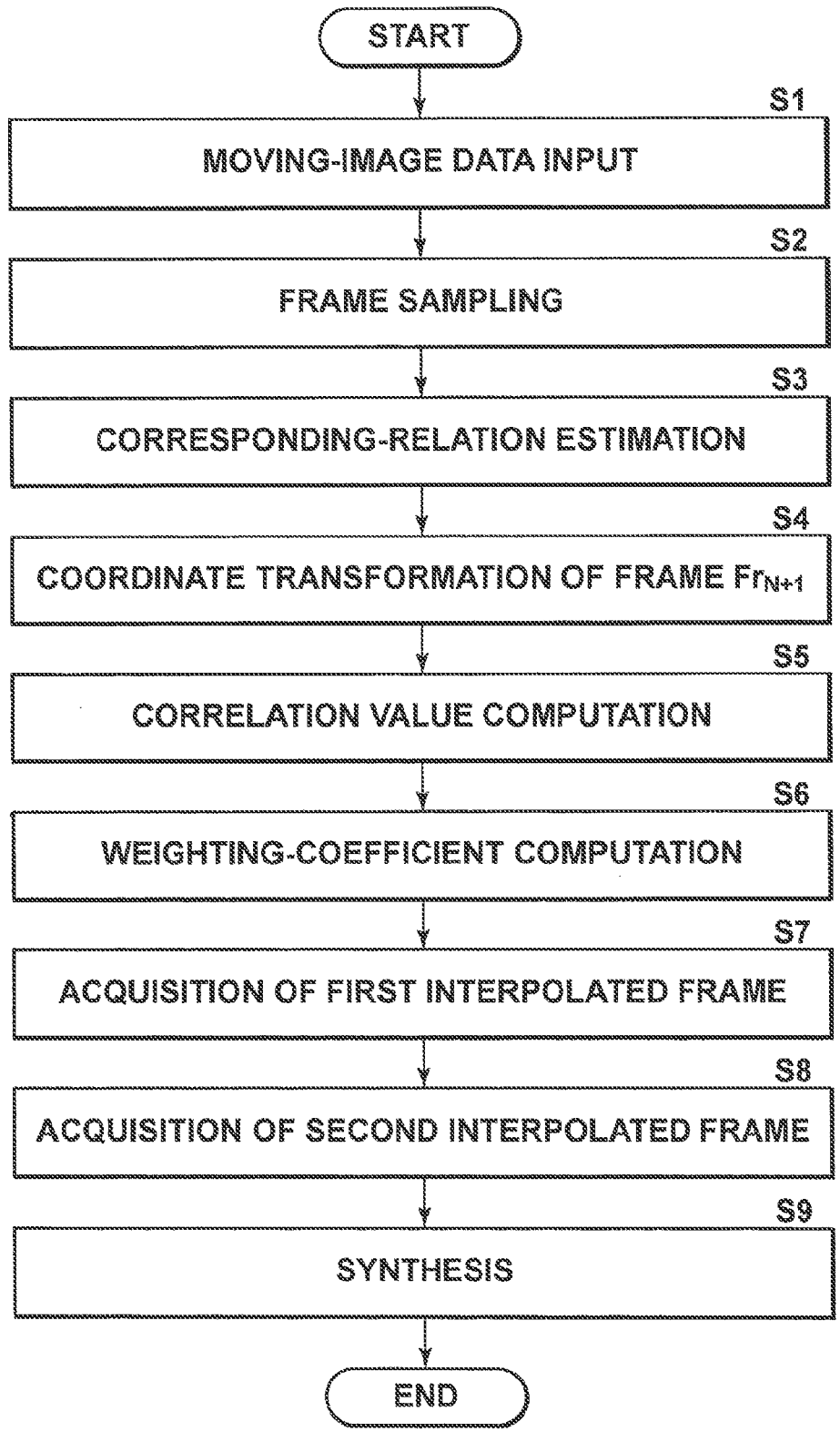
FIG. 9 is a flowchart showing processes that are performed in the first embodiment.

Now, a description will be given of operation of the first embodiment. FIG. 9 shows processes that are performed in the first embodiment. In the following description, the first interpolated frame $Fr_{H1}$, second interpolated frame $Fr_{H2}$, and weighting coefficient $\alpha(x°, y°)$ are obtained at real coordinates to which pixels in the frame $Fr_{H1+1}$ of a synthesized image are assigned. First, video image data M0 is input to the sampling means 1 (step S1). In the sampling means 1, a reference frame $Fr_N$ and the succeeding frame $Fr_{N+1}$ are sampled from the input video image data M0 (step S2). Then, a correspondent relationship between the reference frame $Fr_N$ and the succeeding frame $Fr_{N+1}$ is estimated by the correspondent relationship estimation means (step S3).

Based on the correspondent relationship estimated by the correspondent relationship estimation means 2, the coordinates of the succeeding frame FrN+1 are transformed to the coordinate space in the reference frame FrN by the coordinate transformation means 3, whereby a coordinate-transformed frame FrT0 is acquired (step S4). The correlation value d0(x, y) of corresponding pixels of the coordinate-transformed frame FrT0 and reference frame FrN is computed by the correlation-value computation means 6 (step S5). Further, the weight computation means 7 computes a weighting coefficient $\alpha x(x°, y°)$ based on the correlation value d0(x, y) (step S6).

On the other hand, based on the correspondent relationship estimated by the correspondent relationship estimation means 2, a first interpolated frame $Fr_{H1}$ is acquired by the spatio-temporal interpolation means 4 (step S7), and a second interpolated frame $Fr_{H2}$ is acquired by the spatial interpolation means 5 (step S8).

Note that the processes in steps S7 and S8 may be previously performed and the processes in steps S4 to S6 and the processes in steps S7 and S8 may be performed in parallel.

In the synthesis means 8, a pixel value I1(x°, y° in the first interpolated frame FrH1 and a pixel value I2(x°, y°) in the second interpolated frame FrH2 are synthesized, whereby a synthesized frame FrG consisting of a pixel value FrG(x$\hat{}$, y$\hat{}$) is acquired (step S9), and the processing ends.

In the case where the motion of subjects included in the reference frame $Fr_N$ and succeeding frame $Fr_{N+1}$ is small, the first interpolated frame $Fr_{H1}$ represents a high-definition image whose resolution is higher than the reference frame $Fr_N$ and succeeding frame $Fr_{N+1}$. On the other hand, in the case where the motion of subjects included in the reference frame $Fr_N$ and succeeding frame $Fr_{N+1}$ is great or complicated, a moving subject in the first interpolated frame $Fr_{H1}$ becomes blurred.

In addition, the second interpolated frame $Fr_{H2}$ is obtained by interpolating only one reference frame $Fr_N$, so it is inferior in definition to the first interpolated frame $Fr_{H1}$, but even when the motion of a subject is great or complicated, the second interpolated frame $Fr_{H2}$ does not blur so badly because it is obtained from only one reference frame $Fr_N$.

Furthermore, the weighting coefficient $\alpha(x°, y°)$ to be computed by the weight computation means 7 is set so that if the correlation between the reference frame $Fr_N$ and the coordinate-transformed frame $Fr_{T0}$ becomes greater, the weight of the first interpolated frame $Fr_{H1}$ becomes greater.

If the motion of a subject included in each of the frames $Fr_N$ and $Fr_{N+1}$ is small, the correlation between the coordinate-transformed frame $Fr_{T0}$ and the reference frame $Fr_N$ becomes great, but if the motion is great or complicated, the correlation becomes small. Therefore, by weighting the first interpolated frame $Fr_{H1}$ and second interpolated frame $Fr_{H2}$ on the basis of the weighting coefficient $\alpha(x°, y°)$ computed by the weight computation means 7, when the motion of a subject is small there is obtained a synthesized frame $Fr_G$ in which the ratio of the first interpolated frame $Fr_{H1}$ with high definition is high, and when the motion is great there is obtained a synthesized frame $Fr_G$ including at a high ratio the second interpolated frame $Fr_{H2}$ in which the blurring of a moving subject has been reduced.

Therefore, in the case where the motion of a subject included in each of the frames $Fr_N$ and $Fr_{N+1}$ is great, the blurring of a subject in the synthesized frame $Fr_G$ is reduced, and when the motion is small, high definition is obtained. In this manner, a synthesized frame $Fr_G$ with high picture quality can be obtained regardless of the motion of a subject included in each of the frames $Fr_N$ and $Fr_{N+1}$.

Figure 10:
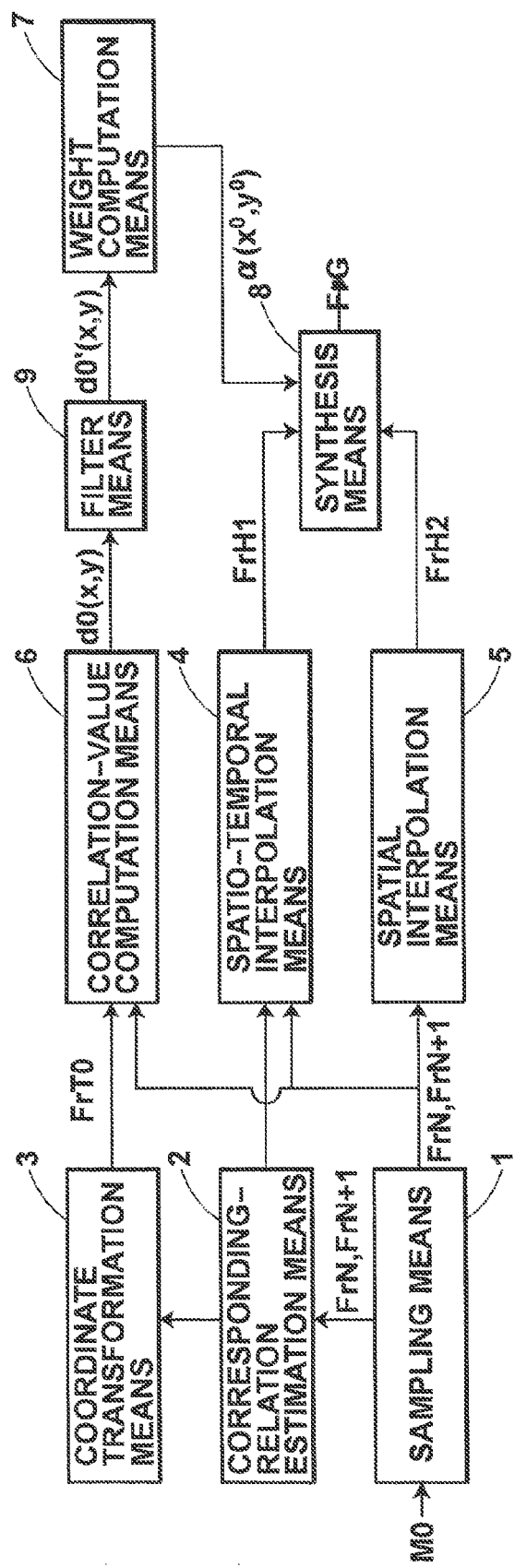
FIG. 10 is a schematic block diagram showing a video image synthesizer constructed in accordance with a second embodiment of the present invention.

Now, a description will be given of a second embodiment of the present invention. FIG. 10 shows a video image synthesizer constructed in accordance with the second embodiment of the present invention. Because the same reference numerals will be applied to the same parts as the first embodiment, a detailed description of the same parts will not be given.

The second embodiment differs from the first embodiment in that it is provided with filter means 9. The filter means 9 performs a filtering process on a correlation value d0(x, y) computed by correlation-value computation means 6, employing a low-pass filter.

Figures 11, 12:
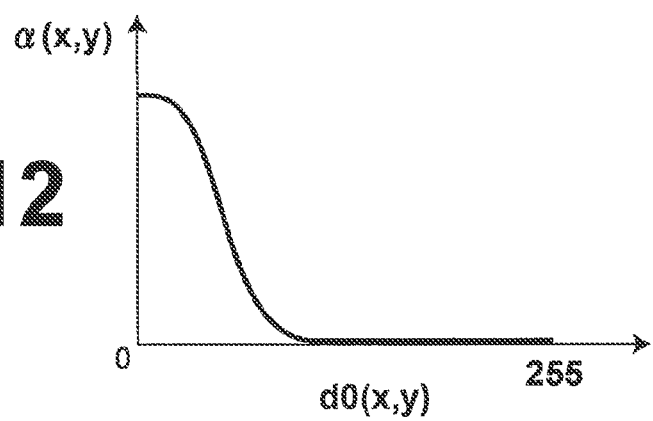
FIG. 11 is a diagram showing an example of a low-pass filter.
FIG. 12 is a diagram showing a graph for computing a weighting coefficient.

An example of the low-pass filter is shown in FIG. 11. The second embodiment employs a 3×3 low-pass filter, but may employ a 5×5 low-pass filter or greater. Alternatively, a median filter, a maximum value filter, or a minimum value filter may be employed.

In the second embodiment, with weight computation means 7 a weighting coefficient $\alpha(x°, y°)$ is acquired based on the correlation value d0'(x, y) filtered by the filter means 9, and the weighting coefficient $\alpha(x°, y°)$ is employed in the weighting and addition operations that are performed in the synthesis means 8.

Thus, in the second embodiment, a filtering process is performed on the correlation value d0(x, y) through a low-pass filter, and based on the correlation value d0'(x, y) obtained in the filtering process, the weighting coefficient $\alpha(x°, y°)$ is acquired. Because of this, a change in the weighting coefficient $\alpha(x°, y°)$ in the synthesized image becomes smooth, and consequently, image changes in areas where correlation values change can be smoothed. This is able to give the synthesized frame $Fr_G$ a natural look.

In the above-described first and second embodiments and the following embodiments, while the correlation value d0(x, y) is computed for the luminance component Y and color difference components Cb and Cr, a weighting coefficient $\alpha(x, y)$ may be computed for the luminance component Y and color difference components Cb and Cr by weighting and adding a correlation value d0Y(x, y) for the luminance component and correlation values d0Cb(x, y) and d0Cr(x, y) for the color difference components, employing weighting coefficients a, b, and c, as shown in the following Formula 17.

$$d1(x,y)=a \cdot d0Y(x,y)+b \cdot d0Cb(x,y)+c \cdot d0Cr(x,y) \quad (17)$$

By computing a Euclidean distance employing the luminance component $Fr_{T0Y}(x, y)$ and color difference components $Fr_{T0Cb}(x, y)$ and $Fr_{T0Cr}(x, y)$ of the coordinate-transformed frame $Fr_{T0}$, the luminance component $Fr_{NY}(x, y)$ and color difference components $Fr_{NCb}(x, y)$ and $Fr_{NCr}(x, y)$ of the reference frame $Fr_N$, and weighting coefficients a, b, and c, as shown in the following Formula 18, the computed Euclidean distance may be used as a correlation value $d1(x, y)$ for acquiring a weighting coefficient $\alpha(x, y)$.

$$d1(x,y)=\{a(Fr_{T0Y}(x,y)-Fr_{NY}(x,y))^2+b(Fr_{T0Cb}(x,y)-Fr_{NCb}(x,y))^2+c(Fr_{T0Cr}(x,y)-Fr_{NCc}(x,y))^2\}^{0.5} \quad (18)$$

Figure 8:
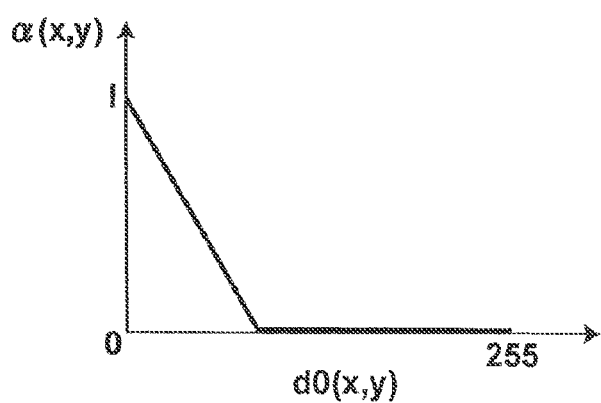
FIG. 8 is a diagram showing a graph for computing a weighting coefficient.

In the above-described first and second embodiments and the following embodiments, although the weight computation means 7 acquires the weighting coefficient $\alpha(x, y)$ employing a graph shown in FIG. 8, the weight computation means 7 may employ a nonlinear graph in which the value of the weighting coefficient $\alpha(x, y)$ changes smoothly and slowly at boundary portions where a value changes, as shown in FIG. 12.

Thus, by employing a nonlinear graph shown in FIG. 12, the degree of a change in an image becomes slow at local areas where correlation values change. This is able to give a synthesized frame a natural look.

In the above-described first and second embodiments and the following embodiments, although a synthesized frame $Fr_G$ is acquired from two frames $Fr_N$ and $Fr_{N+1}$, it may be acquired from three or more frames. For instance, in the case of acquiring a synthesized frame $Fr_G$ from T frames $Fr_{N+t'}$ ($0 \leq t' \leq T-1$), a correspondent relationship between the reference frame $Fr_N$ (=$Fr_{N+0}$) and each of the frames $Fr_{N+t}$ ($0 \leq t \leq T-1$) other than the reference frame is estimated and a plurality of first interpolated frames $Fr_{H1t}$ are obtained. Note that a pixel value in the first interpolated frame $Fr_{H1t}$ is represented by $I_{1t}(x°, y°)$.

In addition, interpolation, in which pixel values are assigned to coordinates (real coordinates (x°, y°)) where pixels of the frame $Fr_{N+t}$ in a synthesized image are assigned, is performed on the reference frame $Fr_N$, whereby a second interpolated frame $Fr_{H2t}$ corresponding to the frame $Fr_{N+t}$ is acquired. Note that a pixel value in the second interpolated frame $Fr_{H2t}$ is represented by $I_{2t}(x°, y°)$.

Moreover, based on the correspondent relationship estimated, a weighting coefficient $\alpha t(x°, y°)$, for weighting first and second interpolated frames $Fr_{H1t}$ and $Fr_{H2t}$ that correspond to each other, is acquired.

By performing a weighting operation on corresponding first and second interpolated frames $Fr_{H1t}$ and $Fr_{H2t}$ by the weighting coefficient $\alpha t(x°, y°)$ and also adding the weighted frames, an intermediate synthesized frame $Fr_{Gt}$ with a pixel value $Fr_{Gt}(x\hat{}, y\hat{})$ at integer coordinates in a synthesized image is acquired. More specifically, as shown in the following Formula 19, the pixel values $I_{1t}(x°, y°)$ and $I_{2t}(x°, y°)$ of corresponding pixels of the first and second interpolated frames $Fr_{H1t}$ and $Fr_{H2t}$ are weighted by employing the corresponding weighting coefficient $\alpha t(x°, y°)$, and the weighted values are added. In this manner, the pixel value $Fr_{Gt}(x\hat{}, y\hat{})$ of an intermediate synthesized frame $Fr_{Gt}$ is acquired.

$$Fr_{Gt}(x\hat{}, y\hat{}) = \frac{\sum_{i=1}^{k} M_{ti} \times \begin{bmatrix} I_{2ti}(x°, y°) + \alpha_{ti}(x°, y°) \times \\ \{I_{1ti}(x°, y°) - I_{2ti}(x°, y°)\} \end{bmatrix}}{\sum_{i=1}^{k} M_{ti}} \quad (19)$$

In Formula 19, k is the number of pixels in the frame $Fr_{N+t}$ assigned to an area that is surrounded by 8 neighboring integer coordinates in the integer coordinates $(x\hat{}, y\hat{})$ of an intermediate synthesized frame $Fr_{Gt}$ (i.e., a synthesized image), and these assigned pixels have pixel values $I_{1t}(x°, y°)$ and $I_{2t}(x°, y°)$ and weighting coefficient $\alpha t(x°, y°)$.

By adding the intermediate synthesized frames $Fr_{Gt}$, a synthesized frame $Fr_G$ is acquired. More specifically, by adding corresponding pixels of intermediate synthesized frames $Fr_{Gt}$ with the following Formula 20, a pixel value $Fr_G(x\hat{}, y\hat{})$ in a synthesized frame $Fr_G$ is acquired.

$$Fr_G(x\hat{}, y\hat{}) = \sum_{t=1}^{T-1} Fr_{Gt}(x\hat{}, y\hat{}) \quad (20)$$

Note that there are cases where pixel values cannot be assigned to all integer coordinates of a synthesized image. In such a case, pixel values at integer coordinates not assigned can be computed by performing interpolation on assigned pixels in the same manner as the spatial interpolation means 5.

In the case of acquiring a synthesized frame FrG from three or more frames, first and second interpolated frames FrH1t and FrH2t with pixel values at the integer coordinates of a synthesized image, and a weighting coefficient $\alpha t(x\hat{}, y\hat{})$ at the integer coordinates, may be acquired. In this case, for each frame FrN+t ($0 \leq t \leq T-1$), pixel values I1N+t(x, y) in each frame FrN+t are assigned to all integer coordinates of a synthesized image, and a first interpolated frame FrH1t with pixel values I1N+t(x\hat{}, y\hat{}) (i.e., I1t(x\hat{}, y\hat{})) is acquired. By adding the pixel values I1t(x\hat{}, y\hat{}) assigned to all frames FrN+t and the pixel values I2t(x\hat{}, y\hat{}) of the second interpolated frame FrH2t, a plurality of intermediate synthesized frames FrGt are obtained, and they are combined into a synthesized frame FrG.

More specifically, as shown in the following Formula 21, a pixel value I1N+t(x\hat{}, y\hat{}) at integer coordinates in a synthesized image is computed for all frames FrN+t. As shown in Formula 22, an intermediate synthesized frame FrGt is obtained by weighting pixel values I1t(x\hat{}, y\hat{}) and I2t(x\hat{}, y\hat{}), employing a weighting coefficient $\alpha(x\hat{}, y\hat{})$. Further, as shown in Formula 20, a synthesized frame FrG is acquired by adding the intermediate synthesized frames FrGt.

$$I_{1N+t}(x\hat{}, y\hat{}) = \Phi(I_{1N+t}(x°, y°))$$

$$= \frac{\begin{pmatrix} M1 \times I_{1N+t1}(x°, y°) + M2 \times \\ I_{1N+t2}(x°, y°) + \ldots + Mk \times \\ I_{1N+tk}(x°, y°) \end{pmatrix}}{(M1 + M2 + \ldots + Mk)}$$

$$= \frac{\sum_{i=1}^{k} Mi \times I_{1N+ti}(x°, y°)}{\sum_{i=1}^{k} Mi} \quad (21)$$

-continued where $I_{1N+t}(x°, y°) = \prod (Fr_{N+t}(x, y))$.

$$Fr_{Gt}(x^\wedge, y^\wedge) = \alpha t(x^\wedge, y^\wedge) \times I_{1t}(x^\wedge, y^\wedge) + \{1 - \alpha t(x^\wedge, y^\wedge)\} \times I_{2t}(x^\wedge, y^\wedge) \quad (22)$$

Note that in the case of acquiring a synthesized frame $Fr_G$ from three or more frames, three or more coordinate-transformed frames $Fr_{T0}$ are obtained and three or more correlation values and weighting coefficients are likewise obtained. In this case, the average or median value of the weighting coefficients may be used as a weighting coefficient for the first and second interpolated frames $Fr_{H1}$ and $Fr_{H2}$ that correspond to each other.

Figure 13:
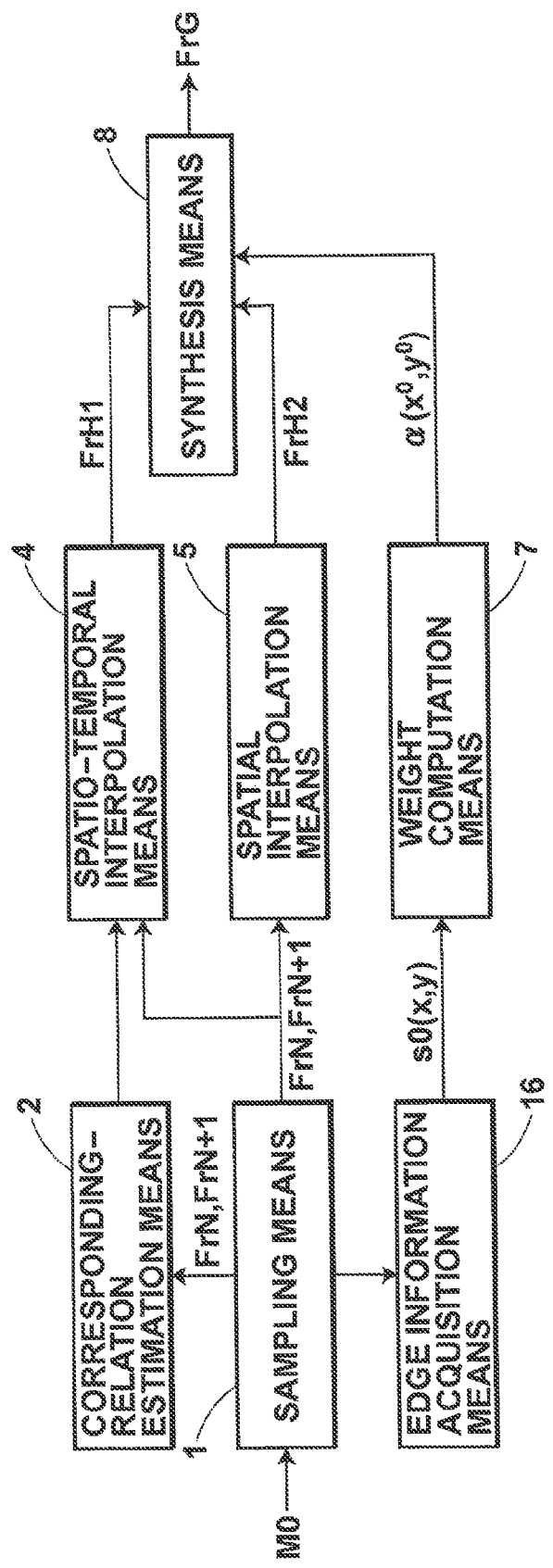
FIG. 13 is a schematic block diagram showing a video image synthesizer constructed in accordance with a third embodiment of the present invention.

Now, a description will be given of a third embodiment of the present invention. FIG. 13 shows a video image synthesizer constructed in accordance with the third embodiment of the present invention. Because the same reference numerals will be applied to the same parts as the first embodiment, a detailed description of the same parts will not be given.

The third embodiment is equipped with edge information acquisition means 16 instead of the correlation-value computation means 6 of the first embodiment, and differs from the first embodiment in that, based on edge information acquired by the edge information acquisition means 16, weight computation means 7 computes a weighting coefficient that is used in weighting first and second interpolated frames $Fr_{H1}$ and $Fr_{H2}$.

Figure 14:
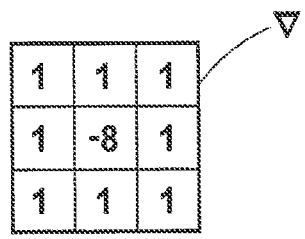
FIG. 14 is a diagram showing a Laplacian filter.

The edge information acquisition means 16 acquires edge information e0(x, y) that represents the edge intensity of a reference frame $Fr_N$. To acquire the edge information e0(x, y), a filtering process is performed on the reference frame $Fr_N$ by employing a Laplacian filter of 3×3 shown in FIG. 14, as shown in the following Formula 23.

$$e0(x,y) = |\nabla FrN(x,y)| \quad (23)$$

In the third embodiment, a Laplacian filter is employed in the filtering process to acquire the edge information e0(x, y) of the reference frame $Fr_N$. However, any type of filter can be employed, if it is a filter, such as a Sobel filter and a Prewitt filter, which can acquire edge information.

Figure 15:
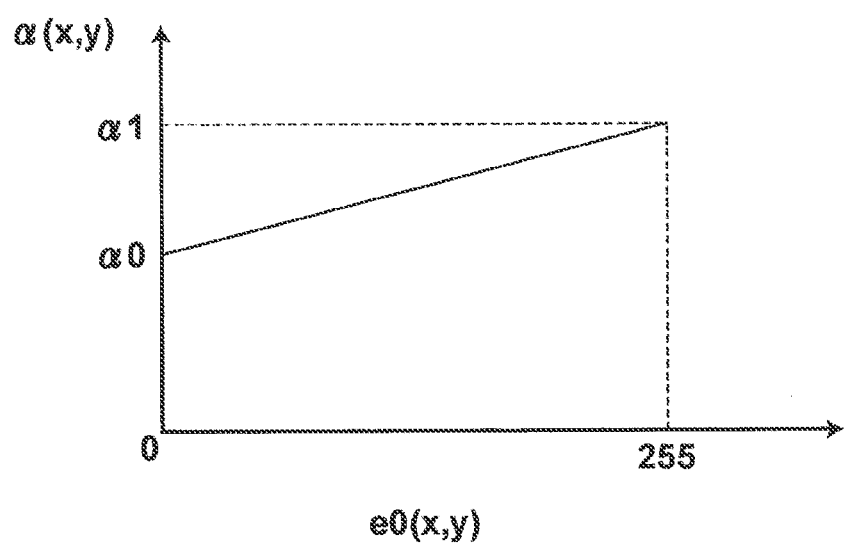
FIG. 15 is a diagram showing a graph for computing a weighting coefficient.

The weight computation means 7 computes a weighting coefficient α(x, y) that is used in weighting first and second interpolated frames $Fr_{H1}$ and $Fr_{H2}$, from the edge information e0(x, y) acquired by the edge information acquisition means 6. More specifically, the weighting coefficient α(x, y) is acquired by referring to a graph shown in FIG. 15. As illustrated in the figure, the weighting coefficient α(x, y) changes linearly between the minimum value α0 and the maximum value α1. In the graph shown in FIG. 15, if the edge information e0(x, y) becomes greater, the value of the weighting coefficient α(x, y) becomes closer to the maximum value α1. Note that the edge information e0(x, y) is represented by a 8-bit value.

In addition, in the synthesis means 8 of the third embodiment, if an edge intensity in the reference frame $Fr_N$ becomes greater, the weight of the first interpolated frame $Fr_{H1}$ is made greater. In this manner, the first and second interpolated frames $Fr_{H1}$ and $Fr_{H2}$ are weighted.

Figure 16:
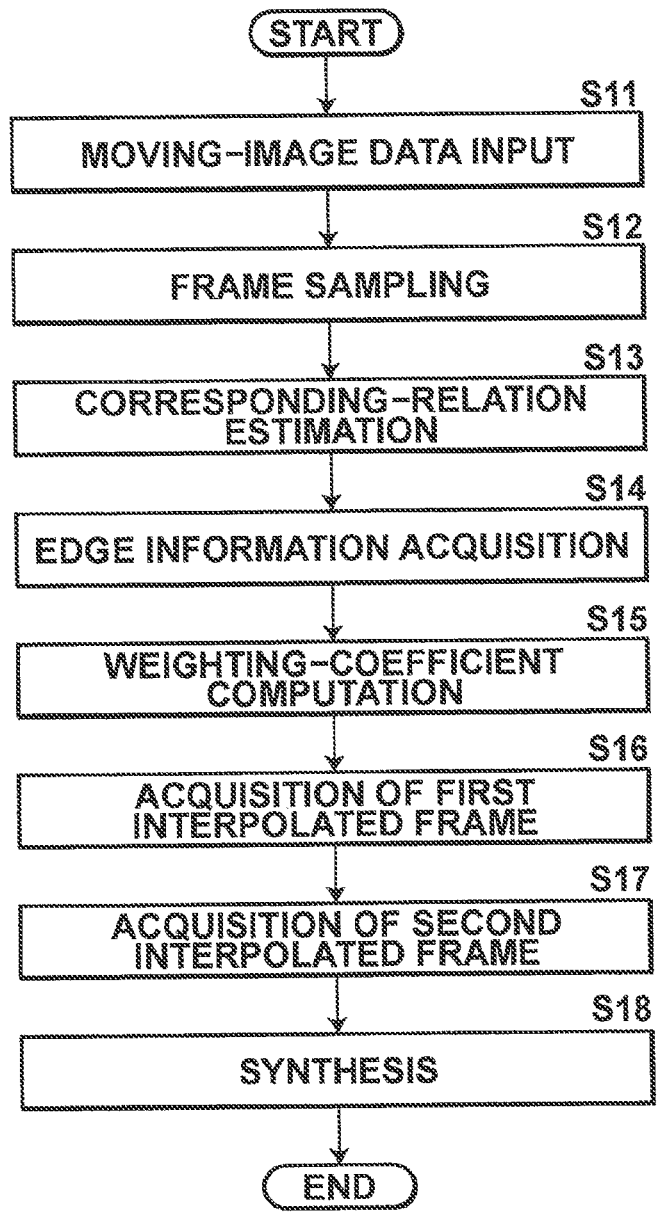
FIG. 16 is a flowchart showing processes that are performed in the third embodiment.

Now, a description will be given of operation of the third embodiment. FIG. 16 shows processes that are performed in the third embodiment. In the following description, the first interpolated frame $Fr_{H1}$, second interpolated frame $Fr_{H2}$, and weighting coefficient α(x°, y°) are obtained at real coordinates to which pixels in the frame $Fr_{H1+1}$ of a synthesized image are assigned. First, as with steps S1 to S3 in the first embodiment, steps S11 to S13 are performed.

The edge information e0(x, y) representing the edge intensity of the reference frame $Fr_N$ is acquired by the edge information acquisition means 16 (step S14). Based on the edge information e0(x, y), the weighting coefficient α(x°, y°) is computed by the weight computation means 7 (step S15).

On the other hand, based on the correspondent relationship estimated by the correspondent relationship estimation means 2, the first interpolated frame $Fr_{H1}$ is acquired by spatio-temporal interpolation means 4 (step S16), and the second interpolated frame $Fr_{H2}$ is acquired by spatial interpolation means 5 (step S17).

Note that the processes in steps S16 and S17 may be previously performed and the processes in steps S14 and S15 and the processes in steps S16 and S17 may be performed in parallel.

In synthesis means 8, a pixel value $I_1(x°, y°)$ in the first interpolated frame $Fr_{H1}$ and a pixel value $I_2(x°, y°)$ in the second interpolated frame $Fr_{H2}$ are synthesized, whereby a synthesized frame $Fr_G$ consisting of a pixel value $Fr_G(x^\wedge, y^\wedge)$ is acquired (step S18), and the processing ends.

If the motion of a subject included in each of the frames $Fr_N$ and $Fr_{N+1}$ is small, the edge intensity of the reference frame $Fr_N$ will become great, but if the motion is great or complicated, it moves the contour of the subject and makes the edge intensity small. Therefore, by weighting the first interpolated frame $Fr_{H1}$ and second interpolated frame $Fr_{H2}$ on the basis of the weighting coefficient α(x°, y°) computed by the weight computation means 7, when the motion of a subject is small there is obtained a synthesized frame $Fr_G$ in which the ratio of the first interpolated frame $Fr_{H1}$ with high definition is high, and when the motion is great there is obtained a synthesized frame $Fr_G$ including at a high ratio the second interpolated frame $Fr_{H2}$ in which the blurring of a moving subject has been reduced.

Therefore, in the case where the motion of a subject included in each of the frames $Fr_N$ and $Fr_{N+1}$ is great, the blurring of a subject in the synthesized frame $Fr_G$ is reduced, and when the motion is small, high definition is obtained. In this manner, a synthesized frame $Fr_G$ with high picture quality can be obtained independently of the motion of a subject included in each of the frames $Fr_N$ and $Fr_{N+1}$.

In the above-described third embodiment, a synthesized frame $Fr_G$ is acquired from two frames $Fr_N$ and $Fr_{N+1}$. Alternatively, it may be acquired from three or more frames, as with the above-described first and second embodiments. In this case, the weighting coefficient α(x°, y°), which is used in weighting first and second interpolated frames $Fr_{H1t}$ and $Fr_{H2t}$ that correspond to each other, is computed based on the edge information representing the edge intensity of the reference frame $Fr_N$.

In the above-described third embodiment, when a synthesized frame $Fr_G$ is acquired from three or more frames, edge information e0(x, y) is obtained for all frames other than the reference frame $Fr_N$. Because of this, a weighting coefficient α(x, y) is computed from the average or median value of many pieces of information acquired from a plurality of frames.

In the above-described third embodiment, edge information e0(x, y) is acquired from the reference frame $Fr_N$ and then the weighting coefficient α(x, y) is computed. Alternatively, the edge information e0(x, y) may be acquired from the reference frame $Fr_N$ and the succeeding frame $Fr_{N+1}$. In this case, assume that edge information acquired from the reference frame $Fr_N$ is e1(x, y) and edge information acquired from the succeeding frame $Fr_{N+1}$ is e2(x, y). The average, multiplication, logic sum, logic product, etc., of the two pieces of information e1(x, y) and e2(x, y) are computed, and based on them, a weighting coefficient α(x, y) is acquired.

Figure 17:
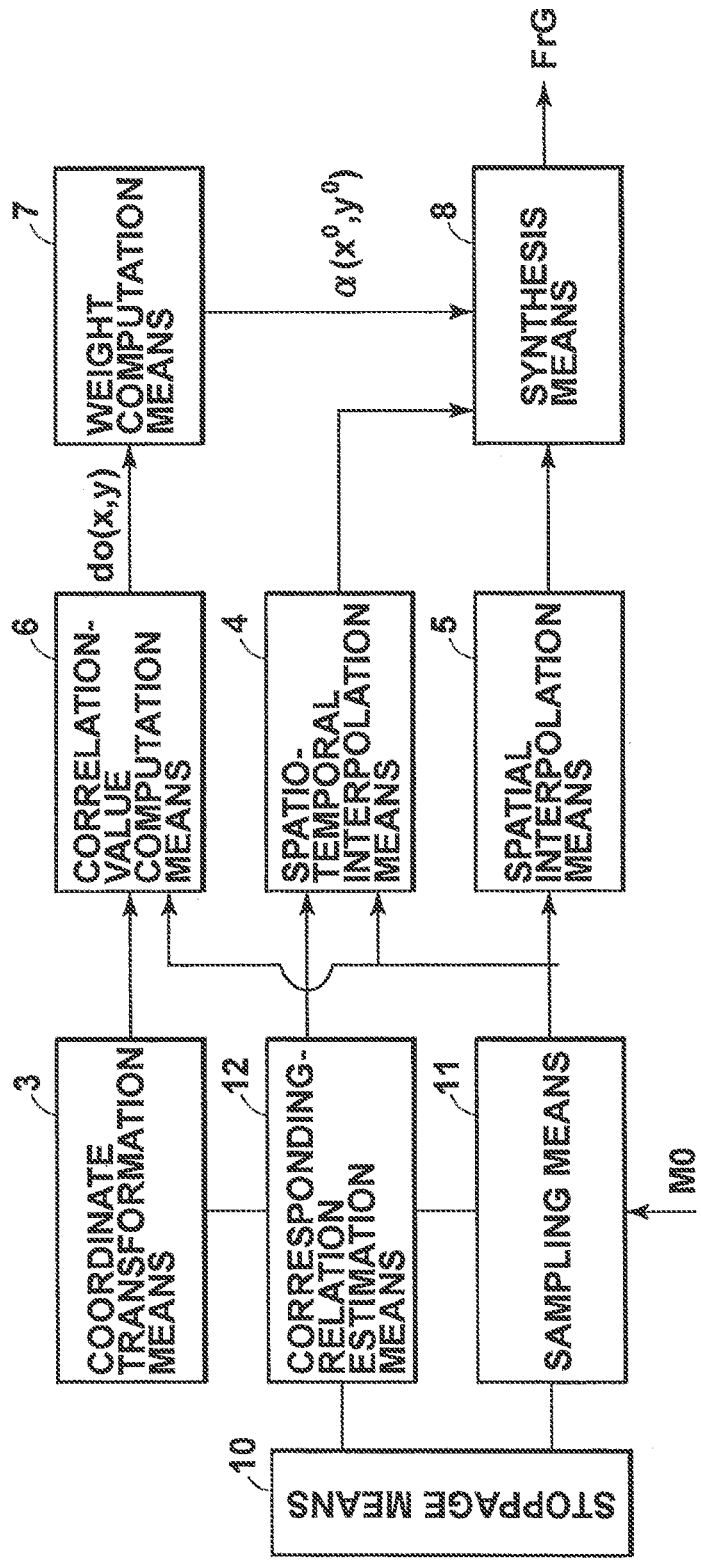
FIG. 17 is a schematic block diagram showing a video image synthesizer constructed in accordance with a fourth embodiment of the present invention.

Now, a description will be given of a fourth embodiment of the present invention. FIG. 17 shows a video image synthesizer constructed in accordance with the fourth embodiment of the present invention. Because the same reference numerals will be applied to the same parts as the first embodiment, a detailed description of the same parts will not be given. The fourth embodiment is provided with sampling means 11 and correspondent relationship acquisition means 12 instead of the sampling means 1 and correspondent relationship estimation means 2 of the first embodiment, and is further equipped with stoppage means 10 for stopping a process that is performed in the correspondent relationship acquisition means 12. The fourth embodiment differs from the first embodiment in that, for a plurality of frames to be stopped by the stoppage means 10, a correspondent relationship between a pixel in a reference frame and a pixel in each of the frames other than the reference frame is acquired in order of other frames closer to the reference frame by the correspondent relationship acquisition means 12. Note that in the fourth embodiment, coordinate transformation means 3, spatio-temporal interpolation means 4, spatial interpolation means 5, correlation-value computation means 6, weight computation means 7, and synthesis means 8 as a whole constitute frame synthesis means hereinafter claimed.

Figure 18:
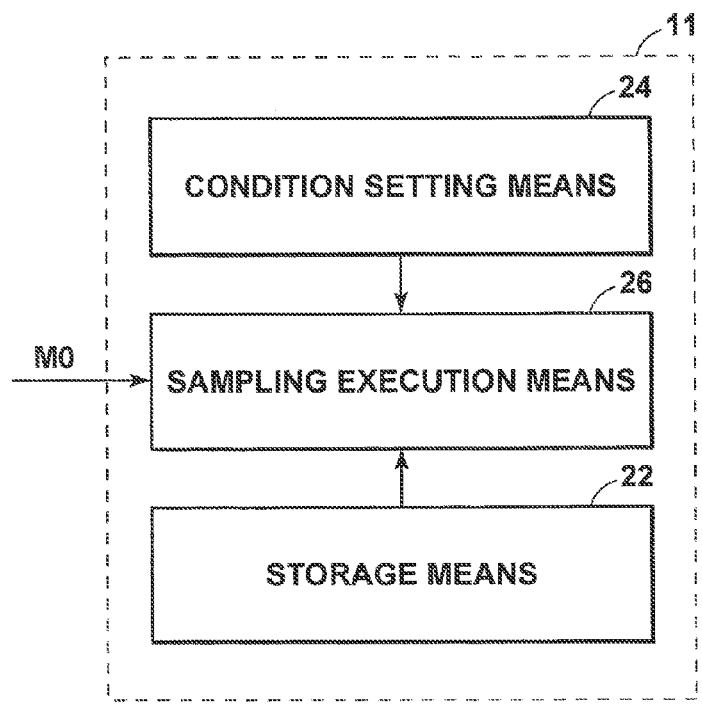
FIG. 18 is a block diagram showing the construction of the sampling means of the video image synthesizer constructed in accordance with the fourth embodiment.

FIG. 18 shows the construction of the sampling means 11 of the video image synthesizer shown in FIG. 17. As illustrated in FIG. 18, the sampling means 11 is equipped with storage means 22, condition setting means 24, and sampling execution means 26. The storage means 22 is used to store a frame-number determination table, in which magnification ratios of a pixel size in a synthesized frame to a pixel size in one frame of a video image, video image frame rates, and compression qualities, and frame numbers S are caused to correspond to one another. The condition setting means 24 is used for inputting a magnification ratio of a pixel size in a synthesized frame $Fr_G$ to a pixel size in one frame of a video image, and a frame rate and compression quality for video image data M0. The sampling execution means 26 refers to the frame-number determination table stored in the storage means 22, then detects the frame number S corresponding to the magnification ratio, frame rate, and compression quality input through the condition setting means 24, and samples S contiguous frames from video image data M0.

Figures 19, 20:
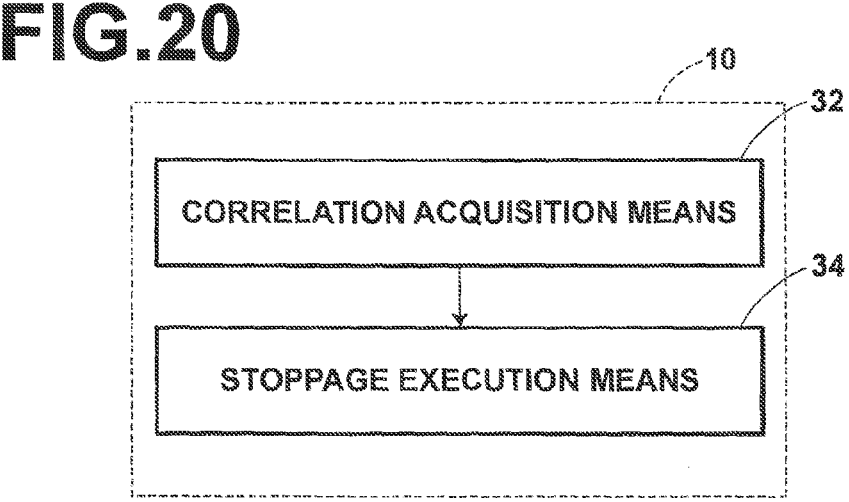
FIG. 19 is a diagram showing an example of a frame-number determination table.
FIG. 20 is a block diagram showing the construction of the stoppage means of the video image synthesizer constructed in accordance with the fourth embodiment.

FIG. 19 shows an example of the frame-number determination table stored in the storage means 22 of the sampling means 11 shown in FIG. 18. In the illustrated example, frame number S to be sampled is computed from various combinations of a magnification ratio, frame rate, and compression quality in accordance with the following Formula 24.

$$S=\min(S1, S2 \times S3) \quad (24)$$

S1=frame rate×3
S2=magnification ratio×1.5
S3=1.0 (high compression quality)
S3=1.2 (intermediate compression quality)
S3=1.5 (low compression quality)

That is, if the frame rate is great the frame number S is increased, if the magnification ratio is great the frame number S is increased, and if the compression quality is low the frame number S is increased. In this tendency, the number of frames is determined.

The sampling means 11 outputs S frames sampled to the correspondent relationship acquisition means 12, in which correspondent relationships between a pixel in a reference frame of the S frames (when the processing of a frame is stopped by the stoppage means 10, frames up to the stopped frame) and a pixel in each of the frames other than the reference frame are acquired in order of other frames closer to the reference frame. The video image data M0 represents a color video image, and each frame consists of a luminance component Y and two color difference components Cb and Cr. In the following description, processes are performed on the three components, but are the same for each component. Therefore, in the fourth embodiment, a detailed description will be given of processes that are performed on the luminance component Y, and a description of processes that are performed on the color difference components Cb and Cr will not be made.

In the S frames output from the sampling means 11, for example, the first frame is the reference frame $Fr_N$, and frames $Fr_{N+1}$, $Fr_{N+2}$, ..., and $Fr_{N+(S-1)}$ are contiguously arranged in order closer to the reference frame.

The correspondent relationship acquisition means 12 acquires a correspondent relationship between the frames $Fr_N$ and $Fr_{N+1}$ by the same process as the process performed in the correspondent relationship estimation means 2 of the above-described first embodiment.

For the S frames output from the sampling means 11, the correspondent relationship acquisition means 12 acquires correspondent relationships in order closer to the reference frame $Fr_N$, but when the processing of a frame is stopped by the stoppage means 10, the acquisition of a correspondent relationship after the stopped frame is stopped.

FIG. 20 shows the construction of the stoppage means 10. As shown in the figure, the stoppage means 10 is equipped with correlation acquisition means 32 and stoppage execution means 34. The correlation acquisition means 32 acquires a correlation between a frame being processed by the correspondent relationship acquisition means 12 and the reference frame. If the correlation acquired by the correlation acquisition means 32 is a predetermined threshold value or greater, the processing in the correspondent relationship acquisition means 12 is not stopped. If the correlation is less than the predetermined threshold, the acquisition of a correspondent relationship after a frame being processed by the correspondent relationship acquisition means 12 is stopped by the stoppage execution means 34.

In the fourth embodiment, the sum of correlation values E at the time of convergence, computed from one frame by the correspondent relationship acquisition means 12, is employed as a correlation value between the one frame and the reference frame by the correlation acquisition means 32, and if this correlation value is a predetermined threshold value or greater (that is, if correlation is a predetermined threshold value or less), the processing in the correspondent relationship acquisition means 12 is stopped, that is, the acquisition of a correspondent relationship after a frame being processed is stopped.

The frame synthesis means, which consists of coordinate transformation means 3, etc., acquires a synthesized frame in the same manner as the above-described first embodiment, employing the reference frame and other frames (in which correspondent relationships with the reference frame have been acquired), based on the correspondent relationship acquired by the correspondent relationship acquisition means 12).

Figure 21:
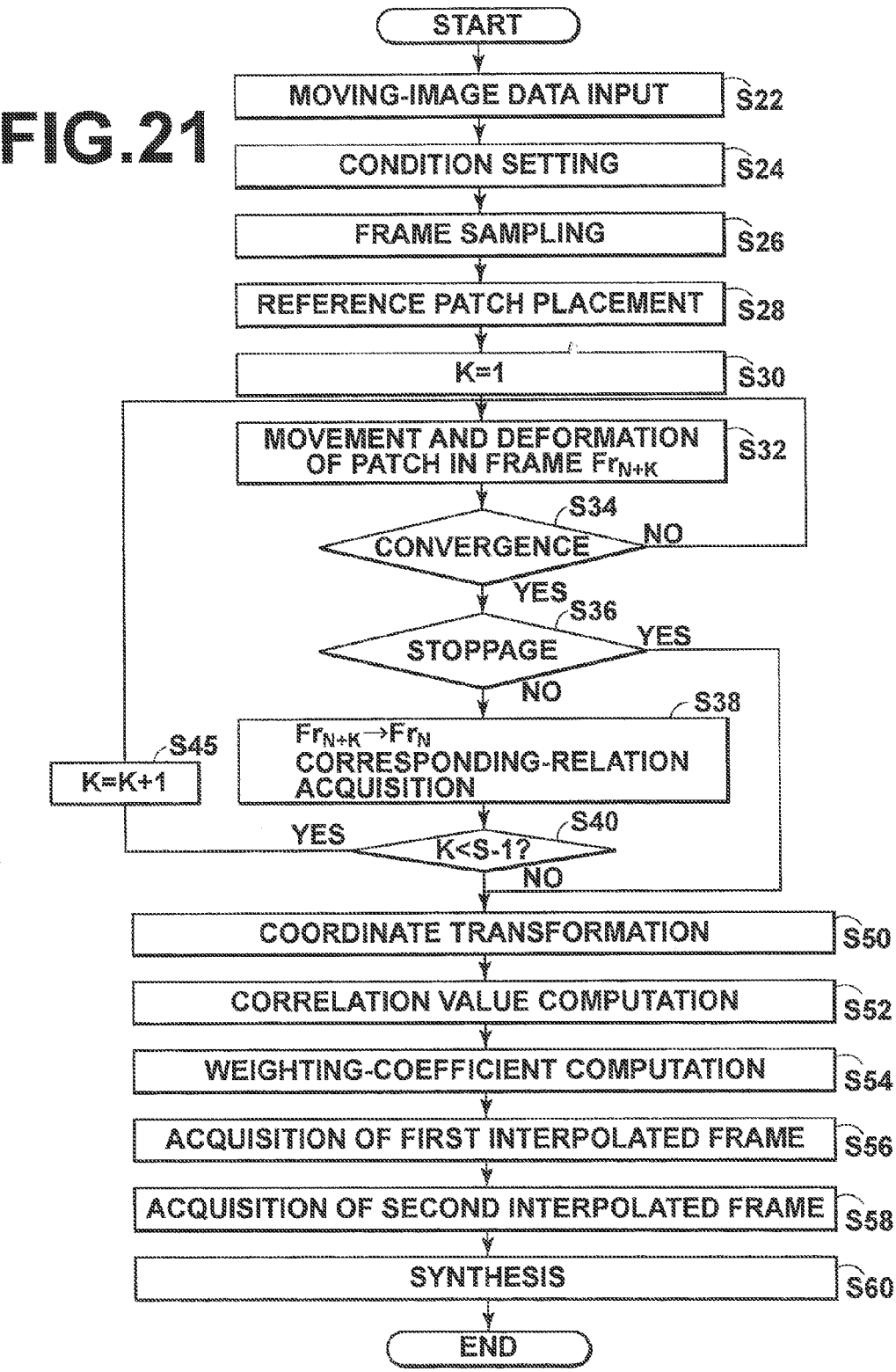
FIG. 21 is a flowchart showing processes that are performed in the fourth embodiment.

FIG. 21 shows processes that are performed in the fourth embodiment. In this embodiment, consider the case where a first interpolated frame $Fr_{H1}$, a second interpolated frame $Fr_{H2}$, and a weighting coefficient α(x°, y°) are acquired at real coordinates to which pixels of the frame $Fr_{N+1}$ in a synthesized image are assigned. In the video image synthesizer of the fourth embodiment, as shown in FIG. 21, video image data M0 is first input (step S22). To acquire a synthesized frame from the video image data M0, a magnification ratio, frame rate, and compression quality are input through the condition setting means 24 of the sampling means 11 (step S24). The sampling execution means 26 refers to the frame-number determination table stored in the storage means 22, then detects the frame number S corresponding to the magnification ratio, frame rate, and compression quality input through the condition setting means 24, and samples S contiguous frames from video image data M0 and outputs them to the correspondent relationship acquisition means 12 (step S26). The correspondent relationship acquisition means 12 places a reference patch on the reference frame $Fr_N$ of the S frames (step S28), also places the same patch as the reference patch on the succeeding frame $Fr_{N+1}$, and moves and/or deforms the patch until a correlation value E with an image within the reference patch converges (steps S32 and S34). In the stoppage means 10, the sum of correlation values E at the time of convergence is computed. If the sum is a predetermined threshold value or greater (that is, if the correlation between this frame and the reference frame is the predetermined threshold value or less), the processing in the correspondent relationship acquisition means 12 is stopped. That is, by stopping the acquisition of a correspondent relationship after the stopped frame, the processing in the video image synthesizer is shifted to processes that are performed in the frame synthesis means (consisting of coordinate transformation means 3, etc.) ("NO" in step S36, steps S50 to S60).

On the other hand, if the processing in the correspondent relationship acquisition means 12 is not stopped by the stoppage means 10, the correspondent relationship acquisition means 12 acquires correspondent relationships between the reference frame and the (S−1) frames excluding the reference frame and outputs the correspondent relationships to the frame synthesis means ("NO" in step S36, step S38, "YES" in step S40, step S45).

Steps S50 to S60 show operation of the frame synthesis means consisting of coordinate transformation means, etc. For convenience, a description will be given in the case where the correspondent relationship acquisition means 12 acquires only a correspondent relationship between the reference frame $Fr_N$ and the succeeding frame $Fr_{N+1}$.

Based on the correspondent relationship acquired by the correspondent relationship acquisition means 12, the coordinate transformation means 3 transforms the coordinates of the succeeding frame $Fr_{N+1}$ to a coordinate space in the reference frame $Fr_N$ and acquires a coordinate-transformed frame $Fr_{T0}$ (step S50). Next, the correlation-value computation means 6 computes the correlation value d0(x, y) between the coordinate-transformed frame $Fr_{T0}$ and the reference frame $Fr_N$ (step S52). Based on the correlation value d0(x, y), the weight computation means 7 computes a weighting coefficient $\alpha(x°, y°)$ (step S54).

On the other hand, based on the correspondent relationship acquired by the correspondent relationship acquisition means 12, the spatio-temporal interpolation means 4 acquires a first interpolated frame $Fr_{H1}$ (step S56), and the spatial interpolation means 5 acquires a second interpolated frame $Fr_{H2}$ (step S58).

Note that the processes in steps S56 to S58 may be previously performed and the processes in steps S50 to S54 and the processes in steps S56 to S58 may be performed in parallel.

In the synthesis means 8, a pixel value $I_1(x°, y°)$ in the first interpolated frame $Fr_{H1}$ and a pixel value $I_2(x°, y°)$ in the second interpolated frame $Fr_{H2}$ are synthesized, whereby a synthesized frame $Fr_G$ consisting of a pixel value $Fr_G(x\hat{}, y\hat{})$ is acquired (step S60), and the processing ends.

In the fourth embodiment, for the convenience of explanation, the correspondent relationship acquisition means 12 acquires only a correspondent relationship between the reference frame $Fr_N$ and the succeeding frame $Fr_{N+1}$, and the frame synthesis means obtains a synthesized frame from the two contiguous frames. For instance, in the case of acquiring a synthesized frame $Fr_G$ from T (T≥3) frames $Fr_{N+t'}$ (0≤t'≤T−1) (that is, in the case where the correspondent relationship acquisition means 12 acquires two correspondent relationships between the reference frame $Fr_N$ and two contiguous frames), pixel values are assigned to a synthesized image, and a plurality of first interpolated frames $Fr_{H1t}$ are obtained for the contiguous frames $Fr_{N+t}$ (0≤t≤T−1) other than the reference frame $Fr_N$ (=$Fr_{N+0}$). Note that a pixel value in the first interpolated frame $Fr_{H1t}$ is represented by $I_{1t}(x°, y°)$.

Thus, in the video image synthesizer of the fourth embodiment, the sampling means 11 determines the number of frames to be sampled, based on the compression quality and frame rate of the video image data M0 and on the magnification ratio of a pixel size in a synthesized frame to a pixel size in a frame of a video image. Therefore, the operator does not need to determine the number of frames, and the video image synthesizer can be conveniently used. By determining the number of frames on the basis of image characteristics between a video image and a synthesized frame, a suitable number of frames can be objectively determined, so a synthesized frame with high quality can be acquired.

In addition, in the video image synthesizer of the fourth embodiment, for S frames sampled, a correspondent relationship between a pixel within a reference patch on the reference frame and a pixel within a patch on the succeeding frame is computed in order of other frames closer to the reference frame, and a correlation between the reference frame and the succeeding frame is obtained. If the correlation is a predetermined threshold value or greater, then a correspondent relationship with the next frame is acquired. On the other hand, if a frame whose correlation is less than the predetermined threshold value is detected, the acquisition of correspondent relationships with other frames after the detected frame is stopped, even when the number of frames does not reach the determined frame number. This can avoid acquiring a synthesized frame from a reference frame and a frame whose correlation is low (e.g., a reference frame for a scene and a frame for a switched scene), and makes it possible to acquire a synthesized frame of higher quality.

Note that in the fourth embodiment, the stoppage means 10 stops the processes of the correspondent relationship acquisition means 12 in the case that the sum of E is higher than a predetermined threshold value. However, the stoppage means may also stop the processes of the frame synthesis means as well.

Figure 22:
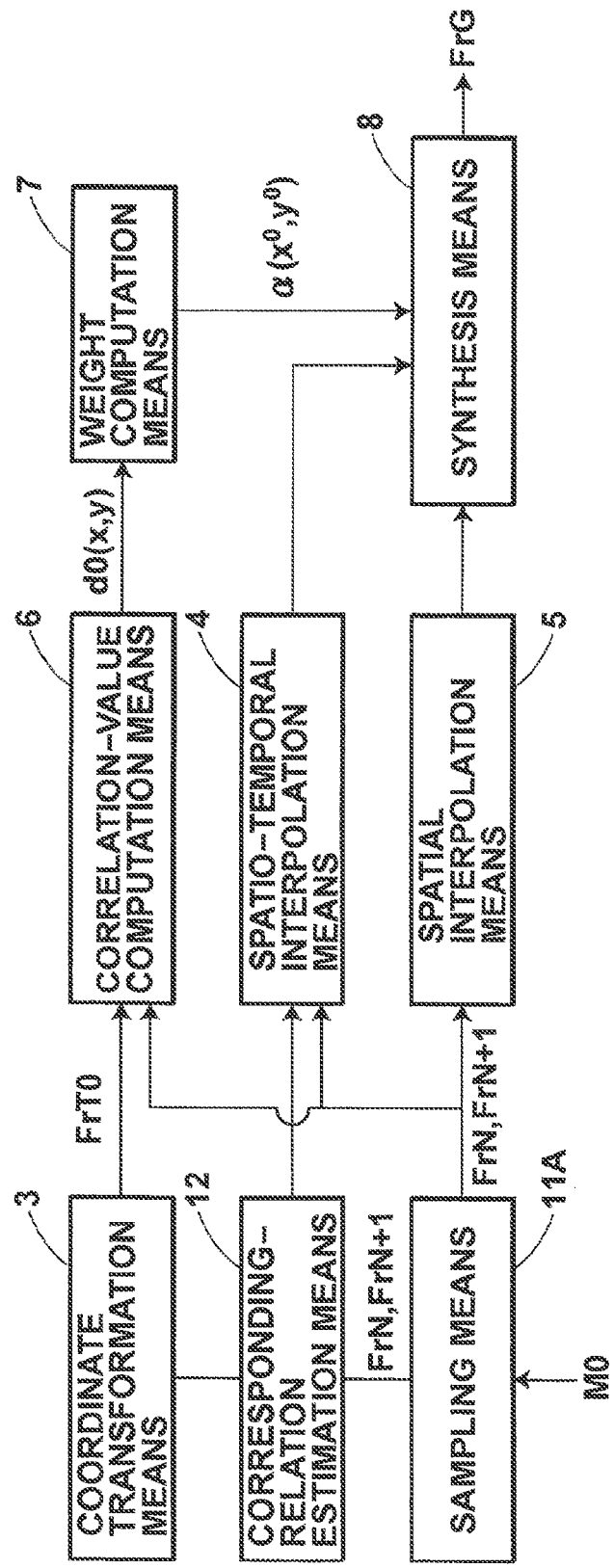
FIG. 22 is a schematic block diagram showing a video image synthesizer constructed in accordance with a fifth embodiment of the present invention.

Now, a description will be given of a fifth embodiment of the present invention. FIG. 22 shows a video image synthesizer constructed in accordance with the fifth embodiment of the present invention. Since the same reference numerals will be applied to the same parts as the fourth embodiment, a detailed description of the same parts will not be given. The fifth embodiment is equipped with sampling means 11A instead of the sampling means 11 of the fourth embodiment, and differs from the fourth embodiment in that it does not include the above-described stoppage means 10.

Figure 23:
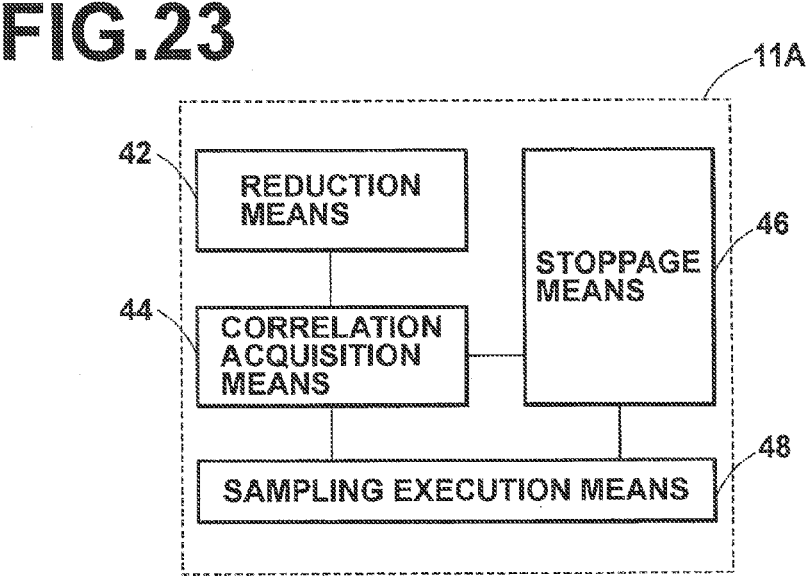
FIG. 23 is a block diagram showing the construction of the sampling means of the video image synthesizer constructed in accordance with the fifth embodiment.

FIG. 23 shows the construction of the sampling means 11A of the video image synthesizer shown in FIG. 22. As illustrated in FIG. 23, the sampling means 11A is equipped with reduction means 42, correlation acquisition means 44, stoppage means 46, and sampling execution means 48. The reduction means 42 performs a reduction process on video image data M0 to obtain reduced video image data. For the reduced video image data obtained by the reduction means 42, the correlation acquisition means 44 acquires a correlation between a reduction reference frame (which is discriminated from the reference frame in the video image data M0) and each of the succeeding reduction frames (which are discriminated from the contiguous frames in the video image data M0). The stoppage means 46 monitors the number of reduction frames whose correlation has been obtained by the correlation acquisition means 44, and stops the processing in the correlation acquisition means 44 when the frame number reaches a predetermined upper limit value. When the processing in the correlation acquisition means 44 is not stopped by the stoppage means 46, the sampling execution means 48 sets a sampling range on the basis of a correlation between adjacent reduction frames acquired by the correlation acquisition means 44, and samples frames from the video image data M0 in a range corresponding to the sampling range. The sampling range is from the reduction reference frame to a reduction frame, which is closer to the reduction reference frame, between a pair of adjacent reduction frames whose correlation is lower than a predetermined threshold value. On the other hand, when the processing in the correlation acquisition means 44 is stopped by the stoppage means 46, the sampling execution means 48 sets a sampling range from a reduction reference frame to a reduction frame being processed at the time of the stoppage, and samples frames from the video image data M0 in a range corresponding to the sampling range. Note that when acquiring a correlation between adjacent reduction frames, with a reduction reference frame as the first frame, a correlation between reduction frames adjacent after the reduction reference frame may be acquired. Also, with a reduction reference frame as the last frame, a correlation between reduction frames adjacent before the reduction reference frame may be acquired. Furthermore, a correlation between reduction frames adjacent before a reduction reference frame, and a correlation between reduction frames adjacent after the reduction reference frame, may be acquired and the aforementioned sampling range may include the reduction reference frame. In the fifth embodiment, a sampling range is detected with a reduction reference frame as the first frame.

The correlation acquisition means 44 in the fifth embodiment computes a histogram for the luminance component Y of each reduction frame, also computes a Euclidean distance between adjacent reduction frames employing the histogram, and employs the distance as a correlation value between adjacent reduction frames. When the processing in the correlation acquisition means 44 is not stopped by the stoppage means 46, the sampling execution means 48 sets a sampling range on the basis of a correlation between adjacent reduction frames acquired by the correlation acquisition means 44, and samples frames from the video image data M0 in a range corresponding to the sampling range. The sampling range is from the reduction reference frame to a reduction frame, which is closer to the reduction reference frame, between a pair of adjacent reduction frames whose correlation is lower than a predetermined threshold value (that is, a correlation value consisting of the Euclidean distance is higher than a predetermined threshold value). On the other hand, when the processing in the correlation acquisition means 44 is stopped by the stoppage means 46, the sampling execution means 48 sets a sampling range from a reduction reference frame to a reduction frame being processed at the time of the stoppage, and samples frames from the video image data M0 in a range corresponding to the sampling range.

The sampling means 11A outputs a plurality of frames (S frames) to the correspondent relationship acquisition means 12, which acquires a correspondent relationship between a pixel in a reference frame of the S frames and a pixel in the succeeding frame.

FIG. 24 shows processes that are performed in the fifth embodiment. As with the fourth embodiment, consider the case where a first interpolated frame FrH1, a second interpolated frame FrH2, and a weighting coefficient $\alpha(x°, y°)$ are acquired at real coordinates to which pixels of the frame FrN+1 in a synthesized image are assigned. In the video image synthesizer of the fifth embodiment, as shown in FIG. 24, video image data M0 is first input (step S62). To acquire a synthesized frame from the video image data M0, the reduction means 42 of the sampling means 11A performs a reduction process on the video image data M0 and obtains reduced video image data (step S64). The sampling execution means 48 sets a sampling range on the basis of a correlation between each reduction frame and a reduction reference frame acquired by the correlation acquisition means 44, and samples frames from the video image data M0 in a range corresponding to the sampling range. The sampling range is from the reduction reference frame to a reduction frame, which is closer to the reduction reference frame, between a pair of adjacent reduction frames whose correlation is lower than a predetermined threshold value. On the other hand, when the processing in the correlation acquisition means 44 is stopped by the stoppage means 46, the sampling execution means 48 sets a sampling range from a reduction reference frame to a reduction frame being processed at the time of the stoppage, and samples frames from the video image data M0 in a range corresponding to the sampling range. The S frames sampled by the sampling execution means 48 are output to the correspondent relationship acquisition means 12 (step S66). The correspondent relationship acquisition means 12 places a reference patch on the reference frame FrN (step S68), also places the same patch as the reference patch on the succeeding frame FrN+1, and moves and/or deforms the patch until a correlation value E between an image within the reference patch and an image within the patch of the succeeding frame FrN+1 converges (steps S72 and S74). The correspondent relationship acquisition means 12 acquires a correspondent relationship between the reference frame FrN and the succeeding frame FrN+1(step S78). The correspondent relationship acquisition means 12 performs the processes in steps S72 to S78 on all frames excluding the reference frame ("YES" in step S80, step S85).

The processes in steps S90 to S100 correspond to the processes in steps S50 to S60 of the fourth embodiment.

In the above-described fifth embodiment, a synthesized frame $Fr_G$ is acquired from two frames $Fr_N$ and $Fr_{N+1}$. Alternatively, it may be acquired from three or more frames, as with the above-described fourth embodiment.

Thus, in the video image synthesizer of the fifth embodiment, the sampling means 11A detects a plurality of frames representing successive scenes as a contiguous frame group when acquiring a synthesized frame from a video image, and acquires the synthesized frame from this frame group. Therefore, the operator does not need to sample frames manually, and the video image synthesizer can be conveniently used. In addition, a plurality of frames within the contiguous frame group represent scenes that have approximately the same contents, so the video image synthesizer is suitable for acquiring a synthesized frame of high quality.

In addition, in the video image synthesizer of the fifth embodiment, there is provided a predetermined upper limit value. In detecting a contiguous frame group, the detection of frames is stopped when the number of frames in that contiguous frame group reaches the predetermined upper limit value. This can avoid employing a great number of frames wastefully when acquiring one synthesized frame, and makes it possible to perform processing efficiently.

In the fifth embodiment, although the correlation acquisition means 44 of the sampling means 11A computes a Euclidean distance for a luminance component Y between two adjacent reduction frames as a correlation value, it may also compute three Euclidean distances for a luminance component Y and two color difference components Cb and Cr to employ the sum of the three Euclidean distances as a correlation value. Alternatively, by computing a difference in pixel value between corresponding pixels of adjacent reduction frames, the sum of absolute values of the pixel value differences may be employed as a correlation value.

Further, in computing a Euclidean distance for a luminance component Y (or the sum of three Euclidean distance for a luminance component Y and two color difference components Cb and Cr) as a correlation value, expedient processing may be achieved by dividing the luminance component Y (or three components Y, Cb, and Cr) by a value greater than 1 and acquiring a histogram.

In the fifth embodiment, although the correlation acquisition means 44 of the sampling means 11A computes a correlation value employing the reduced video image data of the video image data M0, it may also employ the video image data M0 itself, or video image data obtained by thinning the video image data M0.

Now, a description will be given of a sixth embodiment of the present invention. FIG. 25 shows a video image synthesizer constructed in accordance with the sixth embodiment of the present invention. Since the same reference numerals will be applied to the same parts as the fourth embodiment, a detailed description of the same parts will not be given. The sixth embodiment is equipped with sampling means 11B instead of the sampling means 11 of the fourth embodiment. The sampling means 11B extracts a frame group constituting one or more important scenes from input video image data M0, and also determines one reference frame from a plurality of frames constituting that frame group. The sixth embodiment differs from the fourth embodiment in that it does not include the aforementioned stoppage means 10 and that correspondent relationship acquisition means 12 acquires a correspondent relationship between a pixel in the reference frame of each frame group extracted by the sampling means 11B and a pixel in a frame other than the reference frame.

FIG. 26 shows the construction of the sampling means 11B of the video image synthesizer shown in FIG. 25. As illustrated in FIG. 26, the sampling means 11B is equipped with image-type input means 52, extraction control means 54, first extraction means 56, second extraction means 58, and reference-frame determination means 60. The image-type input means 52 inputs a designation of either an "ordinary image" or a "security camera image" to indicate the type of video image data M0. The extraction control means 54 controls operation of the first extraction means 56 and second extraction means 58. The first extraction means 56 computes a correlation between adjacent frames in the video image data M0, extracts as a first frame group a set of contiguous frames whose correlation is high, and outputs the first frame group to the reference-frame determination means 60 or to second extraction means 58. The second extraction means 58 computes a correlation between center frames of the first frame groups extracted by the first extraction means 56 and extracts the first frame group interposed between two first frame groups whose correlation is high and which are closest to each other, as a second frame group. The reference-frame determination means 60 determines the center frame of each frame group output by the first extraction means 56 or second extraction means 58, as a reference frame for that frame group.

When the type of video image data M0 input by the image-type input means 52 is an ordinary image, the extraction control means 54 causes the first extraction means 56 to extract first frame groups and output the extracted first frame groups to the reference-frame determination means 60. On the other hand, when the type of video image data M0 input by the image-type input means 52 is a security camera image, the extraction control means 54 causes the first extraction means 56 to extract first frame groups and output the extracted first frame groups to the second extraction means 58, and also causes the second extraction means 58 to extract second frame groups from the first frame groups and output them to the reference-frame determination means 60.

Figure 27A:
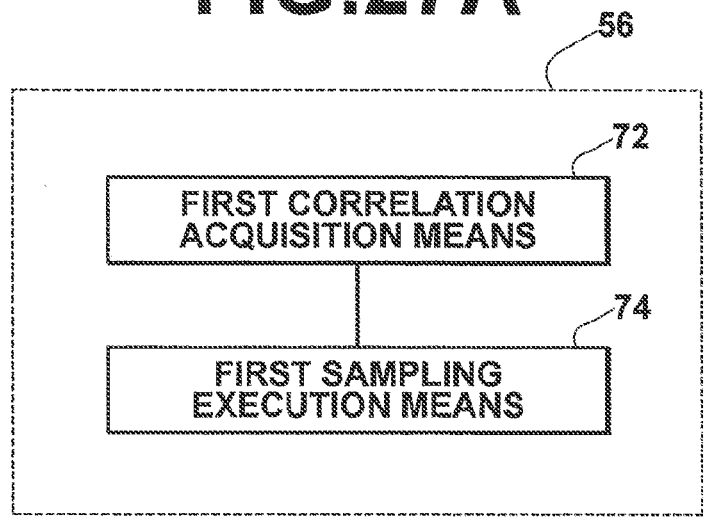
FIGS. 27A and 27B are diagrams to explain the construction of first extraction means in the sampling means shown in FIG. 26.
Figure 27B:
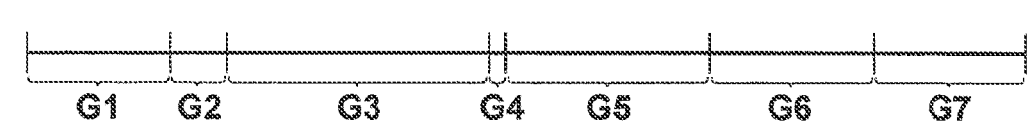

FIG. 27A shows the construction of the first extraction means 56 in the sampling means 11B shown in FIG. 26; FIG. 27B shows a frame group extracted from the video image data M0 by the first extraction means 56.

As shown in FIG. 27A, the first extraction means 56 is equipped with first correlation computation means 72 for computing a correlation between adjacent frames of the video image data M0, and first sampling execution means 74 for extracting as a first frame group a set of frames whose correlation is high. The first correlation computation means 72 computes a histogram for the luminance component Y of each frame of the video image data M0, also computes a Euclidean distance between adjacent frames employing this histogram, and employs the Euclidean distance as a correlation value between frames. Based on the correlation value between adjacent frames acquired by the first correlation computation means 72, the first sampling execution means 74 extracts a set of contiguous frames whose correlation value is smaller than a predetermined threshold value (that is, the correlation is higher than the predetermined threshold value), as a first frame group. For example, a plurality of first frame groups G1 to G7 are extracted as shown in FIG. 27B.

Figure 28:
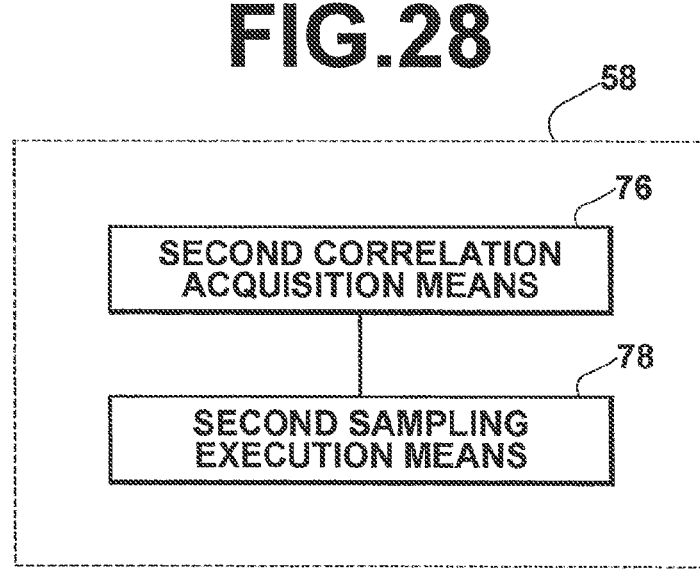
FIG. 28 is a diagram showing the construction of second extraction means in the sampling means shown in FIG. 26.

FIG. 28 shows the construction of the second extraction means 58 in the sampling means 11B shown in FIG. 26. The second extraction means 58 extracts second frame groups from the first frame groups extracted by the first extraction means 56, when the video image data is a security camera image. As illustrated in FIG. 28, the second extraction means 58 is equipped with second correlation computation means 76 and second sampling execution means 78. With respect to the first frame groups extracted by the first extraction means 56 (e.g., G1, G2 . . . G7 in FIG. 27B), the second correlation computation means 76 computes a Euclidean distance for the luminance component Y between center frames of the first frame groups not adjacent (e.g. center frames of G1 and G3, G1 and G4, G1 and G5, G1 and G6, G1 and G7, G2 and G4, G2 and G5, G2 and G6, G2 and G7, . . . , G4 and G6, G4 and G7, and G5 and G7 in FIG. 27B), and employs the Euclidean distance between center frames as a correlation value between the first frame groups to which the center frames belong. Based on each correlation value acquired by the second correlation computation means 76, the second sampling execution means 78 extracts the first frame group interposed between two first frame groups whose correlation value is smaller than a predetermined threshold value (that is, correlation is higher than the predetermined threshold value) and which are closest to each other, as a second frame group. For example, in the first frame groups shown in FIG. 27A, if (G1 and G3) and (G4 and G7) are first frame groups whose correlation is high and which are closest to each other, G2 between G1 and G3 and (G5+G6) between G4 and G7 are extracted as second frame groups.

Now, a description will be given of characteristics of the first and second frame groups. When picking up an image, there is a tendency to pick up an interesting scene for a relatively long time (e.g., a few seconds) without moving a camera, so frames having approximately the same contents for a relatively long time can be considered to be an important scene in ordinary video image data. That is, the first extraction means 56 of the sampling means 11B of the video image synthesizer shown in FIG. 25 is used to extract important scenes from the video image data of an ordinary image.

On the other hand, in the case of a video image (security camera image) taken by a security camera, different scenes for a short time (e.g., scenes picking up an intruder), included in scenes of the same contents which continues for a long time, can be considered important scenes. Therefore, a second frame group, extracted by the second extraction means 58 of the sampling means 11B of the video image synthesizer shown in FIG. 25, can be considered a frame group that represents an important scene in the case of a security camera image.

With respect to the first frame groups output from the first extraction means 56 or second frame groups output from the second extraction means 58, the reference-frame determination means 60 of the sampling means 11B determines the center frame of each frame group as the reference frame of the frame group, and also outputs each frame group to the frame synthesis means along with information representing a reference frame. In the case where a second frame group consists of a plurality of first frame groups, like the aforementioned example (G5 and G6), the center frame of all frames included in the second frame group is employed as the center frame of the second frame group.

With respect to the frame groups output from the sampling means 11B, the correspondent relationship acquisition means 12 and frame synthesis means acquire a synthesized frame $Fr_G$ for each frame group, and the process of acquiring a synthesized frame $Fr_G$ is the same in each frame group, so a description will be given of the process of acquiring a synthesized frame from one frame group by the correspondent relationship acquisition means 12 and frame synthesis means.

With respect to one frame group (which consists of T frames) output from the sampling means 11B, the correspondent relationship acquisition means 12 acquires a correspondent relationship between a pixel in a reference frame of the T frames and a pixel in each of the (T−1) frames other than the reference frame. Note that the correspondent relationship acquisition means 12 acquires a correspondent relationship between the reference frame $Fr_N$ and the succeeding frame $Fr_{N+1}$ by the same process as the process performed in the correspondent relationship acquisition means 2 of the above-described first embodiment.

Figure 29:
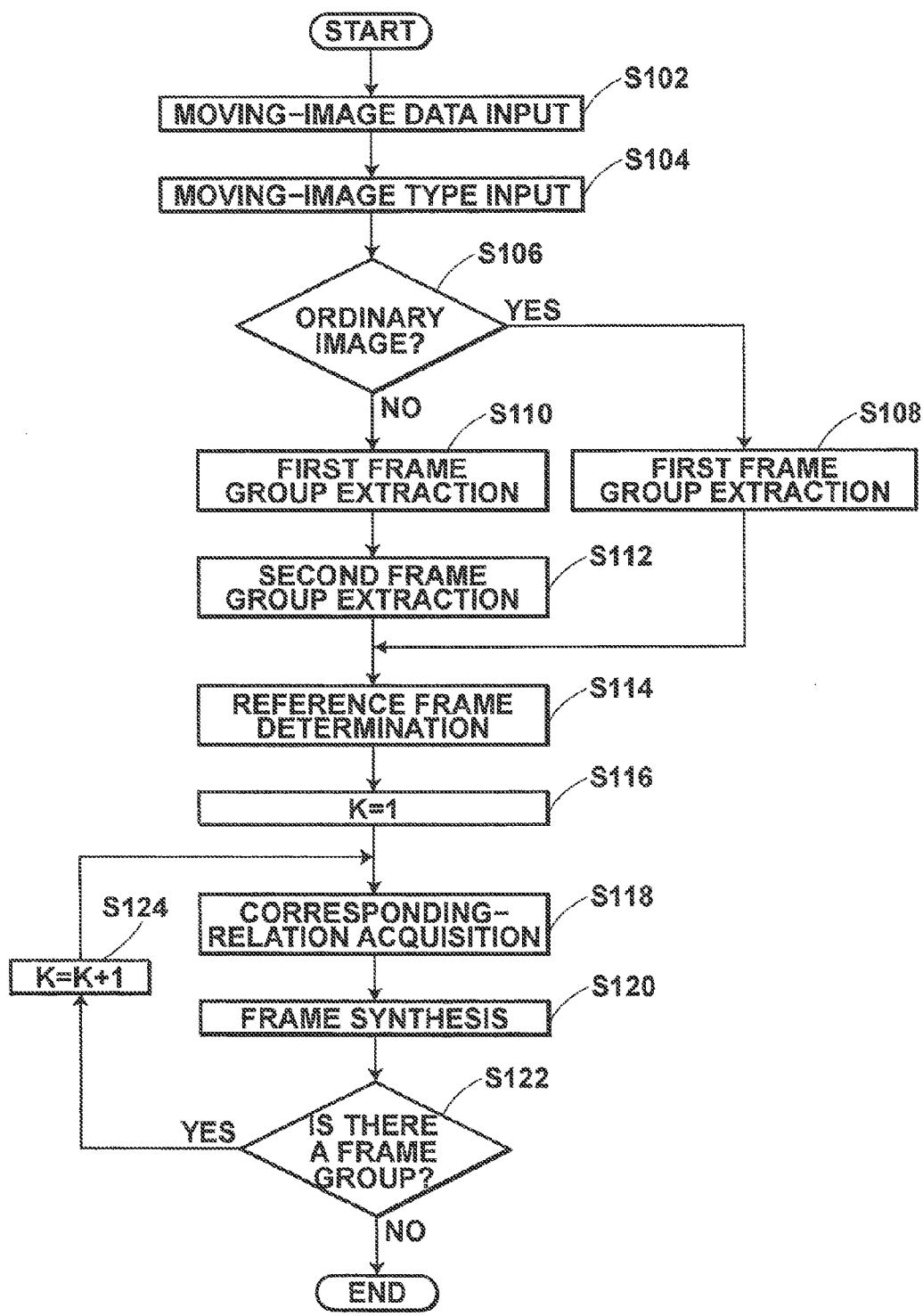
FIG. 29 is a flowchart showing processes that are performed in the sixth embodiment.

FIG. 29 shows processes that are performed in the sixth embodiment. In the video image synthesizer of the sixth embodiment, as shown in FIG. 29, video image data M0 is first input (step S102). Based on the image type (ordinary image or security camera image) of the video image data M0 input through the image-type input means 52, the extraction control means 54 controls operation of the first extraction means 56 or second extraction means 58 to extract a frame group that constitutes an important scene (steps S104 to S116). More specifically, if the image type of video image data M0 is an ordinary image ("YES" in step S106), the extraction control means 54 causes the first extraction means 56 to extract first frame groups and output them to the reference-frame determination means 60 as frame groups that constitute an important scene (step S108). On the other hand, if the video image data M0 is a security camera image ("NO" in step S106), the extraction control means 54 causes the first extraction means 56 to extract first frame groups and output them to the second extraction means 58 (step S110), and also causes the second extraction means 58 to extract second frame groups from the first frame groups extracted by the first extraction means 56 and output the extracted second frame groups to the reference-frame determination means 60 as frame groups that constitute an important scene in the video image data M0 (step S112).

With respect to the first frame groups output from the first extraction means 56 or second frame groups output from the second extraction means 58, the reference-frame determination means 60 determines the center frame of each frame group as the reference frame of the frame group, and also outputs each frame group to the correspondent relationship acquisition means 12 and frame synthesis means along with information representing a reference frame (step S114).

The correspondent relationship acquisition means 12 acquires a correspondent relationship between a reference frame and a frame other than the reference frame, for each frame group. Based on the correspondent relationship obtained by the correspondent relationship acquisition means 12, the frame synthesis means (which consists of spatiotemporal interpolation means 4, etc.) acquires a synthesized frame for each frame group with respect to all frame groups output from the sampling means 11B (steps S116, S118, S120, S122, and S124).

Thus, in the video image synthesizer of the sixth embodiment, the sampling means 11B extracts frame groups constituting an important scene from video image data M0 and determines the center frame of a plurality of frames constituting each frame group, as the reference frame of the frame group. Therefore, the operator does not need to set a reference frame manually, and the video image synthesizer can be conveniently used. In sampling a plurality of frames, unlike a method of setting a reference frame and then sampling frames in a range including the reference frame, frames constituting an important scene included in video image data are extracted and then a reference frame is determined so that a synthesized frame is obtained for each important scene. Thus, the intention of an photographer can be reflected.

Further, the video image synthesizer of the sixth embodiment are equipped with two extraction means so that, based on the type of video image data (e.g., the purpose for which video image data M0 is used), an important scene coinciding with the type can be extracted. Thus, synthesized frames, which coincide with the purpose of an photographer, can be obtained efficiently. For instance, in the case of ordinary images, synthesized frames can be obtained for each scene interesting to an photographer. In the case of security camera images, synthesized frames can be obtained for only scenes required for preventing crimes.

Figure 30:
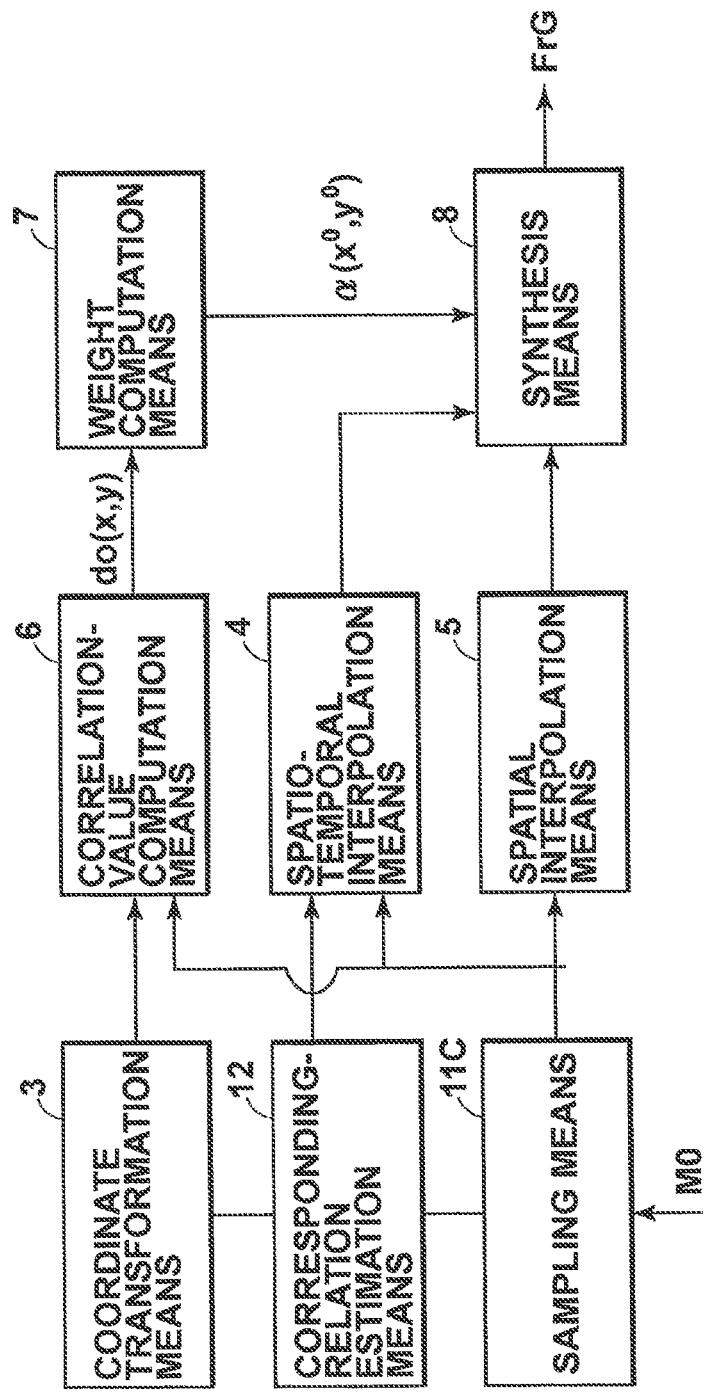
FIG. 30 is a schematic block diagram showing a video image synthesizer constructed in accordance with a seventh embodiment of the present invention.

FIG. 30 shows a video image synthesizer constructed in accordance with a seventh embodiment of the present invention. The same reference numerals will be applied to the same parts as the sixth embodiment, so a detailed description of the same parts will not be given.

As illustrated in the figure, the video image synthesizer of the seventh embodiment differs from the sixth embodiment in that it is equipped with sampling means 11C instead of the sampling means 11B in the video image synthesizer of the sixth embodiment. The sampling means 11C of the seventh embodiment extracts a frame group constituting one or more important scenes from input video image data M0, and also determines one reference frame from a plurality of frames constituting each frame group.

Figure 31:
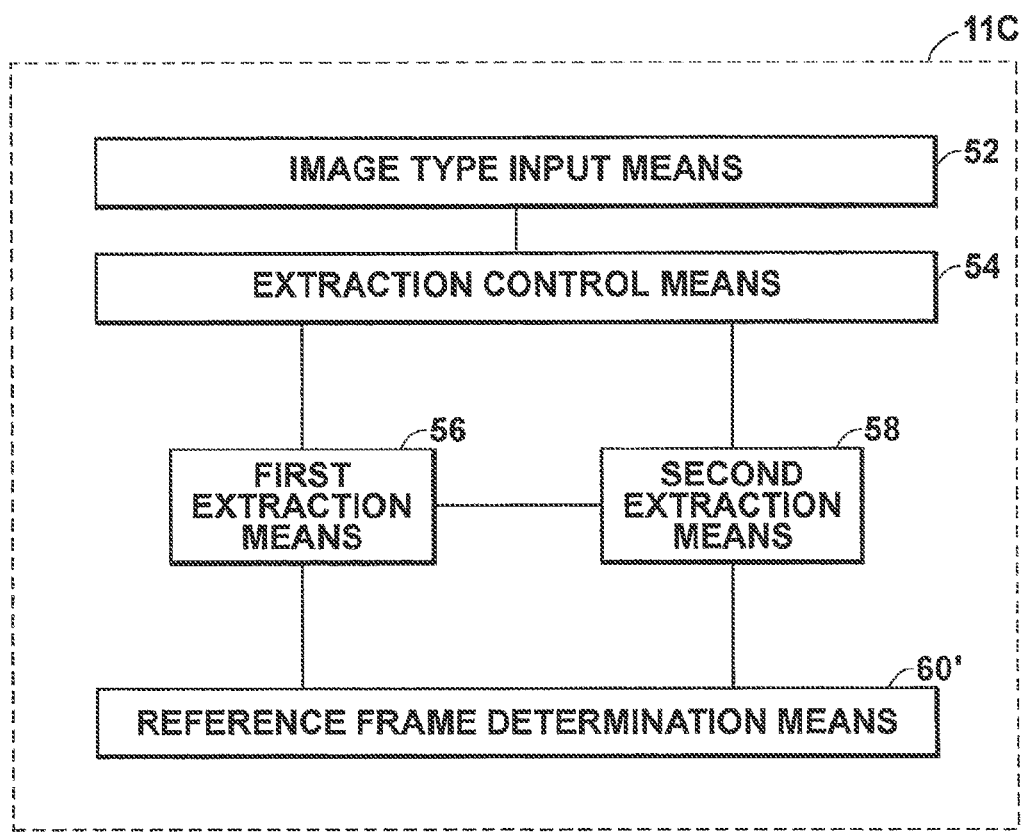
FIG. 31 is a block diagram showing the construction of the sampling means of the video image synthesizer constructed in accordance with the seventh embodiment.

FIG. 31 shows the construction of the sampling means 11C of the video image synthesizer shown in FIG. 30. As illustrated in FIG. 31, the sampling means 11C of the video image synthesizer of the seventh embodiment has the same construction as that of the sampling means 11B of the video image synthesizer of the sixth embodiment except reference-frame determination means (60, 60').

With respect to each frame group output from first extraction means 56 or second extraction means 58, the reference-frame determination means 60' of the sampling means 11C of the video image synthesizer of the seventh embodiment determines a frame that is most in focus among a plurality of frames constituting a frame group, as the reference frame of that frame group. More specifically, to determine the reference frame of one frame group, the high-frequency components of frames constituting that frame group are extracted, the sum total of high-frequency components is computed for each frame, and a frame whose sum total is highest is determined as the reference frame of that frame group. Note that a method of extracting high-frequency components may be any method that is capable of extracting high-frequency components. For instance, a differential filter or Laplacian filter may be employed, or Wavelet transformation may be performed.

According to the video image synthesizer of the seventh embodiment, the same advantages as the video image synthesizer of the sixth embodiment can be obtained, and when picking up images, a frame that is most in focus is determined as a reference frame by taking advantage of the fact that a camera is often focused on an important scene. This is able to make a contributory degree to the acquisition of synthesized frames of high quality.

In computing a correlation value, the first correlation acquisition means 72 and second correlation acquisition means 76 of the sampling means 11B and sampling means 11C in the video image synthesizers of the above-described sixth and seventh embodiments compute a Euclidean distance for a luminance component Y between two frames as a correlation value. However, by computing three Euclidean distances for a luminance component Y and two color difference components Cb and Cr, the sum of the three Euclidean distances may be employed as a correlation value. Also, by computing a difference in pixel value between corresponding pixels of two frames, the sum of absolute values of the pixel value differences may be employed as a correlation value.

Further, expedient processing may be achieved by employing the video image data M0 itself, or video image data obtained by thinning the video image data M0, when computing a correlation.

In the above-described sixth and seventh embodiments, a synthesized frame $Fr_G$ is acquired from two frames $Fr_N$ and $Fr_{N+1}$. Alternatively, it may be acquired from three or more frames, as in the above-described fourth embodiment.

Figure 32:
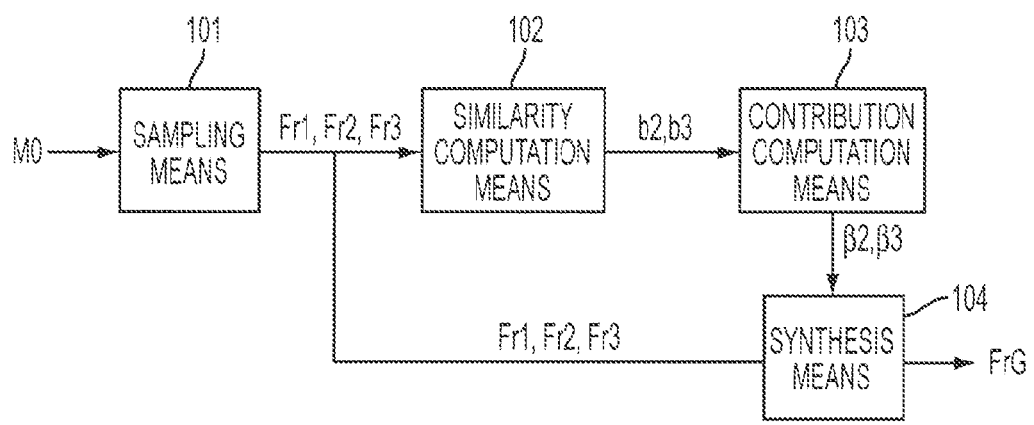
FIG. 32 is a schematic block diagram showing an image processor constructed in accordance with an eighth embodiment of the present invention.

Now, a description will be given of an eighth embodiment of the present invention. FIG. 32 shows an image processor constructed in accordance with the eighth embodiment of the present invention. As illustrated in the figure, the image processor of the eighth embodiment of the present invention is equipped with sampling means 101, similarity computation means 102, contributory degree computation means 103, and synthesis means 104. The sampling means 101 samples a plurality of frames $Fr_1, Fr_2 \ldots Fr_N$ from video image data M0. The similarity computation means 102 computes similarities b2, b3 ... bn between one frame to be processed (e.g., frame $Fr_1$) and other frames $Fr_2 \ldots Fr_N$. Based on the similarities computed by the similarity computation means 102, the contributory degree computation means 103 computes contributory degrees (i.e., weighting coefficients) β1, β2 ... βn that are employed in weighting the frames $Fr_2 \ldots Fr_N$ and adding the weighted frames to the frame $Fr_1$. In accordance with the contributory degrees β1, β2 ... βn, the synthesis means 104 weights the frames $Fr_2 \ldots Fr_N$ and adds the weighted frames to the frame $Fr_1$ and acquires a processed frame $Fr_G$.

The sampling means 101 samples frames $Fr_1, Fr_2 \ldots Fr_N$ from video image data M0 at equal temporal intervals. In the eighth embodiment, three frames $Fr_1, Fr_2,$ and $Fr_3$ temporally adjacent are employed and frames $Fr_2$ and $Fr_3$ are weighted and added to frame $Fr_1$.

The similarity computation means 102, as shown in FIG. 33, performs the parallel movement or affine transformation of $Fr_1$ with respect to frame $Fr_2$ and frame $Fr_3$. When the correlation between a pixel value in frame $Fr_1$ and a pixel value in frame $Fr_2$ or $Fr_3$ is highest, the accumulation of the square of a difference between pixel values in frame $Fr_1$ and frame $Fr_2$ and square of a difference between pixel values in frame $Fr_1$ and frame $Fr_3$, or the reciprocal of the accumulation of absolute values, are computed as similarities b2 and b3.

Note that a correlation between corresponding pixels becomes highest when the accumulation of the square of differences between pixel values in frame $Fr_1$ and frames $Fr_2$ and $Fr_3$ or the reciprocal of the accumulation of absolute values becomes smallest. Therefore, similarities b2 and b3 have a great value if frames $Fr_2$ and $Fr_3$ are similar to frame $Fr_1$. In FIG. 33, when a subject Q0 in frame $Fr_1$ coincides with a subject Q0 in frame $Fr_2$ or $Fr_3$, the correlation between a pixel value in frame $Fr_1$ and a pixel value in frame $Fr_2$ or $Fr_3$ becomes highest.

The contributory degree computation means 103 computes contributory degrees β2 and β3, which are employed in weighing frames $Fr_2$ and $Fr_3$ and adding to frame $Fr_1$, by multiplying similarities b2 and b3 by a predetermined reference contributory degree k.

The synthesis means 104 acquires a processed frame $Fr_G$ by weighting frames $Fr_2$ and $Fr_3$ and adding to frame $Fr_1$, in accordance with contributory degrees β2 and β3. More specifically, if frame data representing frames $Fr_1, Fr_2,$ and $Fr_3$ are S1, S2, and S3, and frame data representing a processed frame $Fr_G$ is SG, the processed frame data SG is computed by the following Eq. 25.

$$SG = S1 + \beta2 \cdot S2 + \beta3 \cdot S3 \qquad (25)$$

For example, in the case where frame $Fr_2$ has a pixel size of 4×4, each pixel has a value shown in FIG. 34A, and contributory degree β2 is 0.1, a pixel value of each pixel in frame $Fr_2$ that is added to frame $Fr_1$ is one-tenth a value shown in FIG. 34A, as shown in FIG. 34B.

Note that frame data S1, S2, and S3 may be red, green, and blue data, respectively. They may also be luminance data and color difference data, or may be only luminance data.

Now, a description will be given of operation of the eighth embodiment. FIG. 35 shows processes that are performed in the eighth embodiment. First, the sampling means 101 samples frames $Fr_1, Fr_2,$ and $Fr_3$ from video image data M0 (step S131). Then, in the similarity computation means 102, similarities b2 and b3 between frame $Fr_1$ and frames $Fr_2, Fr_3$ are computed (step S132). In the contributory degree computation means 103, contributory degrees β2 and β3 are computed by multiplying similarities b2 and b3 by a reference contributory degree k (step S133). Next, in accordance with contributory degrees β2 and β3, frames $Fr_2$ and $Fr_3$ are weighted and added to frame $Fr_1$, whereby a processed frame $Fr_G$ is obtained (step S134) and the processing ends.

Thus, in the eighth embodiment, with respect to frames Fr2 and Fr3 temporally before and after frame Fr1, similarities b2 and b3 with frame Fr1 are computed, and if similarities b2 and b3 are great, contributory degrees (weighting coefficients) β2 and β3 are made greater. Frames Fr2 and Fr3 are weighted and added to frame Fr1, whereby a processed frame FrG is obtained. Because of this, there is no possibility that a frame not similar to frame Fr1, as it is, will be added to frame Fr1. This renders it possible to add frames Fr2 and Fr3 to frame Fr1 while reducing the influence of dissimilar frames. Consequently, a processed frame FrG with high quality can be obtained while reducing blurring that is caused by synthesis of frames whose similarity is low.

In the above-described eighth embodiment, although a processed frame $Fr_G$ is obtained by multiplying frames $Fr_2$ and $Fr_3$ by contributory degrees β2 and β3 and adding the weighted frames to frame $Fr_1$, a processed frame $Fr_G$ with higher resolution than frame $Fr_1$ may be obtained by interpolating frames $Fr_2$ and $Fr_3$ multiplied by contributory degrees β2 and β3 in frame $Fr_1$, like a method disclosed in Japanese Unexamined Patent Publication No. 2000-354244, for example.

Figure 36:
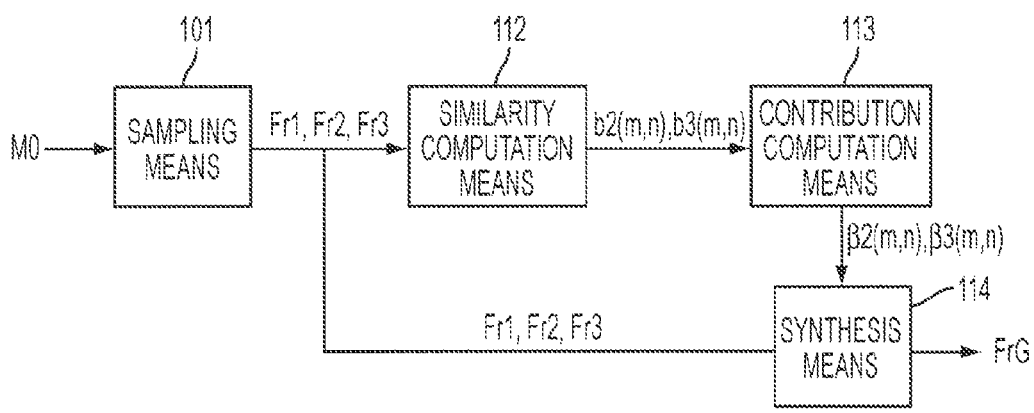
FIG. 36 is a schematic block diagram showing an image processor constructed in accordance with a ninth embodiment of the present invention.

Now, a description will be given of a ninth embodiment of the present invention. FIG. 36 shows an image processor constructed in accordance with the ninth embodiment of the present invention. In the ninth embodiment, the same reference numerals will be applied to the same parts as the eighth embodiment, so a detailed description of the same parts will not be given. As shown in FIG. 36, the image processor of the ninth embodiment is equipped with similarity computation means 112, contributory degree computation means 113, and synthesis means 114, instead of the similarity computation means 102, contributory degree computation means 103, and synthesis means 104 of the eighth embodiment. The similarity computation means 112 partitions frame $Fr_1$ into m X n block-shaped areas A1(m, n) and computes similarities b2(m, n) and b3(m, n) for areas A2(m, n) and A3(m, n) in frames $Fr_2$ and $Fr_3$ which correspond to area A1(m, n). The contributory degree computation means 113 computes contributory degrees β2(m, n) and β3(m, n) for areas A2(m, n) and A3(m, n). In accordance with the computed contributory degrees β2(m, n) and β3(m, n), the synthesis means 114 weights the corresponding areas A2(m, n) and A3(m, n) and adds the weighted areas to area A1(m, n), thereby acquiring a processed frame $Fr_G$.

Figure 37:
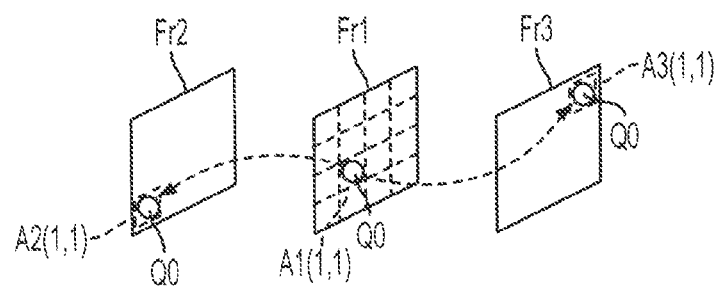
FIG. 37 is a diagram to explain the computation of a similarity for each region.

FIG. 37 shows how similarities are computed in accordance with the ninth embodiment. As illustrated in the figure, the similarity computation means 112 partitions frame $Fr_1$ into m×n block-shaped areas A1(m, n) and performs the parallel movement or affine transformation of each of the areas A1(m, n) with respect to frame $Fr_2$ and frame $Fr_3$. Further, areas in frames $Fr_2$ and $Fr_3$, in which a correlation between a pixel value in area A(m, n) and a pixel value in frame $Fr_2$ or $Fr_3$ is highest, are detected as corresponding areas A2(m, n) and A3(m, n) by the similarity computation means 112. When the correlation between pixel values is highest, the accumulation of the square of a difference between pixel values in area A1(m, n) and area A2(m, n) and square of a difference between pixel values in area A1(m, n) and area A3(m, n), or the reciprocal of the accumulation of absolute values, is computed as similarities b2(m, n) and b3(m, n).

For instance, in FIG. 37, areas in frames $Fr_2$ and $Fr_3$, which include a subject Q0 included in frame $Fr_1$ and have the same size as area A1(1, 1), are detected as corresponding areas A2(1, 1) and A3(1, 1).

The contributory degree computation means 113 computes contributory degrees β2(m, n) and β3(m, n), which are employed in weighing the corresponding areas A2(m, n) and A3(m, n) and adding to the area A1(m, n), by multiplying similarities b2(m, n) and b3(m, n) by a predetermined reference contributory degree k.

The synthesis means 114 acquires a processed frame $Fr_G$ by weighting the corresponding areas A2(m, n) and A3(m, n) and adding to the area A1(m, n), in accordance with contributory degrees β2(m, n) and β3(m, n). More specifically, if frame data representing area A1(m, n) and corresponding areas A2(m, n) and A3(m, n) are S1(m, n), S2(m, n), and S3(m, n), and processed frame data representing an area (processed area) corresponding to area A1(m, n) in a processed frame $Fr_G$ is SG (m, n), the processed frame data SG(m, n) is computed by the following Formula 26.

$$SG(m,n)=S1(m,n)+\beta 2(m,n)\cdot S2(m,n)+\beta 3(m,n)\cdot S3(m,n) \quad (26)$$

Figure 38:
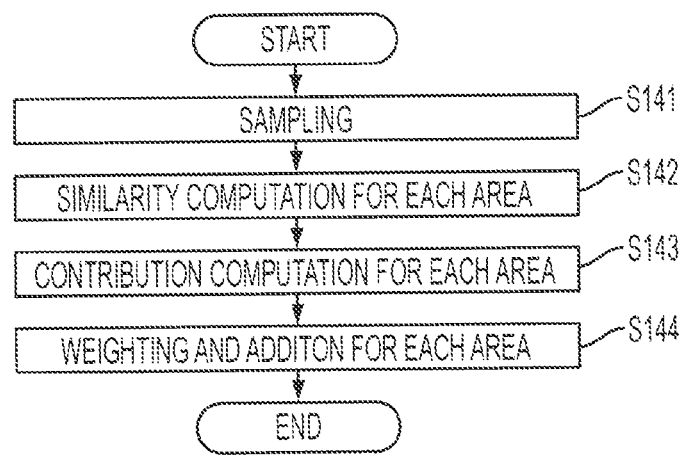
FIG. 38 is a flowchart showing processes that are performed in the ninth embodiment.

Now, a description will be given of operation of the ninth embodiment. FIG. 38 shows processes that are performed in the ninth embodiment. First, the sampling means 101 samples frames Fr1, Fr2, and Fr3 from video image data M0 (step S141). Then, in the similarity computation means 112, similarities b2(m, n) and b3(m, n) between area A1(m, n) in frame Fr1 and corresponding areas A2(m, n) and A3(m, n) are computed (step S142). Next, in the contributory degree computation means 113, contributory degrees β2(m, n) and β3(m, n) are computed by multiplying similarities b2(m, n) and b3(m, n) by a reference contributory degree k (step S143). In accordance with contributory degrees β2(m, n) and β3(m, n), corresponding areas A2(m, n) and A3(m, n) are weighted and added to area A1(m, n), whereby a processed frame FrG is obtained (step S144) and the processing ends.

Thus, in the ninth embodiment, frame Fr1 is partitioned into a plurality of areas A1(m, n), and similarities b2(m, n) and b3(m, n) are computed for area A2(m, n) and area A3(m, n) in frames Fr2 and Fr3 which correspond to area A1(m, n). If similarities b2(m, n) and b3(m, n) are great, contributory degrees (weighting coefficients) β2(m, n) and β3(m, n) are made greater. Corresponding areas A2(m, n) and area A3(m, n) are weighted and added to area A1(m, n), whereby a processed frame FrG is obtained. Because of this, even when a certain area in a video image is moved, blurring can be removed for each area moved. As a result, a processed frame FrG with high quality can be obtained.

In the above-described ninth embodiment, although a processed frame $Fr_G$ is obtained by multiplying the corresponding areas A2(m, n) and A3(m, n) of frames $Fr_2$ and $Fr_3$ by contributory degrees β2(m, n) and β3(m, n) and adding the weighted areas to area A1(m, n), a processed frame $Fr_G$ with higher resolution than frame $Fr_1$ may be obtained by interpolating the areas A2(m, n) and A3(m, n) multiplied by contributory degrees β2(m, n) and β3(m, n) in area A1(m, n), like a method disclosed in Japanese Unexamined Patent Publication No. 2000-354244, for example.

Figure 39:
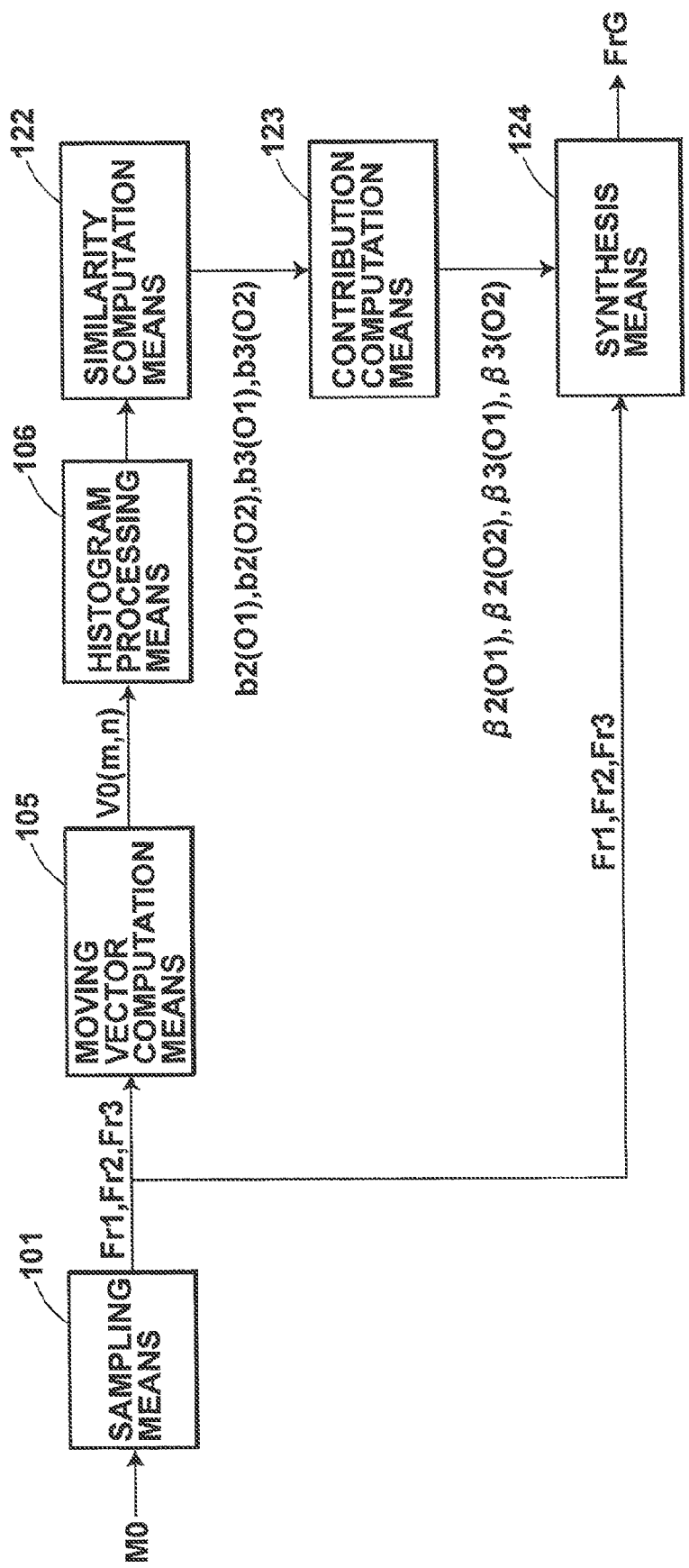
FIG. 39 is a schematic block diagram showing an image processor constructed in accordance with a tenth embodiment of the present invention.

Now, a description will be given of a tenth embodiment of the present invention. FIG. 39 shows an image processor constructed in accordance with the tenth embodiment of the present invention. In the tenth embodiment, the same reference numerals will be applied to the same parts as the eighth embodiment, so a detailed description of the same parts will not be given. As illustrated in FIG. 39, the image processor of the tenth embodiment is equipped with motion-vector computation means 105 and histogram processing means 106. The motion-vector computation means 105 partitions frame $Fr_1$ into m×n areas A1(m, n) and computes a motion vector V0(m, n) that represents the moving direction and moved quantity of area A1(m, n), for each area A1(m, n). The histogram processing means 106 computes a histogram H0, in which the magnitude of motion vector V0(m, n) is represented in the horizontal axis and the number of motion vectors V0(m, n) is represented in the vertical axis. Further, based on peaks in histogram H0, areas A1(m, n) are grouped for each subject corresponding to the motion, and frame $Fr_1$ is partitioned into a plurality of subject areas (e.g., O1 and O2 in this embodiment).

The image processor of the tenth embodiment is further equipped with similarity computation means 122, contributory degree computation means 123, and synthesis means 124, instead of the similarity computation means 102, contributory degree computation means 103, and synthesis means 104 of the eighth embodiment. The similarity computation means 122 computes similarities b2(O1), b2(O2), b3(O1), and b3(O2) for subject areas O1($Fr_2$), O2($Fr_2$), O1($Fr_3$), and O2($Fr_3$) in frames $Fr_2$ and $Fr_3$ which correspond to the subject areas O1($Fr_1$) and O2($Fr_1$) of frame $Fr_1$. The contributory degree computation means 123 computes contributory degrees β2(O1), β2(O2), β3(O1), and β3(O2) for subject areas O1($Fr_2$), O2($Fr_2$), O1($Fr_3$), and O2($Fr_3$). In accordance with the computed contributory degrees β2(O1), β2(O2), β3(O1), and β3(O2), the synthesis means 114 weights the corresponding subject areas O1($Fr_2$), O2($Fr_2$), O1($Fr_3$), and O2($Fr_3$) and adds the weighted areas to subject areas O1($Fr_1$), O2($Fr_1$), thereby acquiring a processed frame $Fr_G$.

Figure 40:
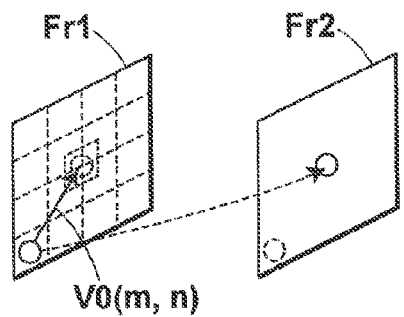
FIG. 40 is a diagram to explain the computation of a motion vector for each region.

FIG. 40 shows how motion vector V0(m, n) is computed in accordance with the tenth embodiment. If either a motion vector between frames $Fr_1$ and $Fr_2$ or a motion vector between frames $Fr_1$ and $Fr_3$ is computed, frame $Fr_1$ can be partitioned into a plurality of subject areas, so only the computation of a motion vector between frames $Fr_1$ and $Fr_2$ will be described.

As illustrated in FIG. 40, the motion-vector computation means 105 partitions frame Fr1 into m×n block-shaped areas A1(m, n) and moves each of the areas A(m, n) in parallel with frame Fr1. When a correlation between pixel values in area A1(m, n) and frame Fr2 is highest, the moved quantity and moving direction of area A1(m, n) is computed as motion vector V0(m, n) for that area A1(m, n). Note that when the accumulation of the squares of differences between pixel values of area A1(m, n) and frame Fr2 or accumulation of absolute values is smallest, the correlation is judged to be highest.

Figure 41A:
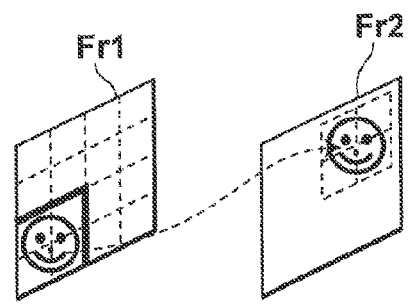
FIGS. 41A and 41B are diagrams to explain how frame $Fr_1$ is partitioned into a plurality of subject areas.
Figure 41B:
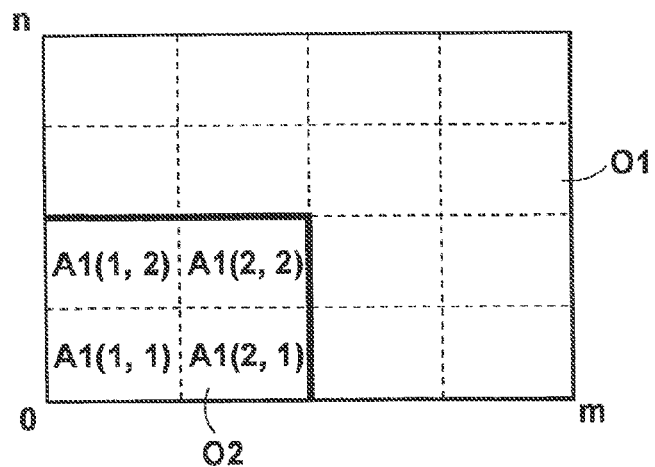

Now, assume that as shown in FIG. 41A, only the face of a person in frame $Fr_1$ has moved from the lower left part of frame $Fr_2$ to the upper right part of frame $Fr_2$. In this case, the magnitude of motion vector V0(m, n) becomes greater for 4 areas A1(1, 1), A1(2, 1), A1(1, 2), and A1(2, 2) in the case of frame $Fr_1$ shown in FIG. 41B and smaller for other areas.

Figure 42:
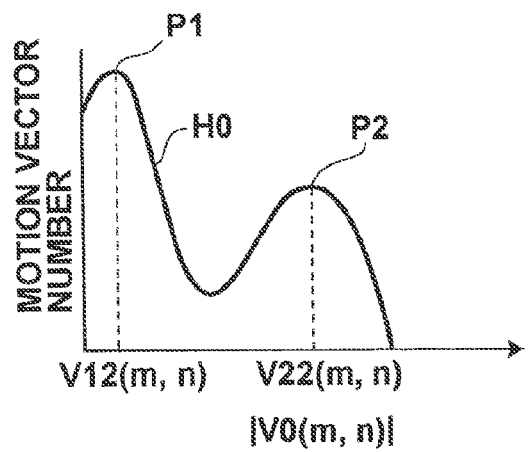
FIG. 42 is a diagram showing an example of a histogram.

Therefore, if the magnitude |V0(m, n)| of motion vector V0(m, n) is represented by a histogram H0, there are two peaks, as shown in FIG. 42. Peak P1 corresponds to the motion vector V12(m, n) of areas other than areas A1(1, 1), A1(2, 1), A1(1, 2), and A1(2, 2), while peak P2 corresponds to the motion vector V22(m, n) of areas A1(1, 1), A1(2, 1), A1(1, 2), and A1(2, 2).

Therefore, a plurality of areas A1(m, n) are represented by a first subject area O1 having a motion vector close to motion vector V12(m, n) and a second subject area O2 having a motion vector close to motion vector V22(m, n), so frame $Fr_1$ can be partitioned into two subject areas O1 and O2.

The similarity computation means 122 moves the subject areas O1 and O2 of frame $Fr_1$ in parallel with frames $Fr_2$ and $Fr_3$. Further, areas in frames $Fr_2$ and $Fr_3$, in which a correlation between pixel values in subject areas O1, O2 and frames $Fr_2$, $Fr_3$ is highest, are detected as corresponding subject areas O1($Fr_2$), O2($Fr_2$), O1($Fr_3$), and O2($Fr_3$) by the similarity computation means 122. When the correlation between pixel values is highest, the reciprocal of the square of a difference between pixel values in subject areas O1, O2 and corresponding subject areas O1($Fr_2$), O2($Fr_2$), and reciprocal of the square of a difference between pixel values in subject areas O1, O2 and corresponding subject areas O1($Fr_3$), O2($Fr_3$), or the reciprocals of the absolute values, are computed as similarities b2(O1), b2(O2) and similarities b3(O1), b3(O2), respectively.

The contributory degree computation means 123 computes contributory degrees β2(O1) and β2(O2) (which are employed in weighing the corresponding subject areas O1($Fr_2$) and O2($Fr_2$) of frame $Fr_2$ and adding to the subject areas O1 and O2) and contributory degrees β3(O1) and β3(O2) (which are employed in weighing the corresponding subject areas O1($Fr_3$) and O2($Fr_3$) of frame $Fr_3$ and adding to the subject areas O1 and O2) by multiplying similarities b2(O1), b2(O2), b3(O1), and b3(O2) by a predetermined reference contributory degree k.

The synthesis means 124 acquires a processed frame $Fr_G$ by weighting the corresponding subject areas O1($Fr_2$), O2($Fr_2$), O1($Fr_3$), and O2($Fr_3$) and adding to the subject areas O1 and O2, in accordance with contributory degrees β2(O1), β2(O2), β3(O1), and β3(O2). More specifically, if frame data representing the subject areas O1, O2 and corresponding areas O1($Fr_2$), O2($Fr_2$), O1($Fr_3$), and O2($Fr_3$) are SO1, SO2, SO1($Fr_2$), SO2($Fr_2$), SO1($Fr_3$), and SO2($Fr_3$), and processed frame data representing subject areas (processed areas) of a processed frame $Fr_G$ are SG1 and SG2, the processed frame data SG is computed by the following Formula 27.

$$SG1 = SO1 + \beta2(O1) \cdot SO1(Fr_2) + \beta3(O1) \cdot SO1(Fr_3)$$

$$SG2 = SO2 + \beta2(O2) \cdot SO2(Fr_2) + \beta3(O2) \cdot SO2(Fr_3) \quad (27)$$

Now, a description will be given of operation of the tenth embodiment. FIG. 42 shows processes that are performed in the tenth embodiment. First, the sampling means 101 samples frames $Fr_1$, $Fr_2$, and $Fr_3$ from video image data M0 (step S151). Then, in the motion-vector computation means 105, a plurality of motion vectors V0(m, n) are computed for the areas A1(m, n) of frame $Fr_1$ (step S152). Next, in the histogram processing means 106, histogram H0 is computed for motion vectors V0(m, n) (step S153). The areas A1(m, n) are grouped according to histogram H0, whereby frame $Fr_1$ is partitioned into subject areas O1 and (step S154).

Next, in the similarity computation means 122, similarities b2(O1) and b2(O2) between subject areas O1, O2 in frame Fr1 and corresponding subject areas O1(Fr2) and O2(Fr2) in frame Fr2 are computed and similarities b3(O1) and b3(O2) between subject areas O1, O2 in frame Fr1 and corresponding areas O1(Fr3) and O2(Fr3) in frame Fr3 are computed (step S155). Next, in the contributory degree computation means 123, contributory degrees β2(O1), β2(O2), β3(O1), and β3(O2) are computed by multiplying similarities b2(O1), b2(O2) and b3(O1), and b3(O2) by a reference contributory degree k (step S156). In accordance with contributory degrees β2(O1) and β2(O2) and contributory degrees β3(O1) and β3(O2), the corresponding subject areas O1(Fr2) and O2(Fr2) and corresponding subject areas O1(Fr3) and O2(Fr3) are weighted and added to the subject areas O1 and O2, respectively. In this manner, a processed frame FrG is obtained (step S157) and the processing ends.

Thus, in the tenth embodiment, frame Fr1 is partitioned into a plurality of subject areas O1 and O2, and similarities b2(O1) and b2(O2) and similarities b3(O1) and b3(O2) are computed for the subject areas O1(Fr2) and O2(Fr2) and subject areas O1(Fr3) and O2(Fr3) in frames Fr2 and Fr3 which correspond to the subject areas O1 and O2. If similarities b2(O1) and b2(O2) and similarities b3(O1) and b3(O2) are great, contributory degrees (weighting coefficients) $\beta 2(O1)$, $\beta 2(O2)$, $\beta 3(O1)$, $\beta 3(O2)$ are made greater. The corresponding subject areas O1(Fr2) and O2(Fr2) and corresponding subject areas O1(Fr3) and O2(Fr3) are weighted and added to the subject areas O1 and O2, whereby a processed frame FrG is obtained. Because of this, even when a certain subject area in a video image is moved, blurring can be removed for the subject area moved. As a result, a processed frame FrG with higher quality can be obtained.

In the above-described tenth embodiment, although a processed frame $Fr_G$ is obtained by multiplying the corresponding subject areas O1($Fr_2$) and O2($Fr_2$) and corresponding subject areas O1($Fr_3$) and O2($Fr_3$) by contributory degrees $\beta 2(O1)$ and $\beta 2(O2)$ and contributory degrees $\beta 3(O1)$ and $\beta 3(O2)$ and adding the weighted areas to the subject areas O1 and O2, a processed frame $Fr_G$ with higher resolution than frame $Fr_1$ may be obtained by interpolating the corresponding subject areas O1($Fr_2$), O2($Fr_2$), O1($Fr_3$), and O2($Fr_3$) multiplied by contributory degrees $\beta 2(O1)$, $\beta 2(O2)$, $\beta 3(O1)$, and $\beta 3(O2)$ in the subject areas O1 and O2, like a method disclosed in Japanese Unexamined Patent Publication No. 2000-354244, for example.

While the present invention has been described with reference to the preferred embodiments thereof, the invention is not to be limited to the details given herein, but may be modified within the scope of the invention hereinafter claimed.

What is claimed is:

1. A video image synthesis method comprising the steps of:
    sampling a predetermined number of contiguous frames, which include a reference frame and are two or more frames, from said video image;
    placing a reference patch comprising one or a plurality of rectangular areas on said reference frame;
    respectively placing patches which are the same as said reference patch, on the others of said predetermined number of frames;
    moving and/or deforming said patches in said other frames so that an image within the patch of each of said other frames approximately coincides with an image within said reference patch;
    respectively acquiring correspondent relationships between pixels within the patches of said other frames and a pixel within said reference patch of said reference frame, based on the patches of said other frames after the movement and/or deformation and on said reference patch; and
    acquiring a synthesized frame from said predetermined number of frames, based on said correspondent relationships;
    wherein said predetermined number of frames are determined based on image characteristics of said video image or synthesized frame, and said predetermined number of frames are sampled; and
    wherein
    said correspondent relationships are acquired in order of other frames closer to said reference frame, and a correlation is acquired between each of said other frames, in which said correspondent relationship is acquired, and said reference frame;
    and when said correlation is lower than a predetermined threshold value, acquisition of said correspondent relationships is stopped, and said synthesized frame is obtained based on said correspondent relationship by employing said other frames, in which said correspondent relationship has been acquired, and said reference frame.

2. A video image synthesizer comprising:
    sampling processor unit configured to sample a predetermined number of contiguous frames, which include a reference frame and are two or more frames, from a video image;
    correspondent relationship acquisition processor unit configured to place reference patch comprising one or a plurality of rectangular areas on said reference frame, then respectively placing on the others of said predetermined number of frames patches which are the same as said reference patch, then moving and/or deforming said patches in said other frames so that an image within the patch of each of said other frames approximately coincides with an
    image within said reference patch, and respectively acquiring correspondent relationships between pixels within the patches of said other frames and a pixel within said reference patch of said reference frame, based on the patches of said other frames after the movement and/or deformation and on said reference patch; and
    frame synthesis processor unit configured to acquire a synthesized frame from said predetermined number of frames, based on said correspondent relationships acquired by said correspondent relationship acquisition processor unit means;
    wherein said sampling processor unit includes a frame-number determination processor unit configured to determine said predetermined number of frames on the basis of image characteristics of said video image or synthesized frame, and samples said predetermined number of frames determined by said frame-number determination
    processor unit and
    wherein
    said correspondent relationship acquisition processor unit is configured to acquire said correspondent relationships in order of other frames closer to said reference frame;
    there is provided a correlating processor unit configured to acquire a correlation between each of said other frames, in which said correspondent relationship is acquired by said correspondent relationship acquisition processor unit, and said reference frame, and configured to stop a process which is being performed in said correspondent relationship acquisition processor unit when said correlation is lower than a predetermined threshold value; and
    said frame synthesis processor unit is configured to acquire said synthesized frame by employing said other frames, in which said correspondent relationship has been acquired, and said reference frame, based on said correspondent relationship acquired by said correspondent relationship acquisition processor unit.

3. A non-transitory computer-readable medium storing therein a program for causing a computer to execute:
    a determination process of determining the number of frames, based on image characteristics of a video image or image characteristics of a synthesized frame which is obtained from the determined number of frames of said video image;
    a sampling process of sampling the determined number of frames which are contiguous and include a reference frame, from said video image;
    a correspondent relationship acquisition process of placing a reference patch comprising one or a plurality of rectangular areas on said reference frame, then respectively placing on the others of said predetermined number of frames patches which are the same as said reference patch, then moving and/or deforming said patches in said other frames so that an image within the patch of each of said other frames approximately coincides with an image within said reference patch, and respectively acquiring correspondent relationships between pixels within the patches of said other frames and a pixel within said reference patch of said reference frame, based on the patches of said other frames after the movement and/or deformation and on said reference patch; and a frame synthesis process of acquiring said synthesized frame from said determined number of frames, based on said correspondent relationships, wherein said correspondent relationship acquisition process acquires said correspondent relationships in order of other frames closer to said reference frame; and said computer is further caused to execute a process of acquiring a correlation between each of said other frames, in which said correspondent relationship is acquired, and said reference frame, and stopping said correspondent relationship acquisition process when said correlation is lower than a predetermined threshold value.

* * * * *